US012748478B2

(12) United States Patent
Parab et al.

(10) Patent No.: US 12,748,478 B2

(45) Date of Patent: Sep. 29, 2026

(54) HIBERNATING AND RESUMING NODES OF A COMPUTING CLUSTER

(71) Applicant: Nutanix, Inc., San Jose, CA (US)

(72) Inventors: Nitin Kalidas Parab, Palo Alto, CA (US); Vinayak Hindurao Khot, Mountain View, CA (US); Tabrez Parvez Memon, Campbell, CA (US); Kemtur Neetish Bhat, Ujire (IN); Raghav Koteshwar Tulshibagwale, Cupertino, CA (US); Sohil Nizarali Habib, Sunnyvale, CA (US); Shantanu Potdar, Fremont, CA (US); Veeral Prabodhchandra Shah, Pune (IN); Pavan Kumar Konka, Milpitas, CA (US); Rohan Garg, Everett, WA (US); Prasad Gajanan Joshi, Pune (IN); Amod Vilas Jaltade, Sunnyvale, CA (US); Anil Kumar Chilukuri, San Jose, CA (US); Vishnu Vardhan Reddy Mekala, San Jose, CA (US); Shubham Pandurang Zope, Mountain View, CA (US)

(73) Assignee: Nutanix, Inc., San Jose, CA (US)

( * ) Notice: Subject to any disclaimer, the term of this patent is extended or adjusted under 35 U.S.C. 154(b) by 60 days.

(21) Appl. No.: 18/427,515

(22) Filed: Jan. 30, 2024

(65) Prior Publication Data

US 2024/0211013 A1 Jun. 27, 2024

Related U.S. Application Data

(63) Continuation-in-part of application No. 17/086,393, filed on Oct. 31, 2020, now Pat. No. 11,972,266.

(Continued)

(30) Foreign Application Priority Data

Feb. 20, 2023 (IN) ............................ 202341011354

(51) Int. Cl.

*G06F 1/3234* (2019.01)
*G06F 11/1446* (2026.01)

(52) U.S. Cl.

CPC ........ *G06F 1/3234* (2013.01); *G06F 11/1464* (2013.01)

(58) Field of Classification Search

CPC ........................... G06F 1/3234; G06F 11/1464

See application file for complete search history.

(56) References Cited

U.S. PATENT DOCUMENTS

| | | | |
|---|---|---|---|
| 6,590,861 | B1 | 7/2003 | Vepa et al. |
| 6,654,830 | B1 | 11/2003 | Taylor et al. |

(Continued)

FOREIGN PATENT DOCUMENTS

| | | | |
|---|---|---|---|
| CN | 114253463 | A | 3/2022 |
| JP | 5619173 | B2 | 11/2014 |
| WO | WO2012042509 | | 4/2012 |

OTHER PUBLICATIONS

"Hibernate your Amazon EC2 instance" Amazon AWS, URL: https://docs.aws.amazon.com/AWSEC2/latest/UserGuide/Hibernate.html, date found via Google as Nov. 28, 2018.

(Continued)

*Primary Examiner* — Faisal M Zaman

(74) *Attorney, Agent, or Firm* — Vista IP Law Group, LLP

(57) ABSTRACT

Methods, systems and computer program products for hibernating a computing cluster. The present disclosure describes techniques for hibernating and resuming nodes of a computing cluster and entire computing clusters including movement of data and metadata to and from a cloud-tier storage facility (e.g., a cloud disk(s)) in an efficient manner.

24 Claims, 38 Drawing Sheets

Related U.S. Application Data

(60) Provisional application No. 63/198,201, filed on Oct. 2, 2020.

(56) References Cited

U.S. PATENT DOCUMENTS

| | | | | |
|---|---|---|---|---|
| 6,802,062 | B1 | 10/2004 | Oyamada et al. | |
| 6,807,630 | B2 | 10/2004 | Lay et al. | |
| 6,813,708 | B2 | 11/2004 | Smith et al. | |
| 6,882,795 | B1 | 4/2005 | Mcmurdie et al. | |
| 7,693,877 | B1 | 4/2010 | Zasman | |
| 8,046,460 | B1 | 10/2011 | Greenidge et al. | |
| 8,166,477 | B1 | 4/2012 | Tormasov et al. | |
| 8,230,204 | B2 | 7/2012 | Rostampour | |
| 8,549,518 | B1 | 10/2013 | Aron et al. | |
| 8,601,473 | B1 | 12/2013 | Aron et al. | |
| 8,607,009 | B2 | 12/2013 | Nicholas et al. | |
| 8,612,396 | B1 | 12/2013 | Mcalister et al. | |
| 8,850,130 | B1 | 9/2014 | Aron et al. | |
| 8,959,323 | B2 | 2/2015 | Ganti et al. | |
| 9,430,268 | B2 | 8/2016 | Hussain et al. | |
| 9,552,215 | B2 | 1/2017 | Voccio et al. | |
| 9,652,265 | B1 | 5/2017 | Narayanasamy et al. | |
| 9,672,116 | B1 * | 6/2017 | Chopra | G06F 11/1464 |
| 9,772,866 | B1 | 9/2017 | Aron et al. | |
| 9,804,876 | B2 | 10/2017 | Tsirkin et al. | |
| 9,900,397 | B1 * | 2/2018 | Cope | H04L 63/08 |
| 9,940,148 | B1 | 4/2018 | Dannowski | |
| 10,073,656 | B2 | 9/2018 | Zhe Yang et al. | |
| 10,108,517 | B1 | 10/2018 | Efremov et al. | |
| 10,114,565 | B2 | 10/2018 | Nithrakashyap et al. | |
| 10,462,012 | B1 | 10/2019 | Rao et al. | |
| 10,534,672 | B2 * | 1/2020 | Klose | G06F 3/0635 |
| 10,860,363 | B1 | 12/2020 | Gabrielson | |
| 10,884,622 | B2 | 1/2021 | Condict et al. | |
| 10,901,768 | B1 | 1/2021 | Mandadi et al. | |
| 10,921,993 | B2 | 2/2021 | Anumula et al. | |
| 11,169,835 | B1 | 11/2021 | Duong et al. | |
| 11,169,883 | B1 | 11/2021 | Burgin et al. | |
| 11,579,912 | B2 | 2/2023 | Ganesan et al. | |
| 11,593,137 | B2 | 2/2023 | Gill | |
| 2003/0208675 | A1 | 11/2003 | Burokas et al. | |
| 2004/0083355 | A1 | 4/2004 | Smith et al. | |
| 2005/0060590 | A1 | 3/2005 | Bradley et al. | |
| 2005/0091354 | A1 | 4/2005 | Lowell et al. | |
| 2005/0160423 | A1 | 7/2005 | Bantz et al. | |
| 2007/0185934 | A1 | 8/2007 | Cannon et al. | |
| 2010/0037096 | A1 | 2/2010 | Bum et al. | |
| 2011/0161297 | A1 * | 6/2011 | Parab | G06F 11/2094 707/646 |
| 2012/0084524 | A1 * | 4/2012 | Gokhale | G06F 16/278 711/E12.103 |
| 2012/0195187 | A1 | 8/2012 | Ashihara et al. | |
| 2012/0254865 | A1 | 10/2012 | Saeki et al. | |
| 2013/0080814 | A1 | 3/2013 | Cong et al. | |
| 2013/0138995 | A1 | 5/2013 | Sivaramakrishnan et al. | |
| 2013/0139154 | A1 | 5/2013 | Shah et al. | |
| 2013/0191354 | A1 | 7/2013 | Wilf | |
| 2013/0227553 | A1 | 8/2013 | Tsirkin et al. | |
| 2013/0227554 | A1 | 8/2013 | Tsirkin et al. | |
| 2013/0227555 | A1 | 8/2013 | Tsirkin et al. | |
| 2013/0275975 | A1 | 10/2013 | Masuda et al. | |
| 2013/0346366 | A1 * | 12/2013 | Ananthanarayanan | G06F 16/273 707/611 |
| 2014/0149357 | A1 * | 5/2014 | Gupta | G06F 16/2308 707/652 |
| 2014/0188957 | A1 * | 7/2014 | Hosoi | G06F 11/0727 707/829 |
| 2015/0058521 | A1 | 2/2015 | Armstrong et al. | |
| 2015/0058522 | A1 | 2/2015 | Armstrong et al. | |
| 2015/0227192 | A1 | 8/2015 | Kruglick | |
| 2016/0085650 | A1 * | 3/2016 | Kadayam | G06F 11/2082 714/6.23 |
| 2016/0210195 | A1 * | 7/2016 | Sinha | G06F 11/2097 |
| 2016/0277308 | A1 | 9/2016 | Challa et al. | |
| 2016/0283281 | A1 | 9/2016 | Antony | |
| 2016/0306649 | A1 | 10/2016 | Gunti et al. | |
| 2016/0323098 | A1 | 11/2016 | Bathen | |
| 2016/0344821 | A1 | 11/2016 | Khosrowpour et al. | |
| 2017/0039082 | A1 | 2/2017 | Ganesan et al. | |
| 2017/0147409 | A1 | 5/2017 | Chandrakar et al. | |
| 2018/0173513 | A1 | 6/2018 | Agarwal et al. | |
| 2018/0232038 | A1 | 8/2018 | Surdu et al. | |
| 2018/0300203 | A1 * | 10/2018 | Kathpal | G06F 11/1464 |
| 2018/0314706 | A1 | 11/2018 | Sirton et al. | |
| 2019/0087282 | A1 * | 3/2019 | Kumar | G06F 16/14 |
| 2019/0317796 | A1 | 10/2019 | Kunt et al. | |
| 2019/0324652 | A1 * | 10/2019 | Vishwakarma | G06F 3/0653 |
| 2020/0004442 | A1 * | 1/2020 | Caswell | G06F 3/0659 |
| 2020/0034250 | A1 | 1/2020 | Chandrasekaran et al. | |
| 2020/0089409 | A1 | 3/2020 | Ankireddypalle et al. | |
| 2020/0133706 | A1 | 4/2020 | Koehler et al. | |
| 2020/0133718 | A1 | 4/2020 | Koehler et al. | |
| 2020/0183905 | A1 * | 6/2020 | Wang | G06F 16/2246 |
| 2020/0192690 | A1 | 6/2020 | Gupta et al. | |
| 2020/0310848 | A1 | 10/2020 | Kaul | |
| 2020/0319694 | A1 | 10/2020 | Mohanty et al. | |
| 2020/0389522 | A1 | 12/2020 | Cherivirala et al. | |
| 2021/0064408 | A1 | 3/2021 | Gill | |
| 2021/0067466 | A1 | 3/2021 | Parab et al. | |
| 2021/0067484 | A1 | 3/2021 | Parab et al. | |
| 2021/0157620 | A1 | 5/2021 | Schütz | |
| 2021/0173726 | A1 | 6/2021 | Lawrence et al. | |
| 2021/0263762 | A1 | 8/2021 | Kachare et al. | |
| 2021/0286684 | A1 * | 9/2021 | Nara | G06F 11/1464 |
| 2022/0103622 | A1 * | 3/2022 | Camargos | G06V 40/10 |
| 2022/0269567 | A1 * | 8/2022 | Ebara | G06F 11/1658 |
| 2022/0374519 | A1 | 11/2022 | Botelho et al. | |
| 2024/0004761 | A1 * | 1/2024 | Bhagi | G06F 11/1451 |

OTHER PUBLICATIONS

"How Amazon EC2 instance hibernation works," Amazon AWS, URL: https://docs.aws.amazon.com/AWSEC2/latest/UserGuide/instance-hibernate-overview.html, date found via Google as Sep. 12, 2021.

"Hibernating a created cluster (Technology Preview)," Red Hat Customer Portal, URL: https://access.redhat.com/documentation/en-us/red_hat_advanced_cluster_management_for_kubernetes/2.3/html-single/clusters/index#hibernating-a-created-cluster, date found via Google as Jun. 4, 2023.

"Nutanix Clusters on AWS—New Improvements to Hibernate & Resume Feature," Nutanix, URL: https://www.nutanix.com/blog/nutanix-clusters-on-aws-new-improvements-to-hibernate-and-resume-feature, dated Nov. 30, 2021.

Y.-F. Hsu, R. Irie, S. Murata and M. Matsuoka, "A Novel Automated Cloud Storage Tiering System through Hot-Cold Data Classification," 2018 IEEE 11th International Conference on Cloud Computing (CLOUD), San Francisco, CA, USA, 2018, pp. 492-499, doi: 10.1109/CLOUD.2018.00069.

Yadav, G., et al., "Improving Performance of Live Migration using Log Table Based Method without Violating Service Level Agreement," International Journal of Recent Technology and Engineering (IJRTE) ISSN: 2277-3878, vol. 7, Issue-6S, Apr. 2019.

A. Mohan and S. Shine, "An optimized approach for live VM migration using log records," 2013 Fourth International Conference on Computing, Communications and Networking Technologies (ICCCNT), Tiruchengode, India, 2013, pp. 1-4, doi: 10.1109/ICCCNT.2013.6726826.

"How to map Azure Disks to Windows VM guest disks," Microsoft Build, URL: https://learn.microsoft.com/en-us/azure/virtual-machines/windows/azure-to-guest-disk-mapping?tabs=azure-cli, dated Mar. 7, 2023.

"Checking PowerHA SystemMirror components," IBM Documentation, URL: https://www.ibm.com/docs/en/powerha-aix/7.2?topic=layer-checking-powerha-systemmirror-components, dated Jan. 19, 2024.

"Checking physical volumes," IBM Documentation, URL: https://www.ibm.com/docs/en/powerha-aix/7.2?topic=manager-checking-physical-volumes, dated Jan. 19, 2024.

(56) References Cited

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 31, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI* '17, (Mar. 27, 2017).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Poitras, Steven. "The Nutanix Bible" (Apr. 27, 2023), from https://www.nutanixbible.com/pdf/classic.pdf (Publication date based on updated doc publication date; first publication date unknown).
Poitras, Steven. "The Nutanix Bible" (May 21, 2024), from https://www.nutanixbible.com/pdf/classic.pdf (Publication date based on updated doc publication date; first publication date unknown).
Poitras, Steven. "The Nutanix Bible" (Sep. 9, 2025), from https://www.nutanixbible.com/pdf/classic.pdf (Publication date based on updated doc publication date; first publication date unknown).
Final Office Action for U.S. Appl. No. 17/086,393 dated Aug. 2, 2023.
Final Office Action for U.S. Appl. No. 17/086,393 dated Jul. 13, 2022.
Non-Final Office Action for U.S. Appl. No. 17/086,393 dated Mar. 31, 2023.
Non-Final Office Action for U.S. Appl. No. 17/086,393 dated Mar. 21, 2022.
Notice of Allowance for U.S. Appl. No. 17/086,393 dated Dec. 15, 2023.
Notice of Allowance for U.S. Appl. No. 16/778,909 dated Aug. 12, 2022.
Notice of Allowance for U.S. Appl. No. 16/778,909 dated Sep. 21, 2022.
"Hibernate your On-Demand or Reserved Liux instance," Amazon Elastic Compute Cloud, dated May 23, 2021.
Non-Final Office Action for U.S. Appl. No. 16/778,909 dated Mar. 18, 2022.
"4.2 Hibernating a VM," FusionCompute.
Extended European Search Report for EP Patent Appln. No. 20193502.0 dated Jan. 27, 2021.
Lee, B., "Types of Hyper-V Cluster Virtual Machine Migration," Vembu, dated Aug. 17, 2018.
"Oracle VM Windows Paravirtual (PV) Drivers 2.0: New Features," An Oracle Technical White Paper, dated Jun. 2010.
Gill, B., et al., "Technical Preview: Nutanix on AWS: Making Lift and Shift Invisible," .NEXTConference, Nutanix Inc., Copyright 2019.
Devarapalli, S., et al., "Xi Clusters: Accelerate Your Hybrid Cloud Journey with Nutanix in Public Clouds," .NEXTConference, Nutanix Inc., copyright 2019.
Min Choi et al., "Cluster computing environment supporting single system Image", Sep. 20, 2004, Cluster Computing, 2004 IEEE International Conference, San Diego CA USA.
Non-Final Office Action dated Jun. 9, 2023 for U.S. Appl. No. 18/161,091.
Notice of Allowance for U.S. Appl. No. 18/161,091 dated Oct. 12, 2023.
Notice of Allowance for U.S. Appl. No. 18/161,091 dated Jan. 31, 2024.
"Amazon Elastic Compute Cloud—User Guide for Linux Instances," AWS, Copyright 2023.
"Aviatrix Transit Architecture for Azure," AviatrixSystems, URL: https://github.com/AviatrixSystems/Docs/blob/main/HowTos/nextgentransit_for_azure.rst, dated Apr. 22, 2024.
"Amazon EC2 instance root device volume," AWS, Copyright 2023.
"Aviatrix Next Gen Transit with customized SNAT and DNAT features," AviatrixSystems, URL: https://github.com/AviatrixSystems/Docs/blob/main/HowTos/transit_snat_dnat.rst, dated Apr. 222, 2024.
"gateway.rst," AviatrixSystems, URL: https://github.com/AviatrixSystems/Docs/blob/main/HowTos/gateway.rst, dated Sep. 14, 2023.
"Azure VMware Solution Planning and Deployment Guide," VMWare by Broadcom, date found via Google as Jan. 15, 2023.
"Step By Step Deploy VMware NSX with Microsoft Azure IPSEC VPN Site-to-Site," zero to hero, URL: https://web.archive.org/web/20211024191210/https:/vzerotohero.com/2017/03/step-by-step-deploy-vmware-nsx-with-microsoft-azure-ipsec-vpn-site-to-site/, date found via Internet Archive as Oct. 24, 2021.
"NSX Public Cloud Gateway: Architecture and Modes of Deployment," VMWare, URL: https://web.archive.org/web/20241219125739/https://docs.vmware.com/en/VMware-NSX-T-Data-Center/3.1/installation/GUID-E761C567-937F-4E79-A98A-DEE306B1F9EF.html, dated Feb. 5, 2021.

* cited by examiner

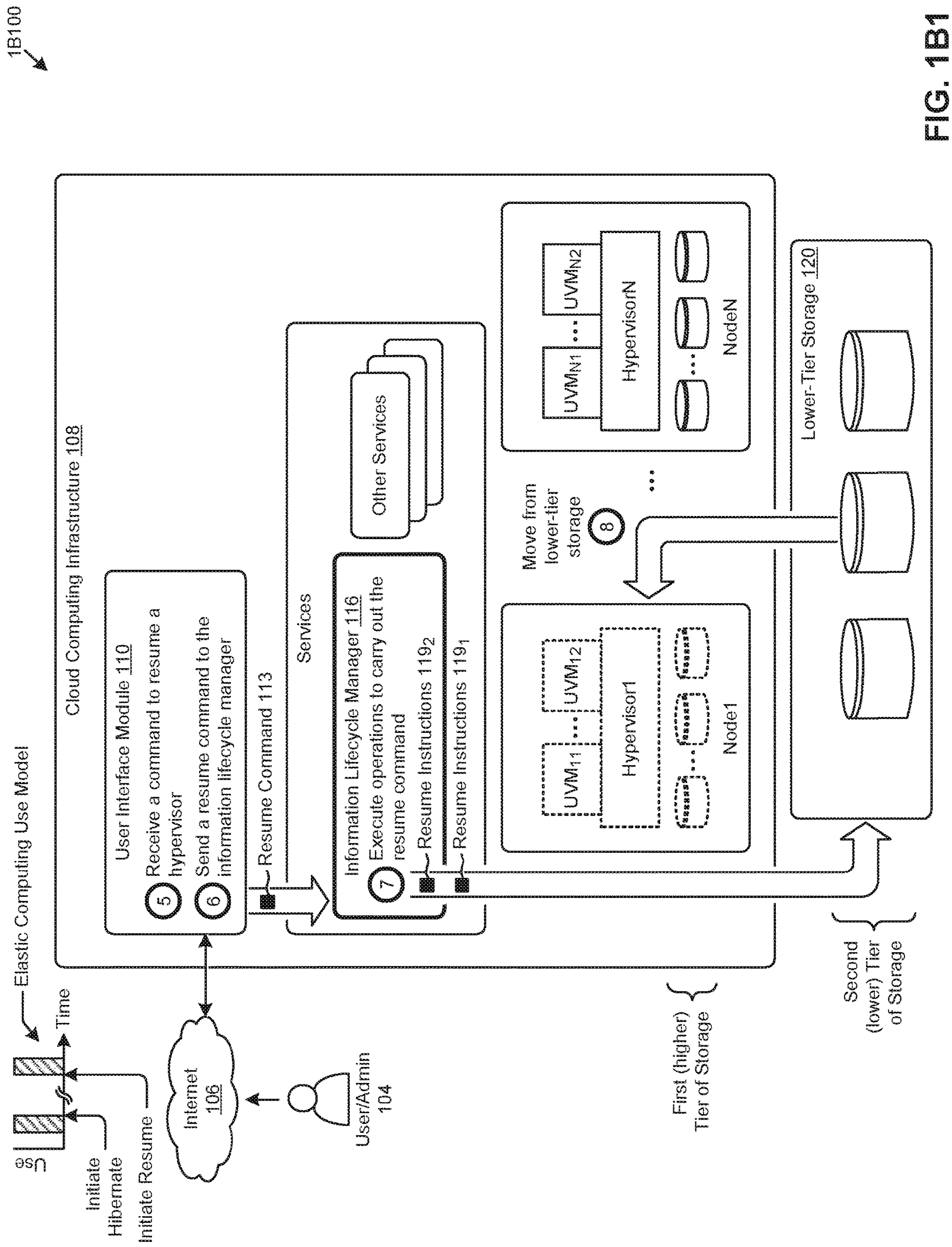
FIG. 1B1

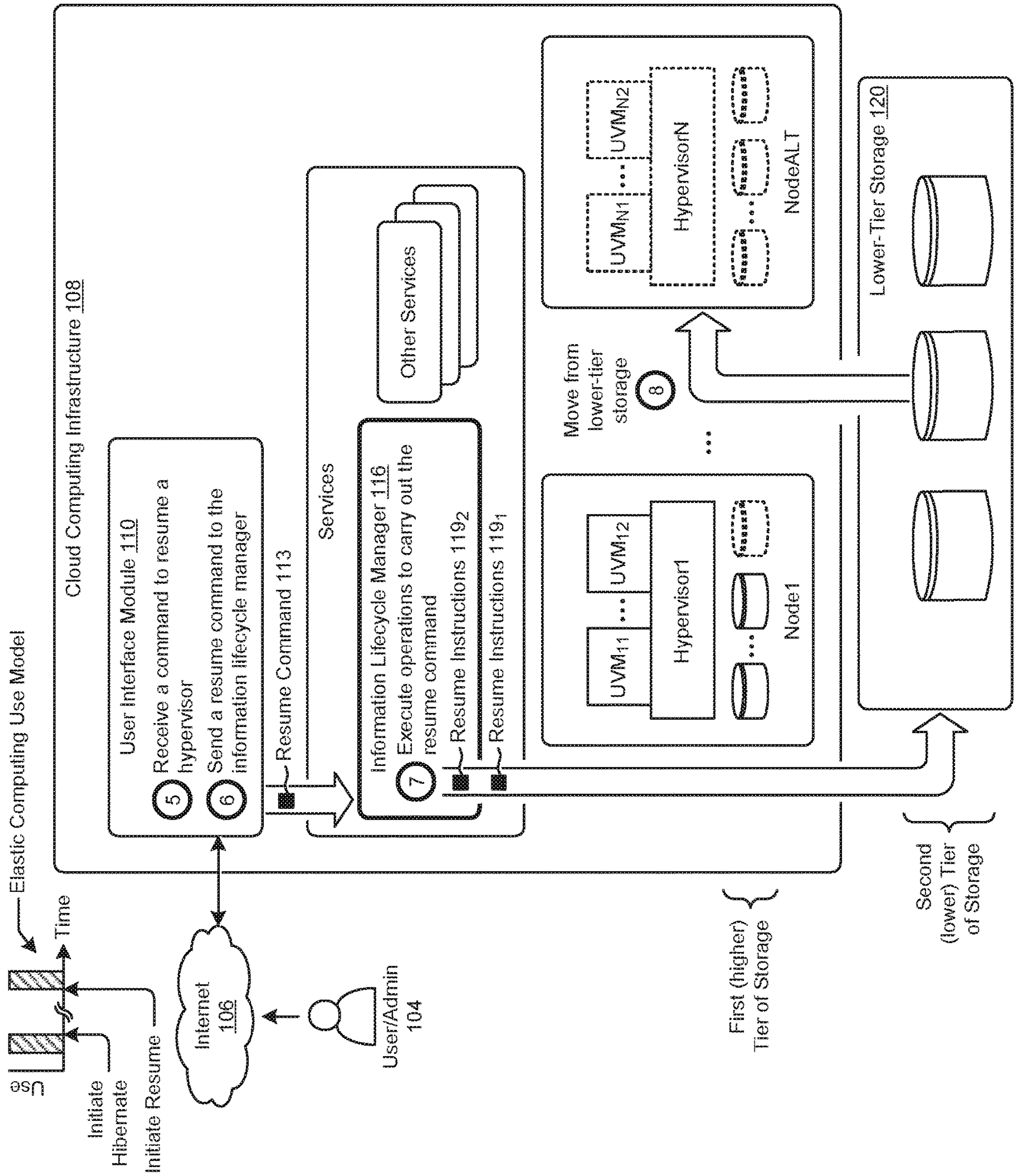
FIG. 1B2

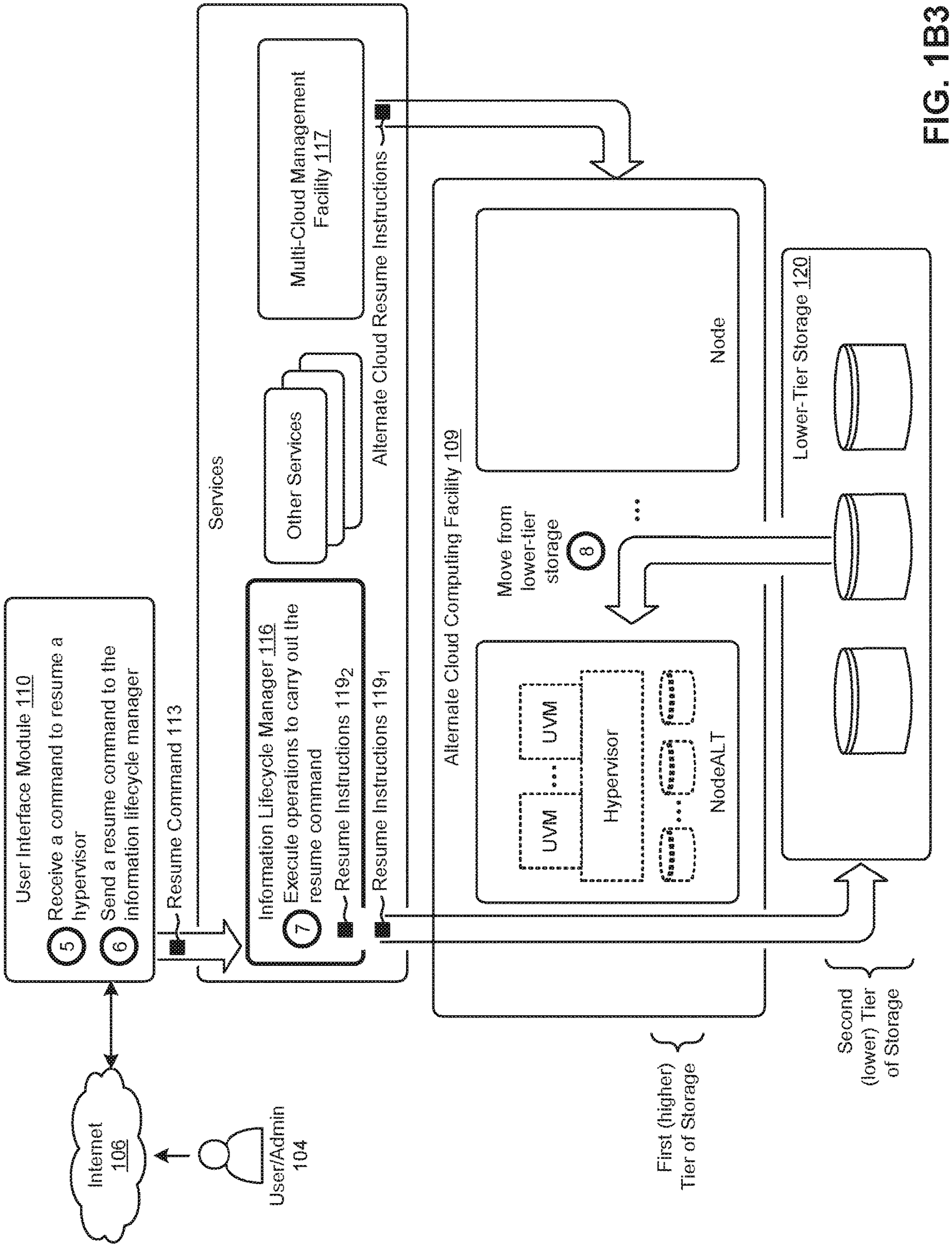
FIG. 1B3

HIBERNATING AND RESUMING NODES OF A COMPUTING CLUSTER

RELATED APPLICATIONS

The present application claims the benefit of priority to India Patent Application Ser. No. 202341011354 Titled "HIBERNATING AND RESUMING NODES OF A COMPUTING CLUSTER" filed on Feb. 20, 2023, and is a continuation-in-part of U.S. patent application Ser. No. 17/086,393, titled "CONTAINER-BASED APPLICATION PROCESSING", filed on Oct. 31, 2020, which claims the benefit of priority to U.S. Provisional Patent Application Ser. No. 63/198,201 titled "HIBERNATING AND RESUMING NODES OF A COMPUTING CLUSTER", filed on Oct. 2, 2020, all of which are hereby incorporated by reference in their entirety.

TECHNICAL FIELD

This disclosure relates to cloud computing, and more particularly to techniques for hibernating and resuming nodes of a computing cluster.

BACKGROUND

Computing clusters based on virtualization systems involving hypervisors and hypervisor storage and virtualized networking that are used to run virtual machines (VMs) consume actual physical resources such as physical computing hardware and networking hardware. In cloud computing scenarios where such infrastructure is provided, at cost, to customers by public cloud vendors, customers do not want to pay for resources that are not being used. Nevertheless, customers are reluctant to destroy their virtualization systems for concern of loss of data, or due to concerns or uncertainty as to whether the virtualization system would need to be restored manually to its previous configuration. One way to ameliorate such concerns is to hibernate the entire cluster. In such hibernation, the entire cluster, plus all of its data state (e.g., vDisks), plus all of its virtualization state (e.g., state of its hypervisor), plus all of its configuration state (e.g., configuration flags, etc.) are stored in a manner that facilitates easy restoration of the entire cluster and all of its states and VMs after a period of hibernation.

In some situations, a cluster might be dormant for a long period of time, during which long period of time, the costs for use of resources are still being charged. In many cases, such as when there is a large amount of vDisk data, the resource usage costs are non-negligible and, as such, the costs for use of the storage resources mount up quickly-even though the storage resources are not being used by their corresponding VMs.

One approach would involve automatic detection of which data is "hot" or "cold", and to "tier-down" (i.e., to a lower cost storage tier) the cold data while retaining the "hot" data in a higher tier. An addition to this approach would be to automatically detect when the VM has gone into disuse and then to hibernate the VM in a manner that observes the distinction between "hot" data and "cold" data such that, at some future moment when it comes time to resume the VM, the VM can be resumed with its "hot" data in the higher tier and its "cold" data in the lower tier. Still further additions to this approach would be to automatically determine which portions of which data are "hot" or "cold" and move the appropriate portions of the data to the tiered storage accordingly. However, it is not always straightforward to determine which portions of which data are "hot" or "cold". Moreover, this situation is sometimes further complicated by the fact that in modern "high-availability" computing clusters, data might be replicated many times, and it would be unnecessary, and in many cases extremely wasteful, to replicate already replicated data—even if the data is being down-leveled to a lower tier of storage.

In some cases, an entire cluster might be idle. Unfortunately, an idle cluster does not alleviate the issues identified above. This is because the footprint of the cluster (e.g., the resources such as storage and processing power reserved for said cluster) continues to require maintenance which is directly or indirectly responsible for incurring costs for the cluster owner.

Unfortunately, determination of how hibernation of such data or cluster should be carried out, is extremely complicated. Moreover, the mechanics of moving data from one tier to another tier is itself extremely complicated. Therefore, what is needed is a technique or techniques that help to move data or a cluster in a hibernate/resume scenario.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for hibernating and resuming nodes of a computing cluster, which techniques advance the relevant technologies to address technological issues with legacy approaches. More specifically, the present disclosure describes techniques used in systems, methods, and in computer program products for hibernating and resuming a computing cluster using facilities of an information lifecycle manager (ILM). Certain embodiments are directed to technological solutions for using built-in capabilities of an information lifecycle manager to handle the movement of data to and from a cloud-tier storage facility. In some embodiments, additional or different aspects are utilized to improve the operation over existing ILMs.

The disclosed embodiments modify and improve over legacy approaches. In particular, the herein-disclosed techniques provide technical solutions that address the technical problems of how to move large amounts of data and metadata reliably and efficiently, and how to handle any failures from a compute cluster storage tier to a cloud or cold storage tier with proper indications such as progress of data movement and other customer visibility features.

The ordered combination of steps of the embodiments serve, in the context of practical applications that perform steps for using built-in capabilities of at least an information lifecycle manager (ILM), to handle the movement of data to and from a cloud-tier storage facility efficiently. As such, techniques for using built-in capabilities of an ILM to handle the movement of data to and from a cloud-tier storage facility overcome long standing yet heretofore unsolved technological problems associated with determining which data is "hot" or "cold" and when and how migration of such data should be carried out. Additionally, some embodiments provide additional optimizations over those that may otherwise be provided by an ILM.

Many of the herein-disclosed embodiments for using additional and built-in capabilities of an information lifecycle manager to handle the movement of data to and from a cloud-tier storage facility are technological solutions pertaining to technological problems that arise in the hardware and software arts that underlie bare metal clouds—e.g., because releasing bare metal hardware also releases any storage on that bare metal hardware.

Some embodiments include a sequence of instructions that are stored on a non-transitory computer readable medium. Such a sequence of instructions, when stored in memory and executed by one or more processors, cause the one or more processors to perform a set of acts for using additional or built-in capabilities of an information lifecycle manager to handle the movement of data to and from a target (e.g., external, remote, cold, or cloud-tier) storage facility.

Some embodiments include the aforementioned sequence of instructions that are stored in a memory, which memory is interfaced to one or more processors such that the one or more processors can execute the sequence of instructions to cause the one or more processors to implement acts for using additional and/or built-in capabilities of an ILM to handle the movement of data to and from a target (e.g., external, remote, cold, or cloud-tier) storage facility.

In various embodiments, any combinations of any of the above (and below as provided herein) can be combined to perform any variations of acts for hibernating and resuming a computing cluster using at least facilities of an ILM, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B1, FIG. 1B2 and FIG. 1B3 illustrate computing environments in which cluster resume after hibernation techniques can be practiced, according to an embodiment.

DETAILED DESCRIPTION

Figure 1A:
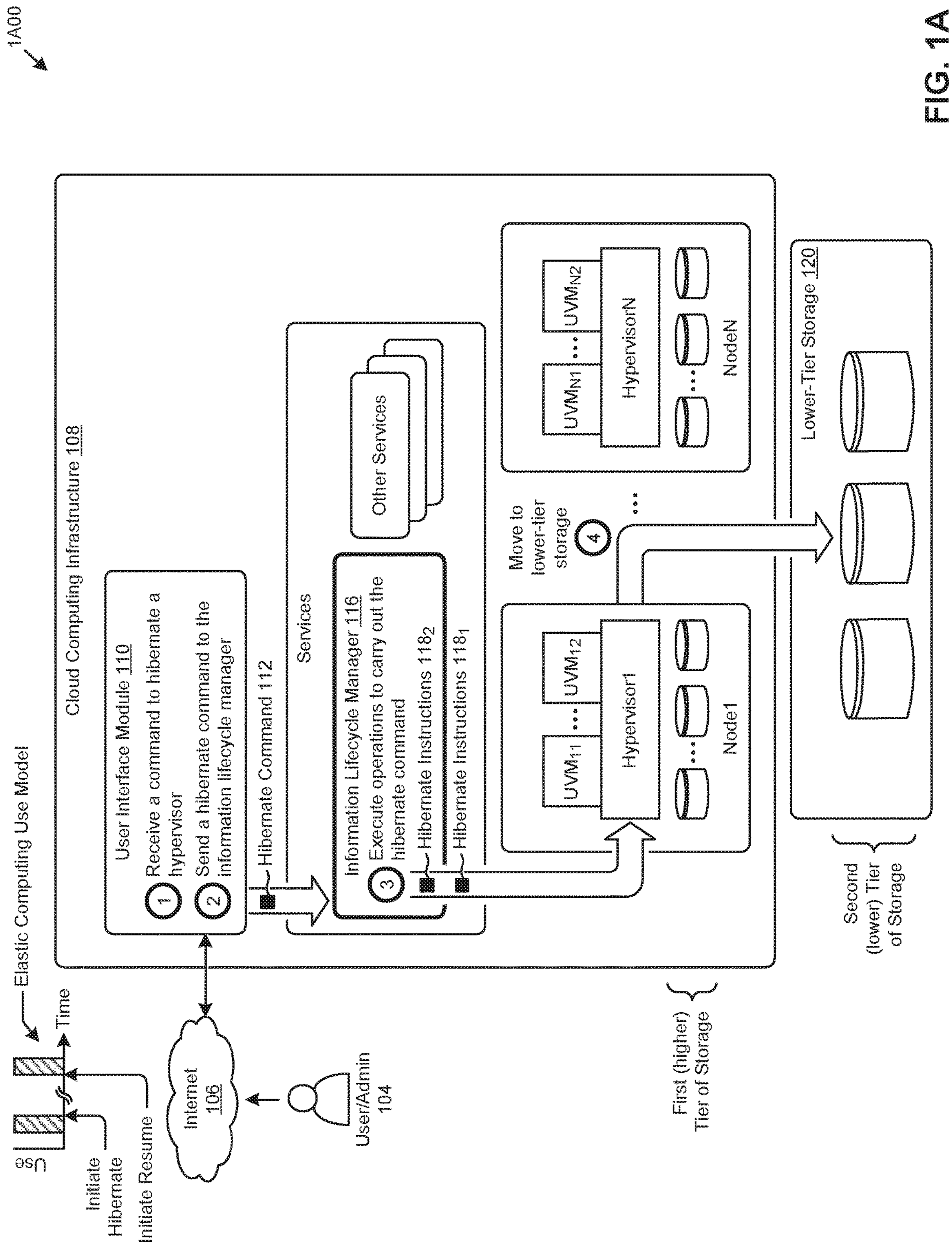
FIG. 1A illustrates a computing environment in which cluster hibernation techniques can be practiced, according to an embodiment.

Aspects of the present disclosure solve problems associated with using computer systems for determining when and how hibernation of computing clusters, along with their virtualization systems and VMs running on it, should be carried out. These problems are unique to, and may have been created by various computer-implemented methods for dealing with movement of data of compute clusters in the context of bare metal clouds. Some embodiments are directed to approaches for using at least built-in capabilities of an information lifecycle manager to handle the movement of data to and from various tiers of a multi-tier storage facility. In some embodiments, additional or different capabilities from those of an ILM are used to improve the hibernation of a cluster. The FIGS. 1A-8D and discussions herein present example environments, systems, methods, and computer program products for hibernating and resuming a computing cluster using facilities of an ILM. The FIGS. 9-29 provide additional approaches to improve hibernation of clusters, which in some embodiments may be integrated in full or in part with functions of an ILM.

Overview

Hibernate and resume functions are provided for use on certain computing clusters. Some cluster node hibernate and cluster node resume functions are integrated into a graphical user interface such that a customer can, with a single click, shutdown a node of a computing cluster or hibernate the cluster, release corresponding computing resources, and thus stop incurring resource usage costs that are tallied by the computing resource provider. A single click resume can be integrated into a graphical user interface as well. Upon a user indication, a node or cluster resume facility brings the computing node or cluster back with functionally the same configuration state and user data storage state as was present when the node or cluster was hibernated.

Unlike on-premises (i.e., on-prem) clusters, it often happens that cloud clusters are ephemeral. That is, for an on-premises cluster a shutdown of that cluster or a node instance therein is normally followed by a restart of the 'same' cluster or node instances on the same hardware (e.g., stopping software/services or physically shutting down the underlying machines do not modify the configuration but instead merely stops the operation of that configuration until restart occurs). However, for cloud clusters, such a restarted cluster, node instances would not have the same 'old' data in a state prior to the shutdown. This is because the new cluster or node instances are brought-up on pristine, data cleaned hardware and thus, all the disks would contain 'nulled-out' data. This is true even if the hardware happens to be the same hardware.

A hibernate function of a computing cluster initiates activities of the system such that all the data pertaining to the nodes of the cluster-including cluster configuration and user data—are persisted on storage for later retrieval. A resume function of the computing cluster initiates activities in the system such that a hibernated cluster is recreated in such a way that all the previously persisted data is restored into a node(s) of a target computing cluster.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment in which cluster hibernation techniques can be practiced. As an option, one or more variations of computing environment 1A00 or any aspect thereof may be implemented in the context of the architecture and functionality of the embodiments described herein and/or in any environment.

The figure illustrates a computing system (e.g., cloud computing infrastructure 108) that hosts a virtualization system distributed across multiple computing nodes (e.g., Node1, . . . , NodeN). The illustrated computing system has multiple tiers of storage; specifically, and as shown, a first, higher storage tier is hosted within a computing node and is associated with hypervisors (e.g., hypervisor1, . . . , hypervisorN) and user virtual machines of that node (e.g., $UVM_{11}$, $UVM_{12}$, $UVM_{N1}$, $UVM_{N2}$). A second, lower storage tier is situated outside of the nodes. Communication to the lower-tier storage 120 can be carried out by any of (1) the hypervisors, (2) the virtual machines, (3) an information lifecycle manager hosted in the cloud computing infrastructure, or (4) an information lifecycle manager (ILM) and/or other services hosted in locations outside of the cloud computing infrastructure and accessible over Internet 106.

The shown computing environment supports hibernation and resuming of nodes of a virtualization system. As used herein, the verbs to "hibernate" and to "resume" and/or "to hibernate a hypervisor" or "to resume a hypervisor" refer to saving and restoring states of a hypervisor, including any state or states of any subordinate virtual machines and/or any subordinate virtual disks, and including any state or states of the node's hardware that might influence the behavior of the hypervisor. The saving actions preserve the state of the hypervisor and its environment in a non-volatile location such that the state can be restored at a later moment in time. The state of the hypervisor might include a list of running virtual machines and/or applications, and for each such virtual machine or running application, the state might include a corresponding running state of the virtual machine or application, possibly including the existence and state of any networking resources and/or the existence and state of any other computing devices.

As used herein, an information life cycle manager (ILM) is a computing module or collection of computing modules that manage the flow of data and its metadata over time. Managing the flow encompasses enforcing policies that specify where a particular data item should be stored, how many copies of it should be stored, and for what duration and into what storage tier or tiers the data item should be stored at any particular moment in time. An ILM is able to observe changes to real or virtual storage devices, including additions of new real or virtual storage devices and/or upgrades to any real or virtual storage devices, and/or operational state changes (e.g., online, offline, mounted, not mounted, etc.) of real or virtual storage devices, and/or deletion of real or virtual storage devices.

The figure is being presented to illustrate how an entire virtualization system on a particular node (e.g., Node1, . . . , NodeN) can hibernated efficiently using the shown ILM. As earlier discussed, one motivation for hibernating a node is to avoid costs associated with usage of cloud computing infrastructure resources where there is expected to be a period of non-use of the computing infrastructure resources. This situation occurs frequently in an elastic computing use model. More specifically, one way to avoid costs associated with usage in an elastic computing use model of in a cloud computing setting is to capture the entire state of the virtualization system into a storage object, and then to store that object in a lower-tier storage facility (e.g., into lower-tier networked storage or into still lower-tier object storage).

The determination of when to initiate hibernation can be done by a human (e.g., by a user or an administrator) or by a computing agent (e.g., a migration agent or by an information lifecycle management agent). In the former case, where the determination of when to initiate hibernation can be done by a user or an administrator, the user or administrator might take advantage of the elastic computing model by determining a time to initiate a hibernation action and by determining a time to initiate a resume action. Strictly as one example, once the time to hibernate has been determined by a user/admin 104, the user/admin can access a user interface module 110. The interface module in turn can process inputs from the user/admin such as to receive a command to hibernate a hypervisor (operation 1) and then send a hibernate command 112 to information lifecycle manager 116 (operation 2). The ILM can, in turn, execute operations to carry out the hibernate command (operation 3) which, as shown, includes commands to move the virtualization system to a lower-tier storage 120 (operation 4).

In this and other implementations, the information lifecycle manager has visibility into the entire virtualization system, including all of it system data and configuration data and all of the user data. Moreover, in this and other implementations, the ILM has visibility into, and/or is driven by policies that govern the uses of data through the data's lifecycle. Strictly as examples, the information lifecycle manager has visibility into a policy or policies that pertain to high availability of the virtualization system. This and other examples are given in Table 1.

TABLE 1

Information lifecycle manager (ILM) cognizance

| Data Item | Visibility/Actions |
|---|---|
| User Data | Virtual disk create, read, write, delete, retention in accordance with a retention policy, etc.. |
| Metadata | All virtual disk data has corresponding metadata that is managed by the ILM. |
| Replicated Data | The ILM has visibility into data modifications and policies for replication. |
| System Data | The ILM can distinguish between system data and user data. System data, including hypervisor state, root disk location, and contents are disk contents are visible and can be acted upon by the ILM. |
| Log and Audit Data | The ILM is responsible for maintaining logging facilities, data path logs, redo logs, undo logs, audit trail logs, etc. |

The information lifecycle manager is configured to be able to emit instructions to operational elements that are themselves configured to follow the instructions. Strictly as one example, and as shown, the ILM is configured to emit hibernate instructions (e.g., hibernate instructions 1181, and hibernate instructions 1182) to a hypervisor. In other embodiments the ILM is configured to be able to emit hibernate or other instructions to operational elements other than a hypervisor. Strictly as one example of this latter case, an information lifecycle manager can be configured to emit storage-oriented instructions to a storage facility such as the shown lower-tier storage 120. As such, an ILM is able to orchestrate all activities that might be needed to hibernate an entire computing node by saving the entirety of the then-current state of the node and then to offload the saved data to a lower tier of storage.

When comporting with the foregoing mechanism for cluster hibernation, it is possible to restore the saved node and bring the node to an operational state via a cluster resume mechanism. Various implementations of a cluster resume mechanism are shown and discussed as pertains to FIG. 1B1, FIG. 1B2, and FIG. 1B3.

FIG. 1B1 illustrates a computing environment 1B100 in which cluster resume after hibernation techniques can be practiced. As an option, one or more variations of computing environment 1B100 or any aspect thereof may be implemented in the context of the architecture and functionality of the embodiments described herein and/or in any environment.

The figure is being presented to illustrate how an information lifecycle manager can orchestrate all activities that might be needed to resume an entire computing node by restoring the entirety of the then-current state of the node from data objects that had been saved to a lower tier of storage in response to a hibernate command. The environment as shown in FIG. 1B1 is substantially the same as the environment as shown in FIG. 1A, however the commands, instructions and actors on the instructions are different in the resume regime as compared with the hibernate regime.

Strictly as one example, when a time to resume has been determined by user/admin 104, the user/admin can access a user interface module 110 via internet 106, which in turn can process inputs from the user/admin such as to receive a resume indication (operation 5) and then send a resume command 113 to information lifecycle manager 116 (operation 6). The ILM can, in turn, execute operations to carry out the resume command (operation 7) which, as shown, includes resume instructions (e.g., resume instructions 1191, resume instructions 1192) to move the virtualization system from lower-tier storage 120 (operation 8) to a target node.

In this manner, an entire cluster can be hibernated, node by node until all virtualization systems of all nodes of the entire cluster have been hibernated. Once the virtualization system has been moved from the lower-tier storage to the memory of a target node, operation of a hibernated node can be resumed from exactly the same state as was present when the node was saved under the hibernate regime.

The specific embodiment of FIG. 1B1 depicts the same node, (i.e., node1) as being the same subject node of both the hibernate command and the resume command. In many situations, however, the subject node of the resume command is different than the subject node of the hibernate command. One example of this is shown in FIG. 1B2. Specifically, when performing operation 8, an alternate node (i.e., node nodeALT) is designated as the subject node for the resume. This scenario, where the subject node of the resume command is different than the subject node of the hibernate command is common in cloud computing settings.

The specific embodiment of FIG. 1B3 includes a second cloud computing facility (e.g., alternate cloud computing facility 109) that provisions infrastructure that is different from the foregoing cloud computing infrastructure 108. The ILM and/or any cooperating agents (e.g., the shown multi-cloud management facility 117) are able to carry out node hibernate operations on a first cloud, and then carry out node resume operations to a different cloud. In this manner an entire cluster can be migrated, node by node from one cloud provider to another cloud provider. In some cases, a cluster can be formed from nodes that span different clouds.

Further details pertaining to hibernation technique and resume technique are shown and described hereunder.

Figure 2A:
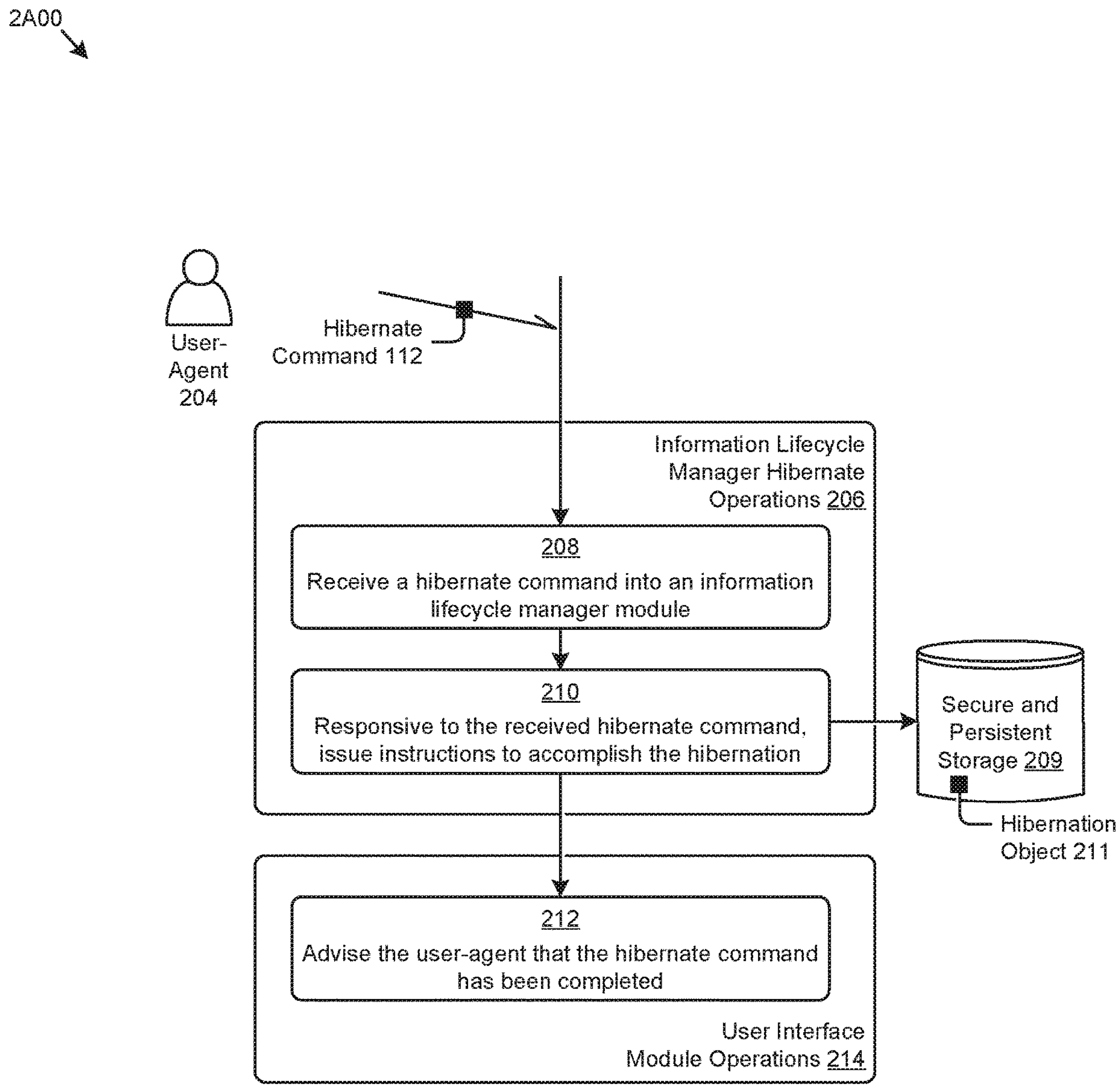
FIG. 2A shows a cluster node hibernation technique as used in systems that hibernate and resume of a computing cluster node using facilities of an information lifecycle manager, according to an embodiment.

FIG. 2A shows a cluster node hibernation technique 2A00 as used in systems that hibernate and resume of a computing cluster node using facilities of an information lifecycle manager. As an option, one or more variations of cluster node hibernation technique 2A00 or any aspect thereof may be implemented in the context of the architecture and functionality of the embodiments described herein and/or in any environment.

The elastic computing use model supports running of a workload- or many instances of a workload—at such time as the computing corresponding to the workloads is needed. For example, a workload might be a virtual desktop, and the computing resources corresponding to running the virtual desktop might only be needed when the user is actually using the virtual desktop. As such it might be felicitous to release the computing resources corresponding to running the virtual desktop when the user is logged out or otherwise not actually using the virtual desktop. The cluster node hibernation technique 2A00 might be invoked when the user is logged out (i.e., when the user is deemed to be not actually using the virtual desktop). This cluster node hibernation technique extends to scenarios where there are many users running many virtual desktop machines on the same node. For example, all of the members of the "marketing team" might be assigned to respective virtual desktop machines that are hosted on the same node. It can happen that all of the members of the "marketing team" might be logged out, and might be logged out for an extended period (e.g., overnight, during "off hours", over the weekend, etc.). In such cases, it might happen that a user-agent 204 might raise a hibernate command 112. In some cases, the user-agent 204 is a module of the ILM.

In the embodiment shown, the information lifecycle manager hibernate operations 206 commence when a hibernate command is received into an information lifecycle manager module (step 208) then, responsive to the received hibernate command, the ILM issues instructions (step 210) to any operational elements such that the hibernate command is carried out and a hibernation object 211 is produced and stored in secure and persistent storage 209 for later retrieval in the context of a resume scenario. In some cases, the hibernation object 211 is stored in a persistent and secure storage facility that is geographically distant from the subject cluster, thus providing high availability aspects afforded by offsite storage.

The hibernation object may be organized using any known data storage techniques. Strictly as a nonlimiting example, a hibernation object can be organized in accordance with the descriptions of Table 2.

TABLE 2

| Hibernation object organization | | |
|---|---|---|
| Type | Contents | Data Representation |
| Owner | Parent cluster ID | Text or number |
| Node Manifest | Node IDs | Text or numbers |
| VM Manifest | VM IDs | Text or numbers |
| Hypervisor Manifest | VMs [ ] and corresponding virtual resources [ ] | Array, nested arrays |
| Data State | Virtual resource persistent storage [ ] | Objects |
| Hypervisor State | Hypervisor settings | Hypervisor-specific data structure |
| Service State | Images [ ] and processor status words [ ] | Guest OS-dependent data structure |

Once the hibernate command has been carried out, a user interface module is triggered to advise the user-agent that the hibernate command has been completed (step 212). The particular partitioning of step 212 to be carried out by a user interface module (e.g., as depicted by the boundary of user interface module operations 214) is merely one example partitioning and other partitions or operational elements may participate in operations that are carried out after the information lifecycle manager hibernate operations 206 have been completed.

The foregoing cluster node hibernation technique 2A00 contemplates that the node that had been hibernated and offloaded to a lower-tier storage site would be resumed at some later moment in time. A cluster node resume technique is shown and described as pertains to FIG. 2B.

Figure 2B:
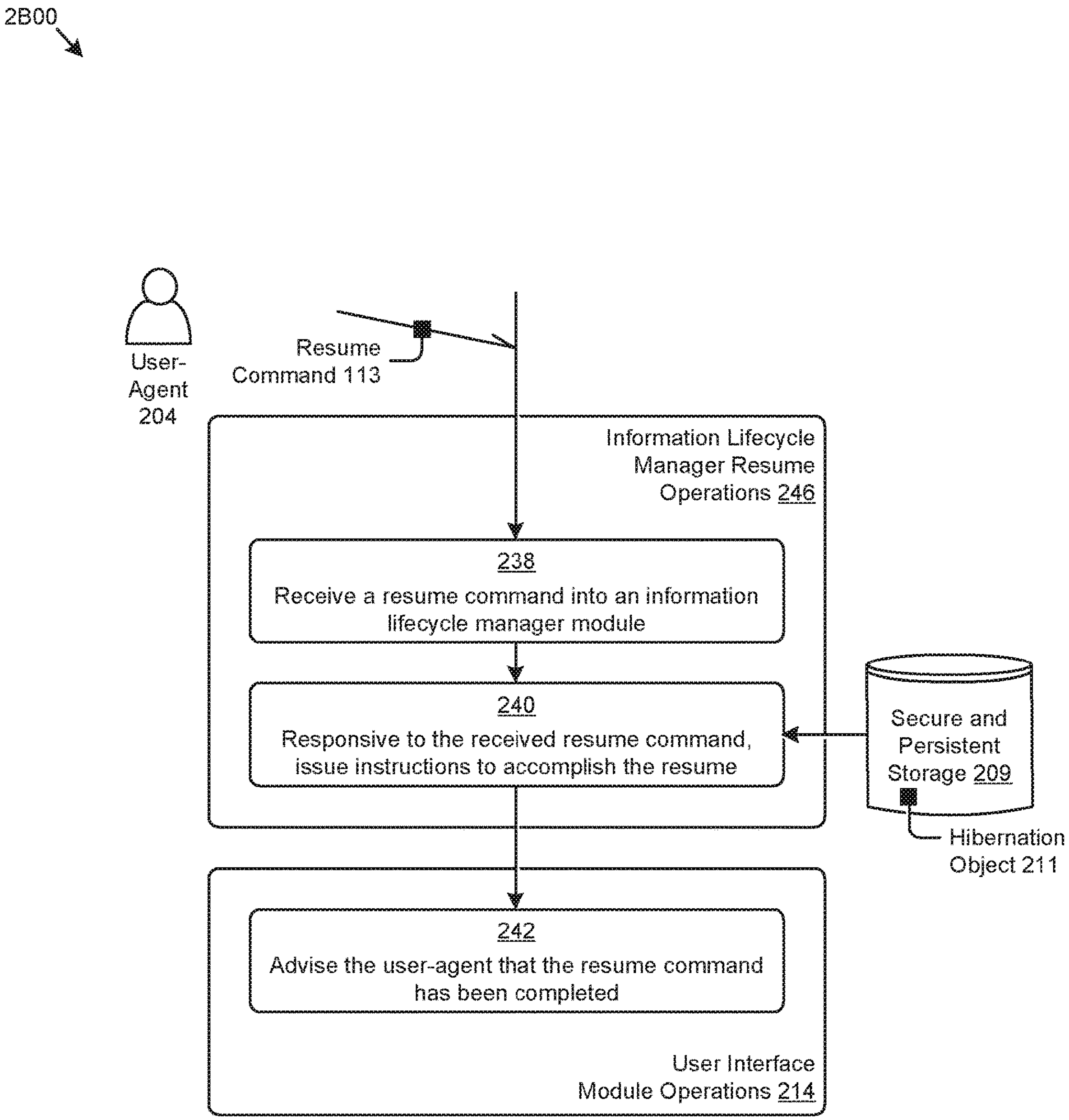
FIG. 2B shows a cluster node resume technique as used in systems that hibernate and resume of a computing cluster node using facilities of an information lifecycle manager, according to an embodiment.

FIG. 2B shows a cluster node resume technique 2B00 as used in systems that hibernate and resume of a computing cluster node using facilities of an information lifecycle manager. As an option, one or more variations of cluster node resume technique 2B00 or any aspect thereof may be implemented in the context of the architecture and functionality of the embodiments described herein and/or in any environment.

As heretofore discussed, it can happen that all of the members of a marketing team might be logged out, and might be logged out for an extended period (e.g., overnight, during "off hours", over the weekend, etc.); however, that period will eventually expire and it might be that some or all of the members of the marketing team might again want to use their virtual desktop machine. In such a case, it might happen that a user-agent 204 might raise a resume command 113.

As shown, the information lifecycle manager resume operations 246 commence when the resume command 113 is received into an information lifecycle manager module (step 238) then, responsive to the received resume command, the information lifecycle manager issues instructions (step 240) to any operational elements such that the resume command is carried out. Once the resume command has been carried out, a user interface module is triggered to advise the user-agent that the resume command has been competed (step 242). Step 242 may be carried out by any operational element, including by a user interface module. The shown partitioning is merely one example partitioning and other partitions or operational elements may participate in operations that are carried out after the information lifecycle manager resume operations 246 have been completed. Other partitions are shown and described as pertains to the system of FIG. 3A.

Figure 3A:
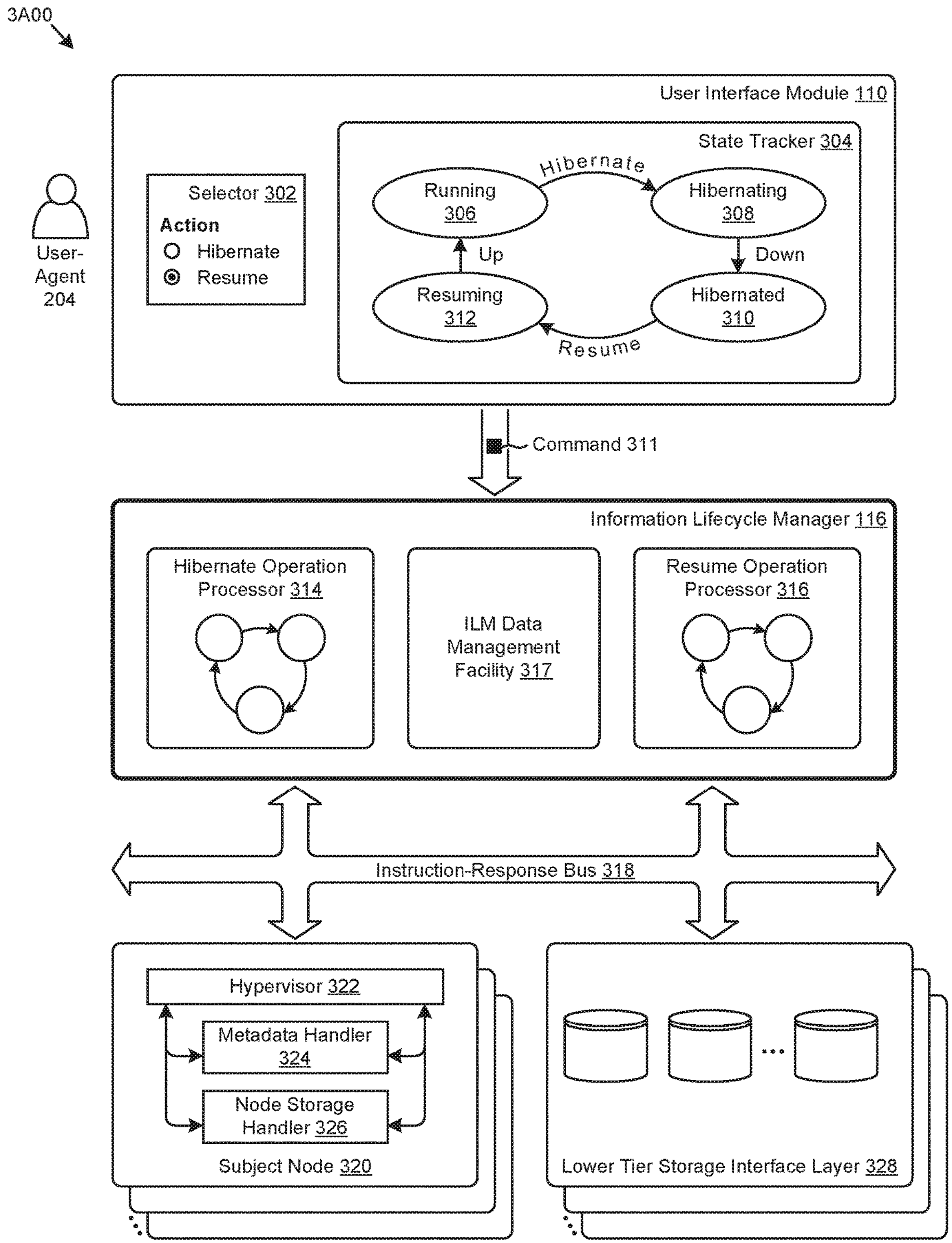
FIG. 3A depicts a system for hibernating and resuming a computing cluster using facilities of an information lifecycle manager, according to an embodiment.

FIG. 3A depicts a system 3A00 for hibernating and resuming a computing cluster using facilities of an information lifecycle manager. As an option, one or more variations of system 3A00 or any aspect thereof may be implemented in the context of the architecture and functionality of the embodiments described herein and/or in any environment.

The figure is being presented to offer one possible system-level partitioning. As shown, a user interface module receives indications from a user-agent 204 and raises a command 311 that is processed by information lifecycle manager 116. The information lifecycle manager can, in turn, conduct communications (e.g., over instruction-response bus 318) with any instance of a subject node 320 and/or with any instance of a lower tier storage interface layer 328.

In this particular embodiment, the user interface module 110 includes a state tracker 304 that keeps track of movements between states of representative components of a virtualization system (e.g., the hypervisor 322, metadata handler 324, node storage handler 326, etc.). The particular states of representative components of a virtualization system (e.g., running 306, hibernating 308, hibernated 310, and resuming 312) are tracked in a manner such that an interface (e.g., selector 302) can be presented to a user-agent 204. Based at least in part on the then-current state, and based at least in part on the possibilities for a next state, the selector 302 offers only the possible options. In some embodiments, the possible options are presented in a graphical user interface. In other embodiments, the possible options are accessible by an application programming interface (API).

As shown, the information lifecycle manager includes a hibernate operation processor 314 and a resume operation processor 316. The hibernate operation processor 314 keeps track of hibernation states as well as instructions and responses that are sent and received over the instruction-response bus, whereas the resume operation processor 316 keeps track of resume states as well as instructions and responses that are sent and received over the instruction-response bus. In some scenarios, the instructions that are sent over the instruction-response bus correspond to specified intents. As such, the movement from state to state within information lifecycle manager 116 can occur asynchronously. Moreover, in event of a timeout before moving from one state to another state, any of the specified intents can be remediated based on a set of then-current conditions.

Further details regarding general approaches to hibernating and resuming a hypervisor are described in U.S. Pat. No. 10,558,478 titled "SPECIFICATION-BASED COMPUTING SYSTEM CONFIGURATION", filed on Dec. 14, 2017, which is hereby incorporated by reference in its entirety.

As earlier indicated, the ILM can carry out communications with any instance or number of instances of subject nodes. In some cases, a subject node of a resume operation is the same type of node as was the subject node of the hibernate operation. In other cases, a subject node of a resume operation will be a different type of node as was the subject node of the hibernate operation. In either case, the hibernate operation and restore operation can be facilitated by a hypervisor save function and a hypervisor restore function.

Figure 3B:
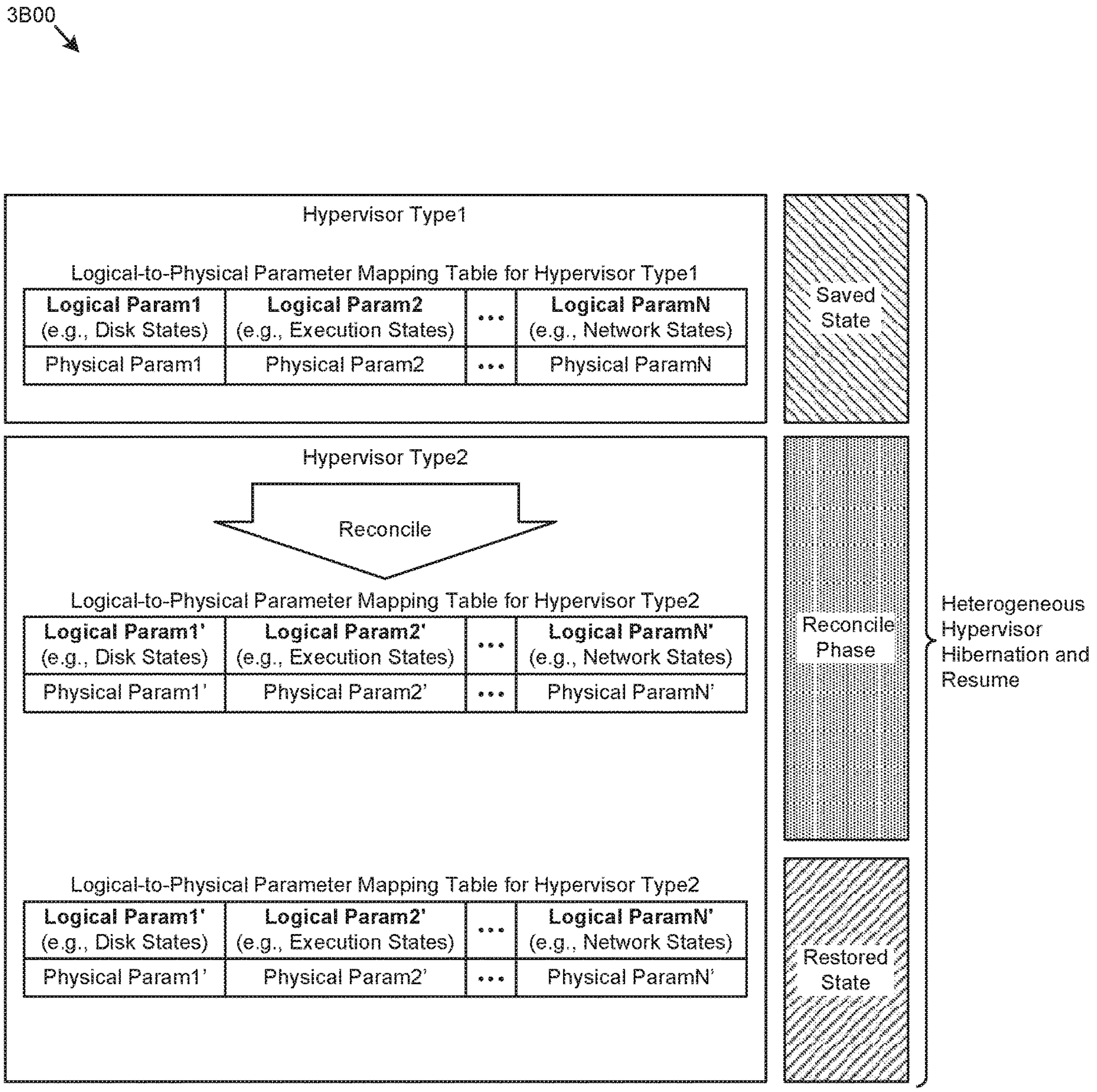
FIG. 3B depicts a hypervisor parameter reconciliation technique for hibernating and resuming a between heterogeneous nodes, according to an embodiment.

FIG. 3B depicts a hypervisor parameter reconciliation technique 3B00 for hibernating and resuming between heterogeneous nodes, according to an embodiment. As an option, one or more variations of technique 3B00 or any aspect thereof may be implemented in the context of the architecture and functionality of the embodiments described herein and/or in any environment.

The figure is being presented to show how a hypervisor parameter reconciliation technique 3B00 can be applied when implementing hypervisor save and restore techniques across heterogenous hypervisors platforms. FIG. 3B illustrates aspects pertaining to hibernating a hypervisor and its virtual machine before moving the virtual machine and its hypervisor states to a different host computing system. Specifically, the figure is being presented with respect to its contribution to addressing the problems of quiescing and moving a virtual machine and its hypervisor states to a different type of hypervisor.

The embodiment shown in FIG. 3B is merely one example. The hypervisor parameter reconciliation technique depicts how logical parameters are mapped to physical parameters. When hibernating a first hypervisor of a first type in advance of moving the states to a second hypervisor of a second type, various logical parameters pertaining to the first hypervisor type are mapped to the physical parameters of the second hypervisor. Then, when the restore function of the second hypervisor is invoked, the reconciled logical parameters are restored into the second hypervisor, thus recreating the state of the first hypervisor as of the time the first hypervisor was hibernated.

Further details regarding general approaches to hibernating and resuming a hypervisor are described in U.S. patent application Ser. No. 16/778,909 titled "HYPER VISOR HIBERNATION", filed on Jan. 31, 2020, which is hereby incorporated by reference in its entirety.

Figure 4A:
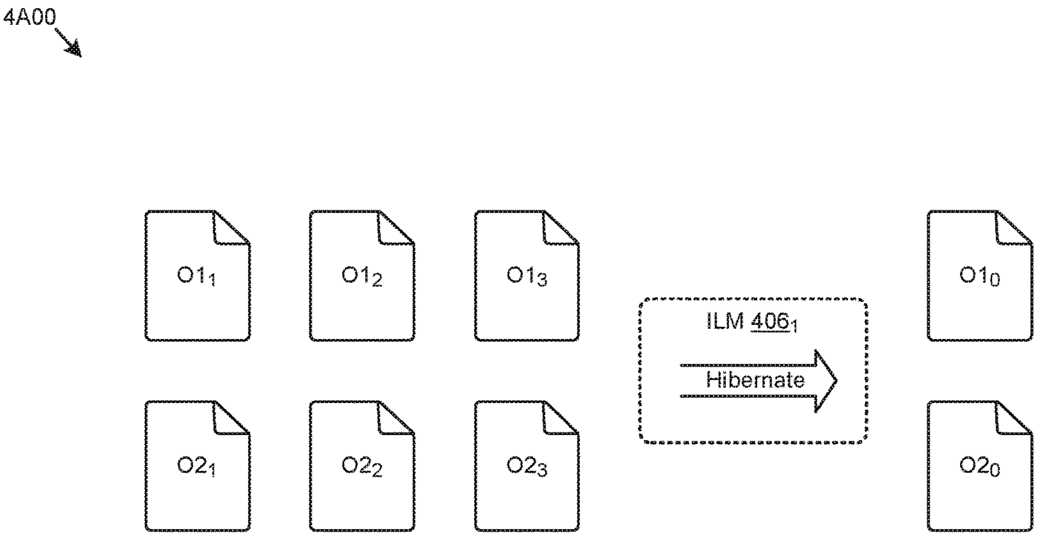
FIG. 4A exemplifies a data space conservation technique as applied when hibernating a computing cluster using facilities of an information lifecycle manager, according to an embodiment.

FIG. 4A exemplifies a data space conservation technique as applied when hibernating a computing cluster using facilities of an information lifecycle manager. As an option, one or more variations of data space conservation technique 4A00 or any aspect thereof may be implemented in the context of the architecture and functionality of the embodiments described herein and/or in any environment.

The figure is being presented to show how an information lifecycle manager can conserve data storage space when hibernating a computing cluster. The figure depicts merely one example of a high-availability configuration where a replication factor is activated; that is, where each object is replicated N number of times. An ILM has visibility into object creation and is thus able to implement a replication factor. Accordingly, since an information lifecycle manager has visibility into object creation and is able to implement a replication factor, it is also able to suppress unnecessary duplication of objects when hibernating.

In most scenarios, when an object is stored into an object storage facility of a cloud, that object is replicated by the cloud vendor, therefore it is unnecessary to replicate the replicas. This action to suppress unnecessary additional replication of an already replicated object is shown schematically where the three copies of object O1 (e.g., $\mathbf{O1}_1$, $\mathbf{O1}_2$, and $\mathbf{O1}_3$) are reduced to storage of only one copy of object O1 (e.g., $\mathbf{O1}_0$). This action by the hibernate operation of ILM $\mathbf{406}_1$ to suppress unnecessary additional replications is carried out over all objects (e.g., $\mathbf{O2}_1$, $\mathbf{O2}_2$, and $\mathbf{O2}_3$) of the cluster so as to reduce to storage of only one copy of each object (e.g., $\mathbf{O2}_0$) in the hibernation object.

The foregoing is merely one example of a policy or setting that can be comprehended and acted on by an ILM when responding to hibernation and resume commands. As additional examples, (1) the ILM can observe a privacy setting so as to perform data encryption or decryption when responding to hibernation and resume commands; (2) the ILM can exploit network infrastructure and conditions by performing parallel I/O transfers when responding to hibernation and resume commands; and (3) the ILM can interact with human-computer interfaces to show data movement progress monitoring when responding to hibernation and resume commands.

Figure 4B:
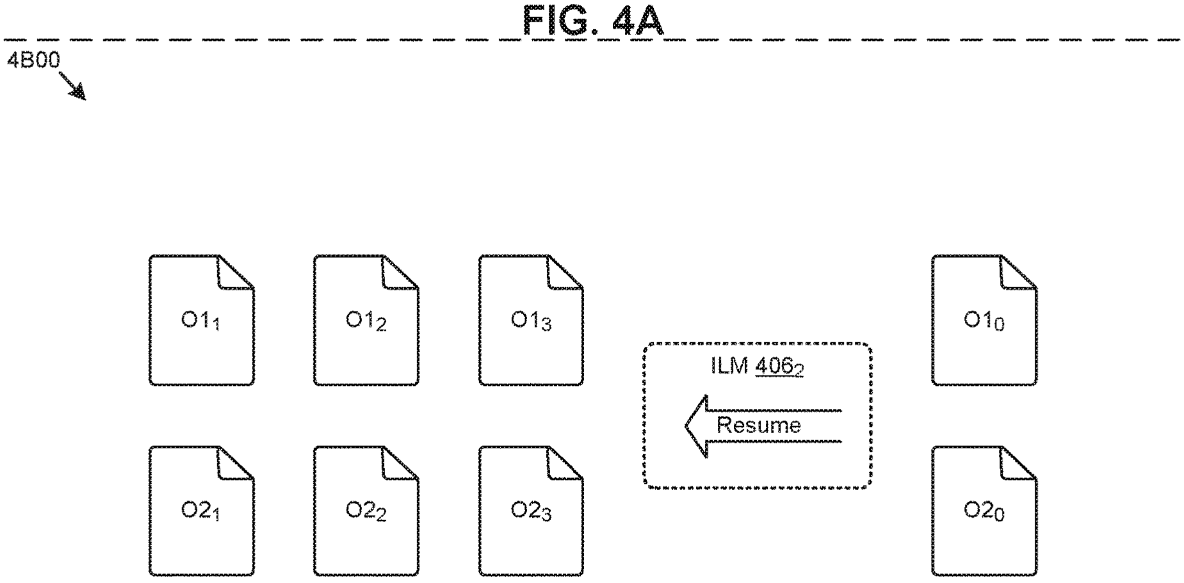
FIG. 4B exemplifies a high-availability data restoration technique as applied while resuming a computing cluster using facilities of an information lifecycle manager, according to an embodiment.

FIG. 4B exemplifies a high-availability data restoration technique 4B00 as applied while resuming a computing cluster using facilities of an information lifecycle manager. As an option, one or more variations of high-availability data restoration technique 4B00 or any aspect thereof may be implemented in the context of the architecture and functionality of the embodiments described herein and/or in any environment.

The figure is being presented to show how an information lifecycle manager can restore a high-availability configuration when resuming a computing cluster. The figure depicts merely one example of a high-availability configuration where a replication factor is re-activated when resuming a computing cluster. In most scenarios, when an object is stored into an object storage facility of a cloud, that object is replicated by the cloud vendor, therefore it is generally unnecessary to replicate the replicas. However, when resuming a cluster after hibernation, the replication factor that had been in force at the time of or immediately prior to hibernation is to be restored. As such, the former action (i.e., during hibernation) to suppress unnecessary additional replications of an already replicated object is reversed. Specifically, and as shown, the three copies of object O1 (e.g., object $\mathbf{O1}_1$, object $\mathbf{O1}_2$, and object $\mathbf{O1}_3$) that had been reduced to storage of only one copy of object O1 (e.g., object $\mathbf{O1}_0$) are brought back into the resumed cluster with the same high-availability (e.g., replication factor) configuration as was present at the time of hibernation. This is depicted by the resume operation of ILM 4062 where single copies of objects (e.g., object $\mathbf{O1}_0$ and object $\mathbf{O2}_0$) are brought back into the resumed cluster as resumed (restored) objects (e.g., object $\mathbf{O1}_1$, object $\mathbf{O1}_2$, object $\mathbf{O1}_3$, object $\mathbf{O2}_1$, object $\mathbf{O2}_2$, and object $\mathbf{O2}_3$).

Figure 5:
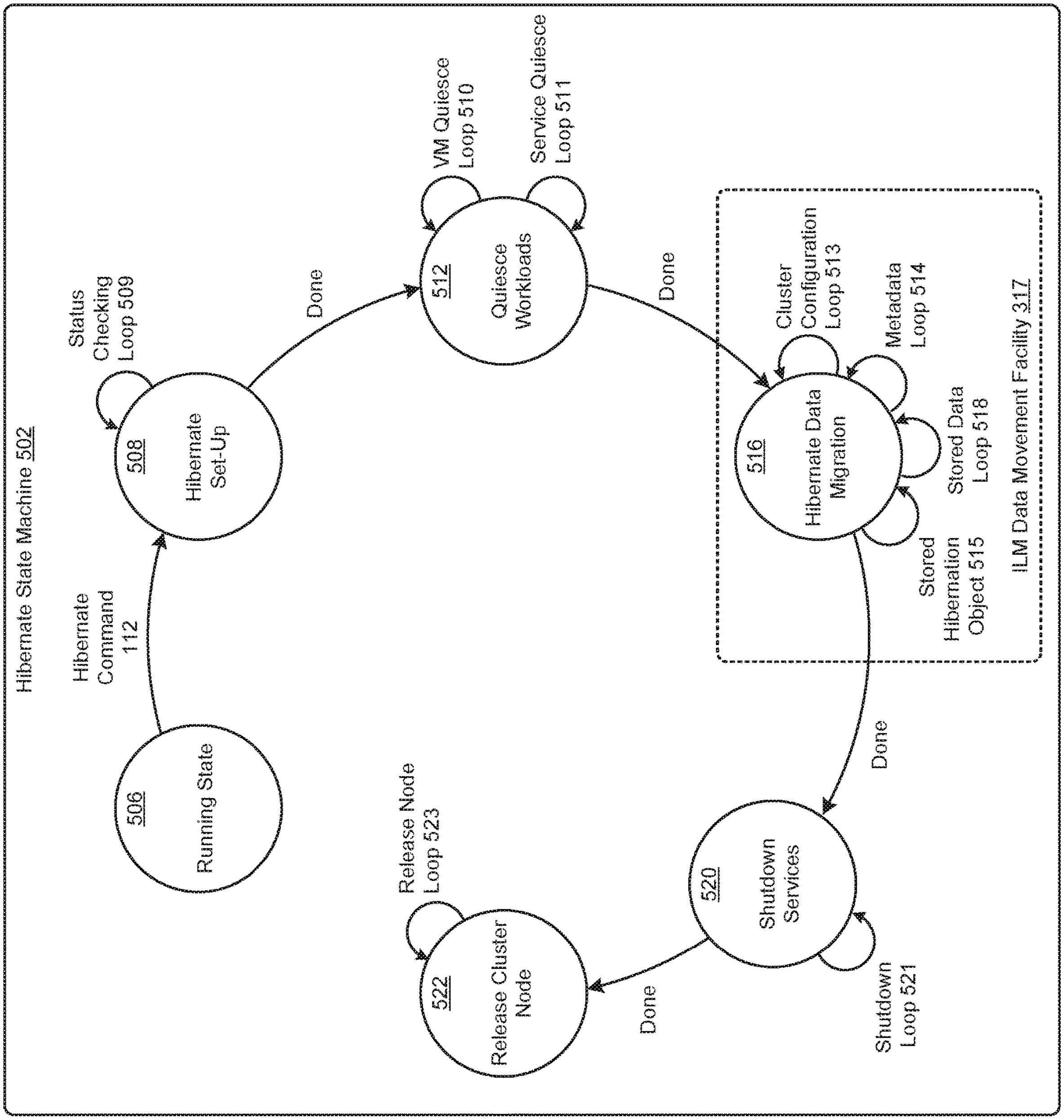
FIG. 5 depicts a state machine that implements a hibernate command as used for hibernating a node in systems that hibernate and resume of a computing cluster node using facilities of an information lifecycle manager, according to an embodiment.

FIG. 5 depicts a hibernate state machine 502 that implements a hibernate command as used for hibernating a node in systems that hibernate and resume a computing cluster node using facilities of an information lifecycle manager. As an option, one or more variations of hibernate state machine 502 or any aspect thereof may be implemented in the context of the architecture and functionality of the embodiments described herein and/or in any environment.

The figure is being presented to illustrate how certain of the operations to carry out a cluster hibernation command 112 can be carried out within an information lifecycle manager. More specifically, the figure is being presented to provide an example of how the state transitions involved in carrying out a cluster hibernation command can be handled within a hibernate state machine 502 that may be situated within an information lifecycle manager. The state machine transitions from state to state, from a running state 506 through to a state where the cluster node has been saved (state 516) such that the computing resources of the cluster node can be released (state 522).

As shown, a hibernate state machine 502 moves from a running state (e.g., state 506) to a hibernate set-up state (e.g., state 508) upon receipt of a hibernate command 112. Processing within this hibernate set-up state includes looping (e.g., in a status checking loop 509) to confirm that the conditions needed for movement into a quiesced state are present. This is because there are many asynchronous events happening in a running cluster, including cluster configuration changes.

Processing within the hibernate set-up state including the aforementioned looping ensures that the configuration of the cluster is stable. For example, the tests of status checking loop 509 may be configured to observe any in-process cluster node add or cluster node delete operations, and continuously loops until the cluster node constituency is stable. When the cluster node constituency is stable, the hibernate state machine moves to state 512 where quiescence operations are carried out in VM quiesce loop 510 and in service quiesce loop 511. More specifically, any of the virtual machines and/or services that had been running on the cluster are signaled to quiesce and to report achievement of their quiescence to the ILM. A quiescent state of a virtual machine includes at least that any formerly in-process computing and I/O (input/output or IO) has been completed or suspended.

As such, the operational states of the virtual machines and their data (e.g., user data, system data, metadata) are known and unchanging. When this is accomplished, the hibernate state machine moves to the hibernate data migration state (e.g., state 516) where the ILM data movement facility 317 serves to perform data movement. Since the ILM has visibility into all aspects of user and system data creation, metadata creation, in-flight data and metadata movement, storage tier capacities, storage tier I/O capabilities, then-current utilization, etc., the ILM can make decisions as to which data is to be saved into a hibernation object (e.g., stored hibernation object 515), and how the data is to be saved into the hibernation object.

In the shown embodiment, this is accomplished by operation of stored data loop 518 that moves user and system data into a hibernation object, by operation of cluster configuration loop 513 that moves details pertaining to the allocated resources into a system manifest portion of the hibernation object, and by operation of metadata loop 514 that moves metadata of the cluster into the hibernation object. Once all of the data and metadata of the quiesced cluster has been stored into the hibernation object, any still running (but quiesced) services of the cluster can be shutdown. During shutdown of services (e.g., in state 520), a shutdown loop 521 is entered such that any number of services can be shut down in any order as may be prescribed by any interrelationship between the services. When all of the services of the cluster have been successfully shut down, processing of the hibernate state machine 502 moves to the next state; specifically, to release the cluster node (state 522). A cluster comprised of a plurality of nodes and any amounts of other computing resources can be released in a loop (e.g., release node loop 523) such that multiple nodes of the subject cluster can be released back to the resource provider.

At this time, the entire state of the cluster node or nodes, including states of all hypervisors, all of its virtual machines, all of its virtual disks, etc. have been saved into a hibernation object which is stored into a secure and persistent location for later access (e.g., for responding to a cluster resume after hibernation command).

Figure 6:
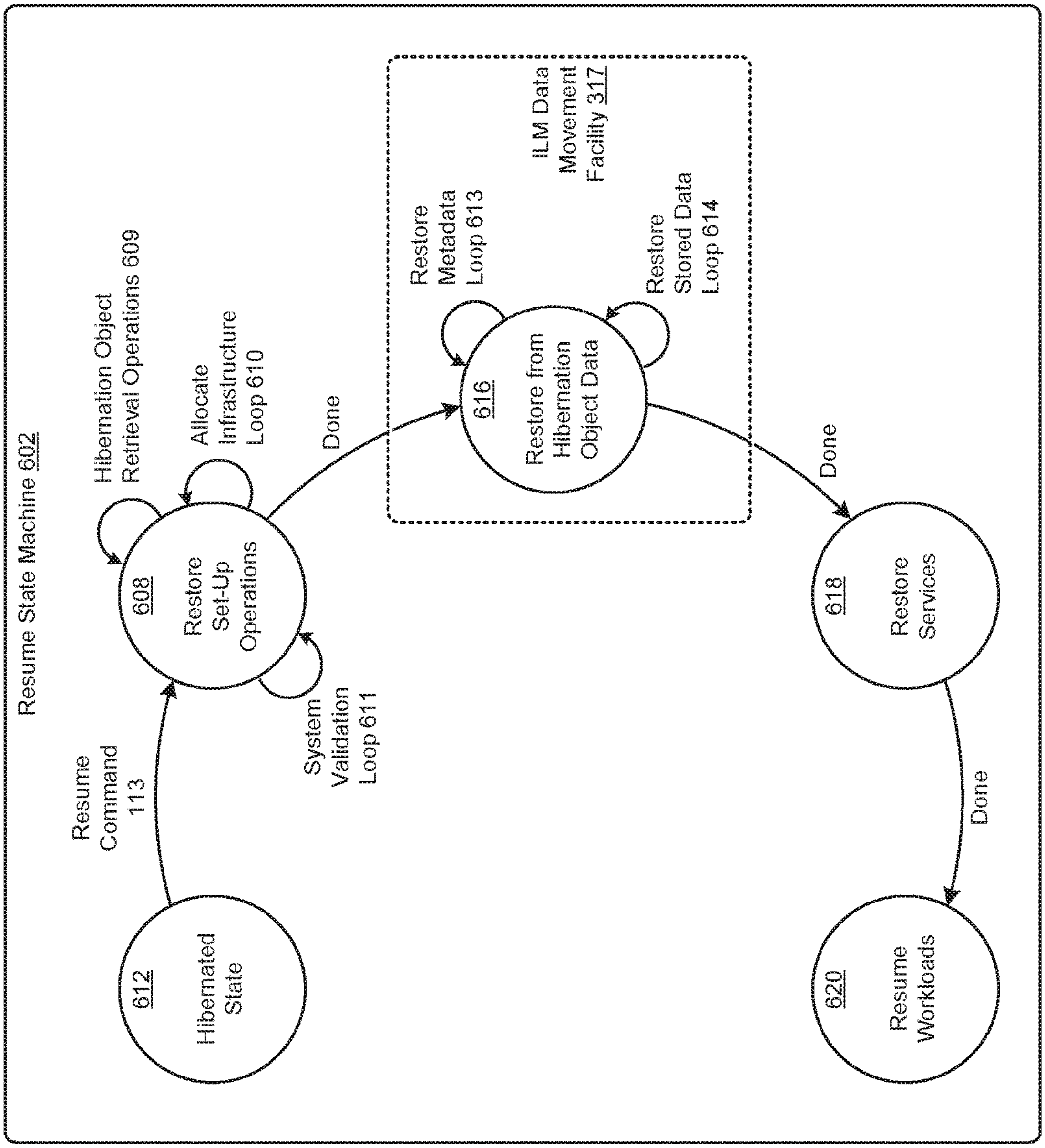
FIG. 6 depicts a state machine that implements a resume after hibernation command as used for resuming a node in systems that hibernate and resume of a computing cluster node using facilities of an information lifecycle manager, according to an embodiment.

FIG. 6 depicts a resume state machine 602 that implements a resume after hibernation command as used for resuming a node in systems that hibernate and resume of a computing cluster node using facilities of an information lifecycle manager. As an option, one or more variations of resume state machine 602 or any aspect thereof may be implemented in the context of the architecture and functionality of the embodiments described herein and/or in any environment.

The figure is being presented to illustrate how the operations involved to carry out a cluster resume command 113 can be carried out within the information lifecycle manager. More specifically, the figure is being presented to provide an example of how the state transitions involved to carry out a cluster resume command can be handled within a resume state machine 602 that is situated within an information lifecycle manager. The resume state machine transitions from state to state as shown, such as from a hibernated state 612 through to a state where the cluster has been restored (state 616) to a condition such that workloads on the cluster can be resumed (state 620).

As a result of traversal through the foregoing hibernate state machine 502 of FIG. 5, a hibernation object is created and stored. Safe storage of a hibernation object may continue indefinitely, which corresponds to hibernated state 612. Upon receipt of a resume command 113, the resume state machine 602 transitions to state 608 corresponding to restore set-up operations. During the performance of the restore set-up operations, the hibernation object corresponding to the cluster to be resumed is retrieved via hibernation object retrieval operations 609, and an allocate infrastructure loop 610 is entered. As earlier described, the hibernation object contains system configuration information as pertains to the computing resources that had been allocated prior to hibernation. As such, information in the hibernation object can be accessed so as to again allocate the needed computing resources.

It often happens that a later allocation of a node or resource is not the same node or resource of a previous allocation. In fact, it often happens that any new allocation request for a node or resource would be satisfied by the resource provide with a pristine resource. Since the computing resource returned in response to an allocation request is not, in most cases, the same computing resource as was previously released, the restore set-up operations include a system validation loop 611, which loops through the contents of the system manifest portion to validate that the newly-allocated computing resource is sufficiently configured to serve as a replacement for the previously released computing resource.

When all of the needed newly-allocated computing resources have been deemed to be sufficiently configured to serve as a replacement for the previously released computing resources, then the state machine moves to a restore from hibernation object data state (state 616) of the shown ILM data movement facility 317. Since the ILM has visibility into all aspects of user and system data creation, metadata creation, in-flight data and metadata movement, storage tier capacities, storage tier I/O capabilities, then-current utilization, etc., the ILM can make decisions as to where data is to be restored from the hibernation object. In the shown embodiment, this is accomplished by state 616 that serves to restore data from the hibernation object. During the course of restoring data from the hibernation object (state 616), two loops are entered. The two loops correspond to restoring data from the stored hibernation object to the newly-allocated resource (restore stored data loop 614) and restoring metadata from the stored hibernation object to the newly-allocated resource (restore metadata loop 613). The loops can be entered multiple times depending on the nature of the data states being restored (e.g., entering restore stored data loop 614 once for each vDisk that was indicated in the hibernation object). Moreover, the operations pertaining to each loop can be performed sequentially, or in parallel, or in an interleaved manner.

Upon completion of restoring data from the hibernation object, the restore services state (state 618) is entered, whereupon services that were running on the node prior to hibernation are restarted. Upon completion of restarting the services that were running on the node prior to hibernation, the resumed node or nodes of the cluster are operational and the workloads that were running on the cluster prior to hibernation of the node or nodes can be resumed (state 620) from exactly the same state as when the workloads were quiesced during hibernation.

Additional Embodiments of the Disclosure

Figure 7A:
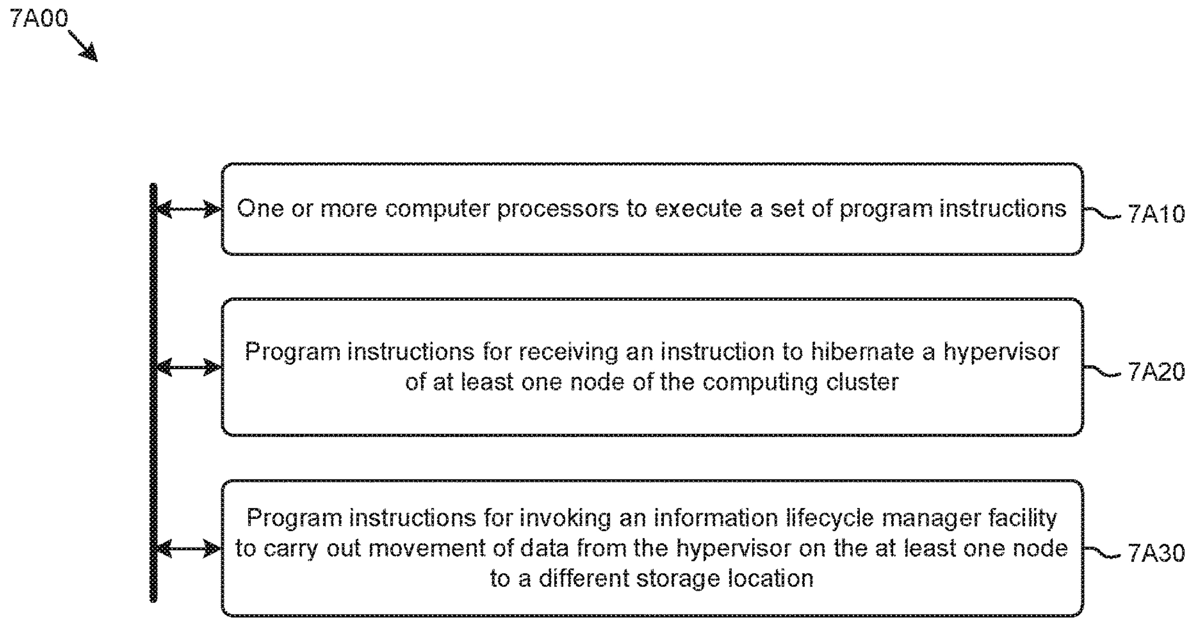
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address determining which data is "hot" or "cold" and when and how migration of such data should be carried out. The partitioning of system 7A00 is merely illustrative and other partitions are possible.

As shown, the system 7A00 includes a computer processor to execute a set of program instructions (module 7A10). The computer processor implements a method for hibernating a portion of a computing cluster by: receiving an instruction to hibernate a hypervisor of at least one node of the computing cluster (module 7A20); and invoking an information lifecycle manager facility to carry out movement of data from the hypervisor on the at least one node to a different storage location (module 7A30).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
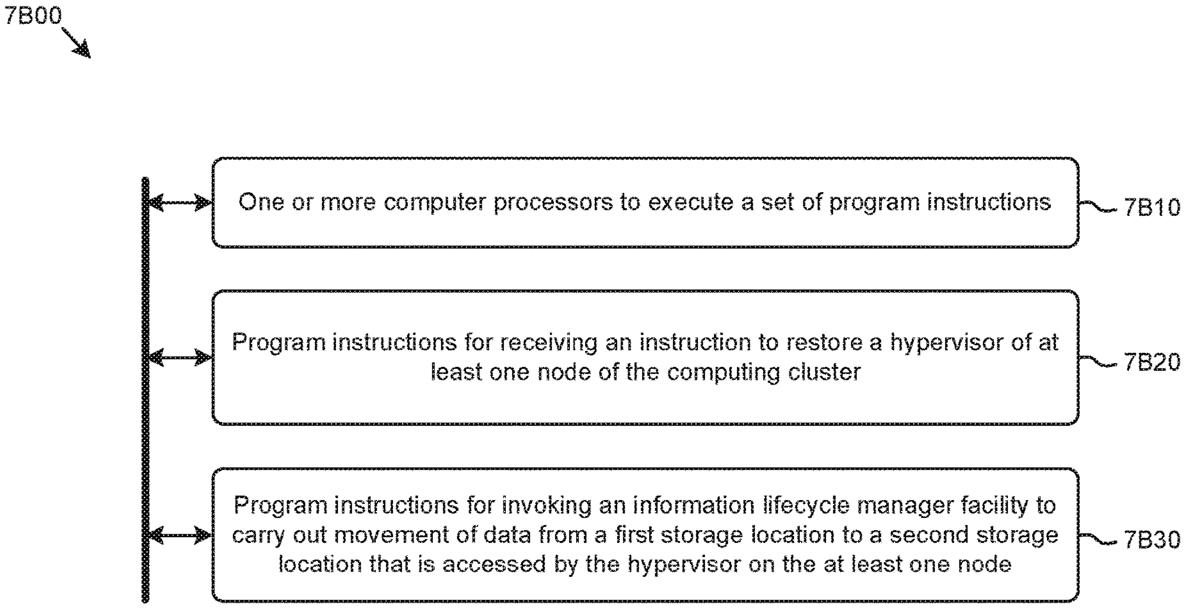

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible.

As shown, the system 7B00 includes a computer processor to execute a set of program instructions (module 7B10). The computer processor implements a method for restoring a portion of a computing cluster by: receiving an instruction to restore a hypervisor of at least one node of the computing cluster (module 7B20); and invoking an information lifecycle manager facility to carry out movement of data from a first storage location to a second storage location that is accessed by the hypervisor on the at least one node (module 7B30).

The foregoing are merely illustrative implementation examples. Many variations, implementations and use cases are possible, some aspects of which are discussed hereunder.

Additional Implementation Examples

Cluster Node Configuration and Overall System Configuration Data In Controller Virtual Machines A configuration is stored in a controller virtual machine's root disk and in a cluster configuration maintenance facility. When hibernating:

1. Cluster node configuration and overall system configuration data is saved and persisted for easy access since these files are accessed early in a node restart sequence;
2. Data path logs (e.g., for maintenance of high-availability) are saved;
3. User data is saved; and
4. Metadata pertaining to any of the foregoing data is saved in a manner for later restoration.

Hibernate Sequence

1. Get command to hibernate;
2. Change state to hibernating;
3. Call cloudProviderAPI_tools with argument "persist";
4. Call cloudProviderAPI_tools with "prepare-hibernate".

Restore Sequence

1. Call cloudProviderAPI_process_disk;
2. Call cloudProviderAPI_process_startup;
3. Bring-up state machine.

Handling Metadata and vDisk Data

Some embodiments migrate user data from storage device instances to cloud object storage (e.g., to geographically distant object storage sites). By using the ILM to transfer data, the cognizance of the ILM is inherent. Specifically, features inherent in an ILM include dealing with (i) parallel IO transfers; (ii) progress monitoring; (iii) encryption; (iv) ability to transfer data in/out while VMs are still running; etc. Moreover, the ILM can transfer data from storage devices to cloud object storage-based storage by moving the extents from source to destination disks. In some embodiments, a cloud object storage based extent group manager is added to the cluster while hibernating and resuming. The objects stored can be composed of extent groups and their corresponding metadata.

Multi-Cloud Management Facility: Gateway-Implemented Cluster Hibernate/Resume Examples After the multi-cloud management facility has put the cluster in 'Hibernating' state a gateway on the cluster drives an internal state machine for the cluster. The gateway uses the cluster configuration maintenance facility to maintain the current cluster state and also to communicate the state to other services in the cluster. All services participating in the hibernate operations are configured to be able to watch for state transitions.

In the following Table 3, state transitions from kStateXDone to kStateX+1 are processed by a gateway. The gateway watches for the state to move from kStateX to kStateXDone.

TABLE 3

| Start State -> End State | Operation |
|---|---|
| kRunning -> kHibernateSetup | Multi-cloud management facility sends a hibernate command to the gateway via a cluster agent.<br>The gateway executes hibernate pre-checks.<br>The gateway hibernate workflow sets cluster state == kHibernateSetup.<br>The cluster agent responds to multi-cloud management facility. |
| kHiberanteSetup -> kHibernateOplog | The gateway stops all I/O.<br>The gateway adds cloud object storage based cloud storage. |
| kHibernateOplog -> kHibernateOplogDone | The ILM drains caches (e.g., pertaining to vDisks, data path logs, etc.). |
| kHibernateData -> kHibernateDataDone | The ILM migrates all data to a cloud storage tier. |
| kHibernateMetadata_Handler -> kHibernateMetadata_HandlerDone | The gateway shuts down all cluster services that use a metadata handler.<br>The gateway flushes the metadata handler memory tables.<br>The gateway shuts down all services.<br>Host agent reports to multi-cloud management facility that cluster services are down.<br>The gateway runs routines to hibernate the metadata handler on all nodes and waits for all nodes to report completion. |
| kHibernateDone | The gateway reports "cluster_stopped". |

Cluster Resume State Machine

A resume workflow starts with the customer clicking the 'resume' button on a console. The multi-cloud management facility creates nodes and instances. Each node goes through the state machine as noted above. Each node starts by going to the 'Cluster Node State'.

In the following Table 4, all state transitions from kStateXDone to kStateX+1 are initiated by the gateway. The gateway waits for the state to move from kStateX to kStateXDone.

TABLE 4

| Start State -> End State | Operation |
|---|---|
| kHibernateDone -> kRestoreMetadata_Handler | The gateway starts the cluster after the metadata handler is up and does not bring up any new service that uses the metadata handler. The gateway validates that cloud tier disks are properly added. |
| kRestoreMetadata_Handler -> kRestoreMetadata_HandlerDone | The gateway executes a restore_the metadata routine on all nodes. The gateway waits for restore_the metadata routine on all nodes to be complete. |
| kRestoreData -> kRestoreDataDone | ILM performs selective resume and/or partial scan. Migrate all data from cloud storage tier to the cluster. |
| kStartCluster -> kStartClusterDone | The gateway resumes other nodes of the cluster. The gateway responds to the cluster agent with an indication of the cluster state as RUNNING. |

Node Failure During Hibernate

1. ILM keeps a copy of data in local instance store.
2. Metadata handling: Copy the management tables from the secondary copy.
3. At resume time, use a metadata repair mode.

Node Failure During Resume

1. Abandon resume if failure happens.
2. Confirm that the disk ID of the cloud storage tier remains the same so that newly added instances (i.e., to handle node failures) are created from same snapshot.

Additional System Architecture Examples

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 8A, FIG. 8B, FIG. 8C, and FIG. 8D.

Figure 8A:
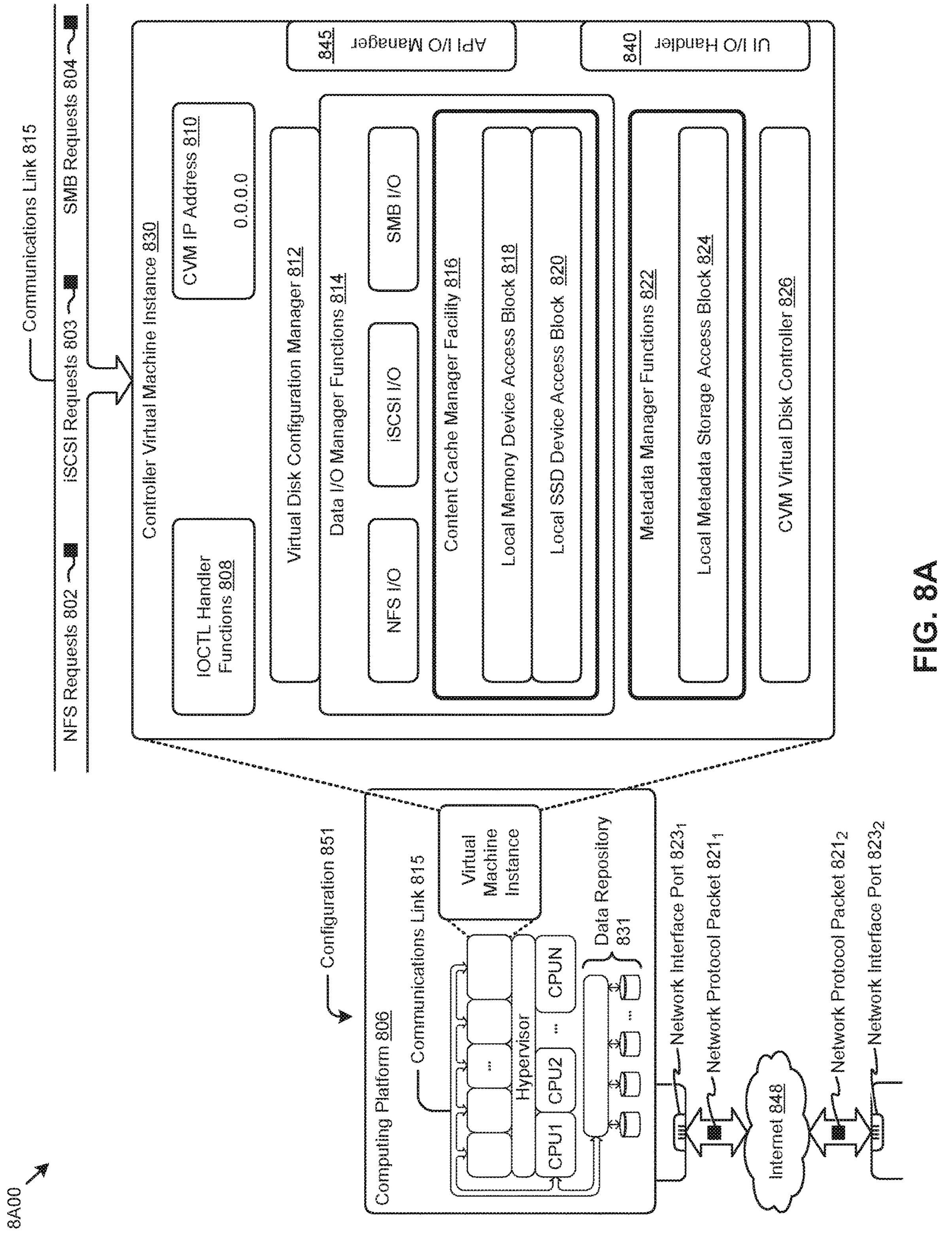
FIG. 8A, FIG. 8B, FIG. 8C, and FIG. 8D depict virtualization system architectures comprising collections of interconnected components suitable for implementing embodiments of the present disclosure and/or for use in the herein-described environments.

FIG. 8A depicts a virtualized controller as implemented in the shown virtual machine architecture 8A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, ISCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to hibernating and resuming a computing cluster using facilities of an ILM. In some embodiments, a module may include one or more state machines and/or combinational logic used to implement or facilitate the operational and/or performance characteristics pertaining to hibernating and resuming a computing cluster using facilities of an ILM.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of hibernating and resuming a computing cluster using facilities of an ILM. Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to hibernating and resuming a computing cluster using facilities of an ILM, and/or for improving the way data is manipulated when performing computerized operations pertaining to using built-in capabilities of an ILM to handle the movement of data to and from a cloud-tier storage facility.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
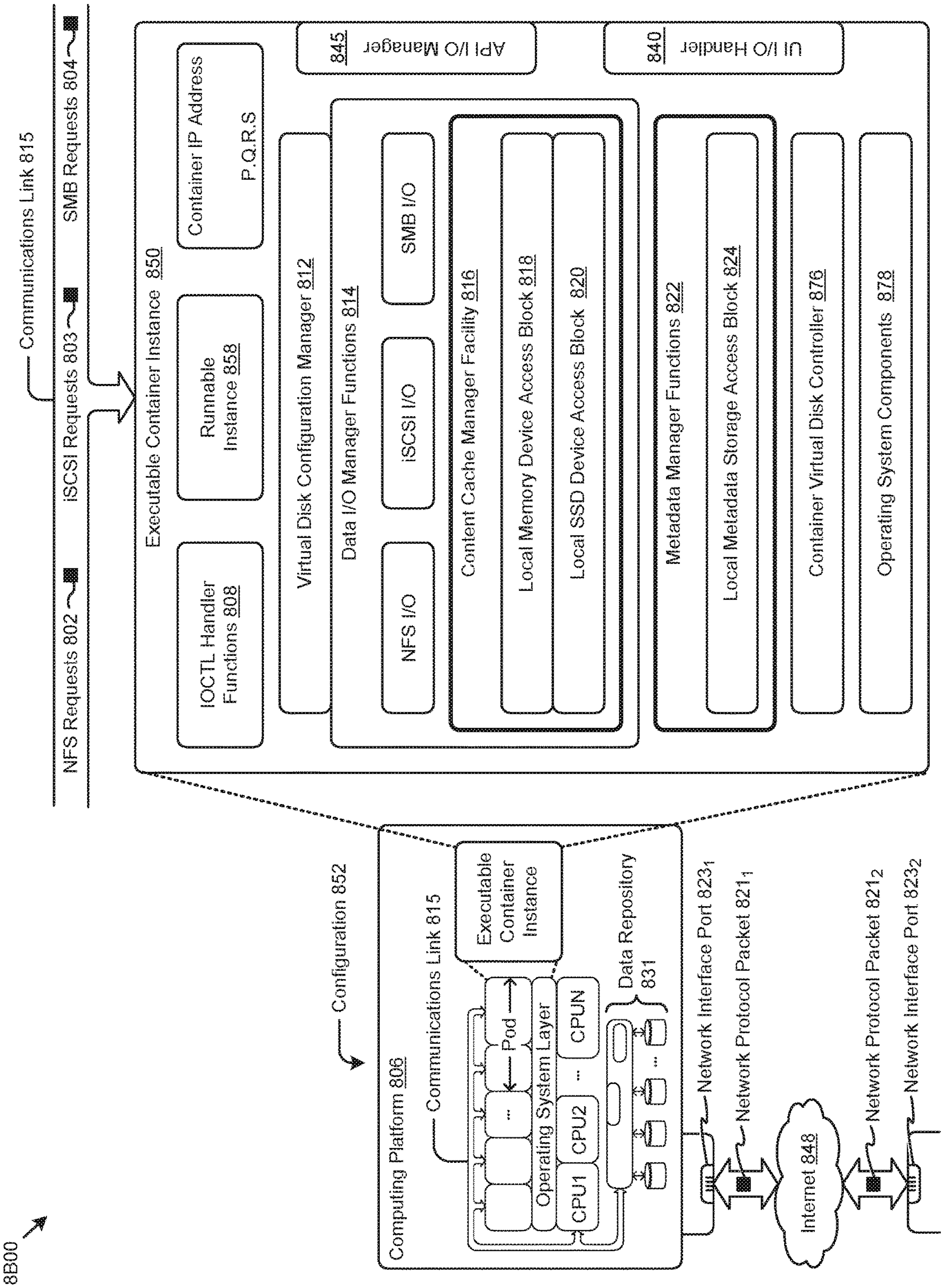

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "Is" or "Is-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
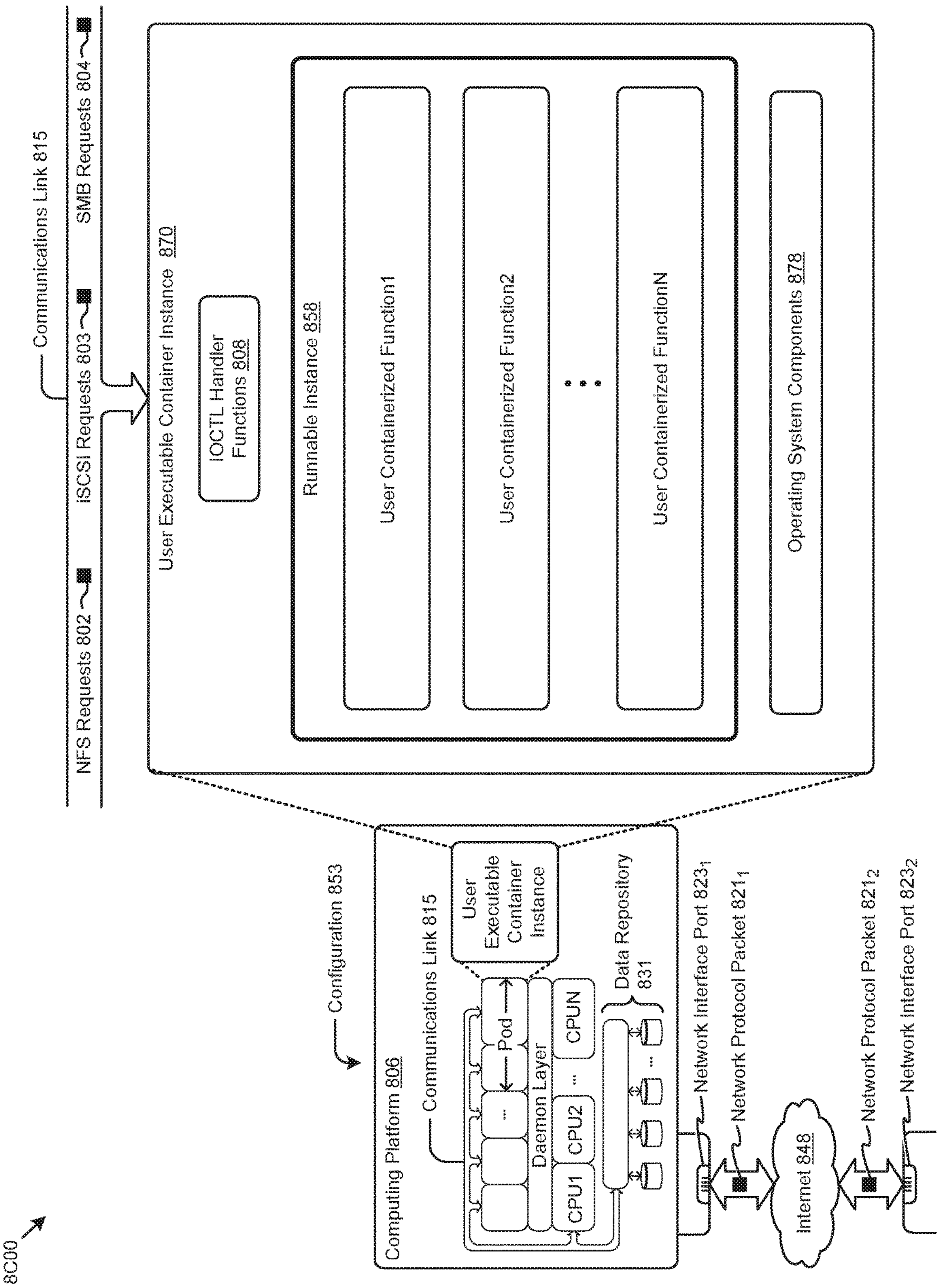

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 870. Configuration 853 includes a daemon layer (as shown) that performs certain functions of an operating system.

User executable container instance 870 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 870.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 8D:
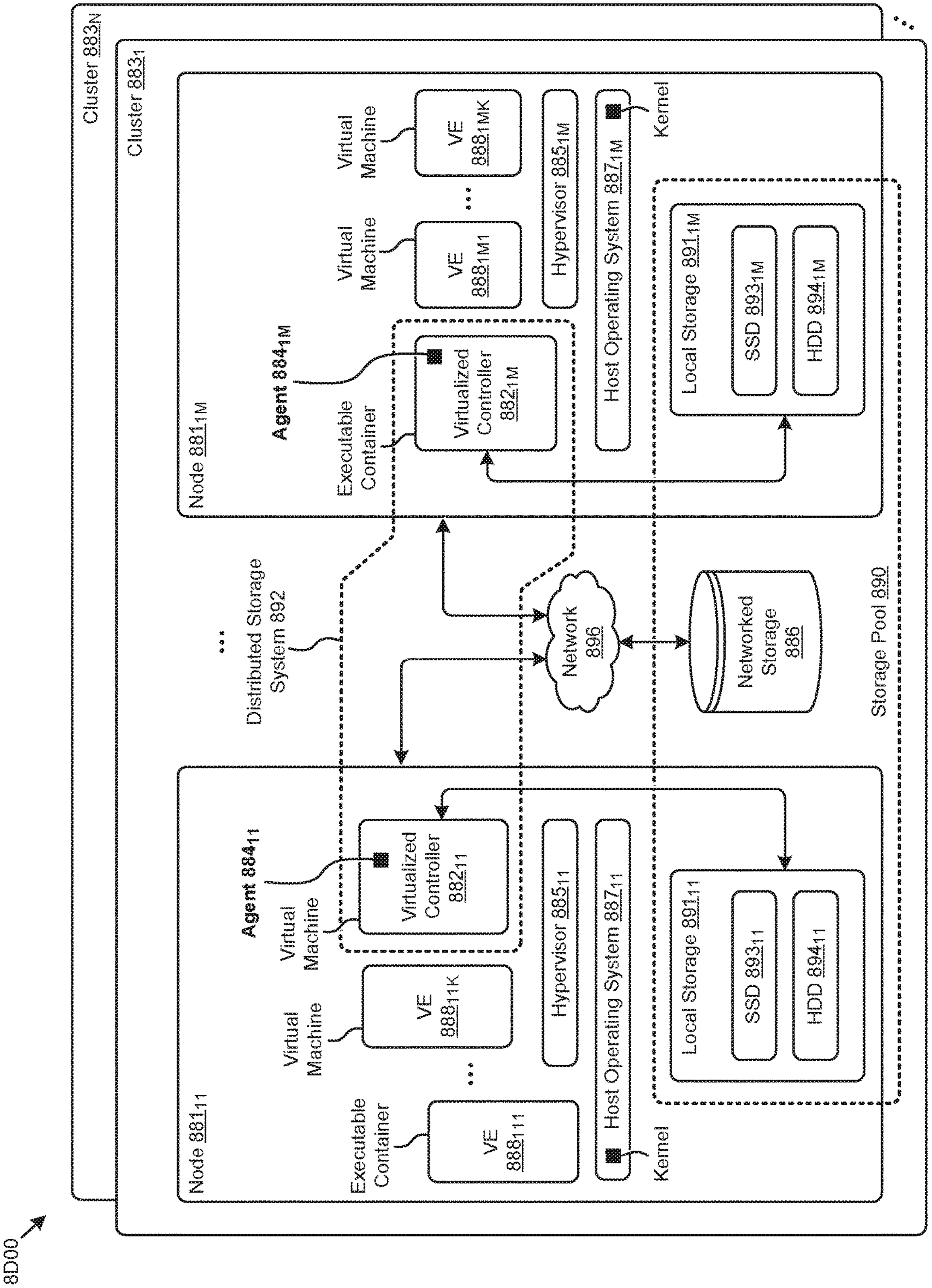

FIG. 8D depicts a distributed virtualization system in a multi-cluster environment 8D00. The shown distributed virtualization system is configured to be used to implement the herein disclosed techniques. Specifically, the distributed virtualization system of FIG. 8D comprises multiple clusters (e.g., cluster $\mathbf{883}_1$, . . . , cluster $\mathbf{883}_N$) comprising multiple nodes that have multiple tiers of storage in a storage pool. Representative nodes (e.g., node $\mathbf{881}_{11}$, . . . , node $\mathbf{881}_{1M}$) and storage pool 890 associated with cluster $\mathbf{883}_1$ are shown. Each node can be associated with one server, multiple servers, or portions of a server. The nodes can be associated (e.g., logically and/or physically) with the clusters. As shown, the multiple tiers of storage include storage that is accessible through a network 896, such as a networked storage 886 (e.g., a storage area network or SAN, network attached storage or NAS, etc.). The multiple tiers of storage further include instances of local storage (e.g., local storage $\mathbf{891}_{11}$, . . . , local storage $\mathbf{891}_{1M}$). For example, the local storage can be within or directly attached to a server and/or appliance associated with the nodes. Such local storage can include solid state drives (SSD $\mathbf{893}_{11}$, . . . , SSD $\mathbf{893}_{1M}$), hard disk drives (HDD $\mathbf{894}_{11}$, . . . , HDD $\mathbf{894}_{1M}$), and/or other storage devices.

As shown, any of the nodes of the distributed virtualization system can implement one or more user virtualized entities (e.g., VE $\mathbf{8881}_{11}$, . . . , VE $\mathbf{888}_{11K}$, . . . , VE $\mathbf{888}_{1M1}$, . . . , VE $\mathbf{888}_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $\mathbf{887}_{11}$, . . . , host operating system $\mathbf{887}_{1M}$), while the VMs run multiple applications on various respective guest operating systems. Such flexibility can be facilitated at least in part by a hypervisor (e.g., hypervisor $\mathbf{885}_{11}$, . . . , hypervisor $\mathbf{885}_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $\mathbf{887}_{11}$, . . . , host operating system $\mathbf{887}_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 890 by the VMs and/or the executable containers.

Multiple instances of such virtualized controllers can coordinate within a cluster to form the distributed storage system 892 which can, among other operations, manage the storage pool 890. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $\mathbf{881}_{11}$ can interface with a controller virtual machine (e.g., virtualized controller $\mathbf{882}_{11}$) through hypervisor $\mathbf{885}_{11}$ to access data of storage pool 890. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 892. For example, a hypervisor at one node in the distributed storage system 892 might correspond to software from a first vendor, and a hypervisor at another node in the distributed storage system 892 might correspond to a second software vendor. As another virtualized controller implementation example, executable containers can be used to implement a virtualized controller (e.g., virtualized controller $\mathbf{882}_{1M}$) in an operating system virtualization environment at a given node. In this case, for example, the virtualized entities at node $\mathbf{881}_{1M}$ can access the storage pool 890 by interfacing with a controller container (e.g., virtualized controller $\mathbf{882}_{1M}$) through hypervisor $\mathbf{885}_{1M}$ and/or the kernel of host operating system $\mathbf{887}_{1M}$.

In certain embodiments, one or more instances of an agent can be implemented in the distributed storage system 892 to facilitate the herein disclosed techniques. Specifically, agent $\mathbf{884}_{11}$ can be implemented in the virtualized controller $\mathbf{882}_{11}$, and agent $\mathbf{884}_{1M}$ can be implemented in the virtualized controller $\mathbf{882}_{1M}$. Such instances of the virtualized controller can be implemented in any node in any cluster.

Actions taken by one or more instances of the virtualized controller can apply to a node (or between nodes), and/or to a cluster (or between clusters), and/or between any resources or subsystems accessible by the virtualized controller or their agents.

Solutions attendant to using built-in capabilities of an ILM to handle the movement of data to and from a cloud-tier storage facility can be brought to bear through implementation of any one or more of the foregoing embodiments. Moreover, any aspect or aspects of determining which data is "hot" or "cold" and when and how migration of such data should be carried out can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

Cluster Hibernation

The following sections discuss approaches to hibernate clusters as provided herein. The approaches provided may be implemented using one or more control mechanisms. For example, the approaches provided herein may be implemented as part of or call by the approaches provided above (e.g., by a gateway process that manages the overall hibernate and resume flows using one or more state machines—such as those illustrated in FIGS. 5 and 6) Additional improvements are contemplated that can improve the functioning and efficiency of the cluster hibernation process as provided herein. Various permutations are provided for management of the process, including management by the previously discussed gateway or other management process.

Figure 9:
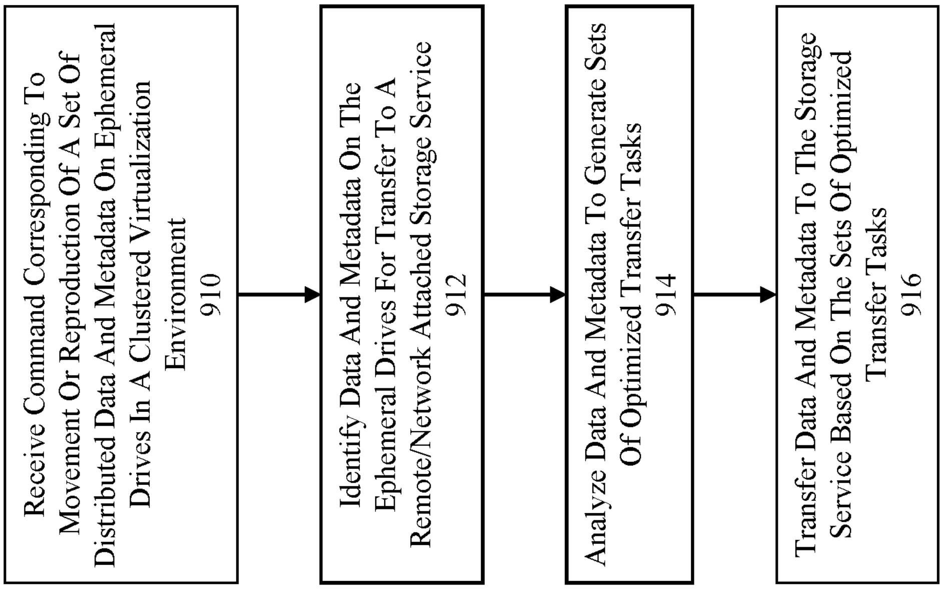
FIG. 9 illustrates an approach to hibernate ephemeral drives of a cluster according to an embodiment.

FIG. 9 illustrates an approach to hibernate ephemeral drives of a cluster according to an embodiment. Various aspects of the ephemeral drive hibernation process will be discussed below in regard to FIG. 9. Generally, the ephemeral drive hibernation process processes data and metadata on the ephemeral drives to determine an approach to transfer that metadata that is optimized (e.g., for total time for completion) which may include analysis of a single ephemeral drive or of multiple ephemeral drives as a collection.

At 910, a command corresponding to movement or reproduction of a set of distributed data and metadata on ephemerals drives in a clustered virtualization environment is received. For instance, such a command might identify one or more nodes in the clustered virtualization environment having one or more ephemeral drives that are to be migrated to a cloud or remote storage location (e.g., for persistent storage on a different, preferably less costly, computing resource). Generally, such an approach may be warranted when the underlying hardware resource (e.g., bare metal node) that the ephemeral drive is contained in or controlled by is being underutilized and thus resulting in wasted resources such as unnecessarily incurring rental costs from a third party or ongoing operating and maintenance costs. For instance, as part of a process to hibernate any number of nodes in the clustered virtualization environment, the state of each identified ephemeral drive might be captured in order to enable later restoration of the functional operation of that node or nodes. In some embodiments, the underlying hardware resources comprise bare metal nodes where a released bare metal node (e.g., released back to a cloud service provider or to a pool of free/available bare metal nodes) is returned to a bare state in which user/customer data previously on any ephemeral drives therein is wiped from those drives. Thus, a command corresponding to the movement or reproduction of the data and metadata therein might be received. In some embodiments, an ephemeral drive contains data, metadata, or both, necessary to the management of and access to a storage pool formed from a plurality of storage devices on respective nodes in a clustered virtualization environment as provided herein. In some embodiments, the ephemeral drive(s) contains data, metadata, or both necessary to the operations of a node—e.g., for an operating system, hypervisor, etc.

Additionally, as provided herein, the process may be predicated on any of the disclosed processes herein such as target storage setup, I/O control implementation, data management operations, or metadata capture. For instance, at a high level the process may be triggered at a gateway by a user providing a command to execute a hibernation process (e.g., to hibernate one or more nodes having ephemeral drives) and identifying a target location for storing a state of the hibernated ephemeral drives (see e.g., 910). In some embodiments, in response to the command to execute the hibernation process at a cluster, the process starts by setting up the target storage location for access or by verifying that said target storage location is already setup for access. If the target storage location is not successfully setup or verified the process may issue an error report and cancel the hibernation of at least the one or more nodes having ephemeral drives.

At 912, the data and metadata of each ephemeral drive corresponding to the command discussed in regard to 910 is identified. For example, in some embodiments a manifest file comprising a list or other data structure is created for cataloging the information contained within each respective node's ephemeral drives for the purpose of management of the movement/migration of the data and metadata to a remote/network attached storage service (e.g., cold storage, cloud storage, or a target storage location). In some embodiments, the manifest file catalogs the information contained within all respective ephemeral drives on corresponding nodes for the purpose of management of the movement/migration/reproduction of the data and metadata to a remote/network attached storage service (e.g., cold storage, cloud storage, or a target storage location). For instance, a manifest file is generated with one or more entries where each ephemeral drive is identified, each item (object, file, block, extent group, extent) in each of the ephemeral drives is identified, and each piece of metadata is identified. In some embodiments, the manifest file comprises multiple subsets (e.g., corresponding to a node or ephemeral drive). In some embodiments, a global manifest file is generated that represents all ephemeral drives to be migrated. In some embodiments, each item and each piece of data is identified by a separate entry (e.g., using a node ID, drive ID, item ID, Shard ID, or metadata ID). In some embodiments, the manifest file is maintained on the ephemeral drive or in memory of a corresponding node. Additionally, in some embodiments, one or more data fields are added to the manifest file to control the transfer of said files (e.g., a field for identifying the node that is to transfer the corresponding element and a transfer status).

At 914, the data and metadata are analyzed to generate sets of optimized transfer tasks. Generally, transferring information over a network is relatively reliable in that a majority of packets are usually transferred successfully—e.g., without uncorrectable corruption or loss of a connection. However, as the amount of data increases for any particular transfer the number of packets also increases. Thus, as the size of the transfer increases the likelihood that the transfer will fail also increases. Additionally, in some systems the total throughput can increase or decrease based on a number of connections from one location or network to another location or network. Thus, one approach to decrease the total amount of time required to transfer information (data or metadata) is to manage the number of threads or connections used to transfer that information potentially in combination with a size of the information being transferred. Additionally, in some embodiments, the ephemeral drives may include redundant data to that which is included in other ephemeral drives—e.g., to provide redundancy for data maintained in a cluster. Thus, generating of optimized transfer tasks may incorporate analysis of various characteristics of each node (e.g., the number of ephemeral drives, the amount of data and metadata therein, the network connection characteristics, which data or metadata is maintained redundantly at another node, etc.) in order to optimize the data and metadata transfer process. For example, the data and metadata transfer process may be optimized by balancing the transfer task workload to the corresponding nodes in proportion to the relevant network connection characteristics—e.g., such that all nodes that are to have their ephemeral drive states captured are to be completed at a similar time. In some embodiments, the number of transfer tasks allocated to respective nodes in determined dynamically. For instance, one or more initial tasks are assigned to respective nodes. Those tasks are monitored by a management process which allocates additional tasks based on completion of already allocated tasks—e.g., based on how quickly the tasks are completed or a number of tasks in a respective queue such as when the number of entries fall below a threshold.

At 916, the transfer tasks for each node are executed to transfer the data and metadata to a storage service. Such transfers may be monitored using the previously mentioned manifest file to track which transfer tasks completed successfully and which did not. In some embodiments, a transfer task may be retried a set number of times. In some embodiments, failure of a transfer task, or a threshold number of failures, may be captured and used as a trigger to generate a substitute transfer task(s). For example, where the transfer task corresponds to information that is redundantly maintained, a different copy (e.g., on a different node) might be identified for transfer to the storage service. Additionally, or alternatively, such a failed transfer task may be converted into multiple smaller transfer tasks.

Figure 10:
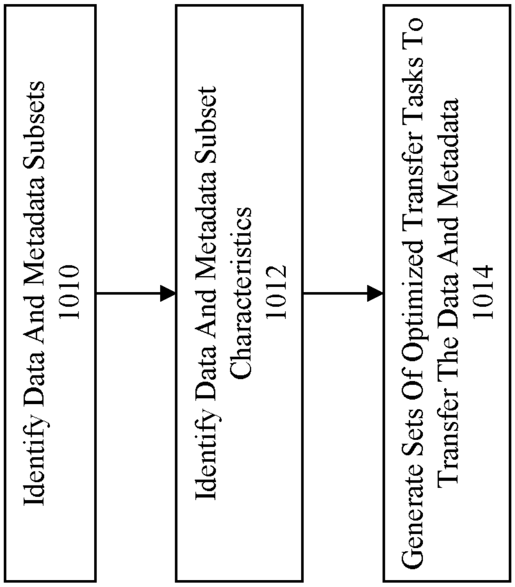
FIG. 10 illustrates an approach to analyze data and metadata to generate a set of optimized transfer tasks for hibernating ephemeral drives of a cluster according to an embodiment.

FIG. 10 illustrates an approach to analyze data and metadata to generate a set of optimized transfer tasks for hibernating ephemeral drives of a cluster according to an embodiment. Various aspects of the ephemeral drive hibernation process will be discussed below in regard to FIG. 10. Generally, the process will identify relevant information (e.g., data and metadata), corresponding characteristics, and generate sets of optimized transfer tasks for a particular node(s). In some embodiments, the analysis is performed in a distributed manner where each node independently determines how to transfer data and metadata on any ephemeral drives therein. In some embodiment, a single/global process will identify relevant information (e.g., data and metadata), corresponding characteristics, and generate sets of optimized transfer tasks for a particular node(s). In some embodiments, a hybrid approach having a distributed collection of processes and a single/global process is used.

In some embodiments, the approach identifies data and metadata subsets at 1010. For instance, data may be identified at the object, file, extent group, extent, or block level. Additionally, each piece of data might be associated with a node and an ephemeral drive (e.g., node ID and Drive ID). Similarly, each piece of metadata (e.g., metadata that is maintained in a separate object, file, extent group, extent, or block from the data) is identified. In some embodiments, metadata is maintained in a tabular format, log-based data structure, in an append-only data structure, or sorted string tables (SSTables). In some embodiments, the metadata is used to manage ephemeral drives as part of a unified storage pool where the storage of multiple nodes contributes to storage of the storage pool. For example, a virtual disk (vDisk) might be constructed from storage of one or more ephemeral drives on one or more nodes using a set of metadata that maps the logical addresses of the vDisk to physical addresses of the storage pool where the mapping information is maintained in the aforementioned metadata.

At 1012, relevant characteristics of the data and metadata are identified. Relevant characteristics may comprise the size, type (object, file, extent group, extent, or block), the location (e.g., node ID and Ephemeral Drive ID), whether the data or metadata is redundantly maintained (e.g., one of any number of copies) of the data or metadata, locations of redundant copies of the data, or any combination thereof. In some embodiments, the metadata is organized into a separate data structure from the general data where that metadata is divided into tables (e.g., SSTables) having corresponding ranges and redundant copies of those ranges are maintained on different ephemeral drives. In some embodiments, the tables comprise SSTables that are append-only structures. Such tables may be processed as discussed herein at least corresponding to the discussion included herein (see e.g., FIGS. 16-19).

At 1014, the information collected in regard to 1010 and 1012 is processed to generated a set of optimized transfer tasks to transfer the data and metadata to a target storage location. For instance, a single transfer task might be generated for piece of data (e.g., object, file, extent group, extent, or block). In some embodiments, each transfer task is assigned to or associated with a particular node—such that for each piece of data only a single transfer task is generated and that transfer task is assigned to or associated with a particular node while other redundant copies corresponding to that transfer task are not to be transferred from another node. For example, the manifest file might be processed to combine entries for redundant copies of data or metadata data into a single entry that references all redundant copies. Once combined, the process might assign a node having that data (or at least one copy thereof) to perform the corresponding transfer task by entering the node ID or ephemeral drive ID into a field in each entry. In some embodiments, the metadata is maintained in a tabular format, log-based data structure, in an append-only data structure, or sorted string tables (SSTables), and transfer tasks are generated in a manner that is aware of the corresponding structure to avoid transfer of no longer relevant or otherwise superseded metadata as provided herein.

Figure 11:
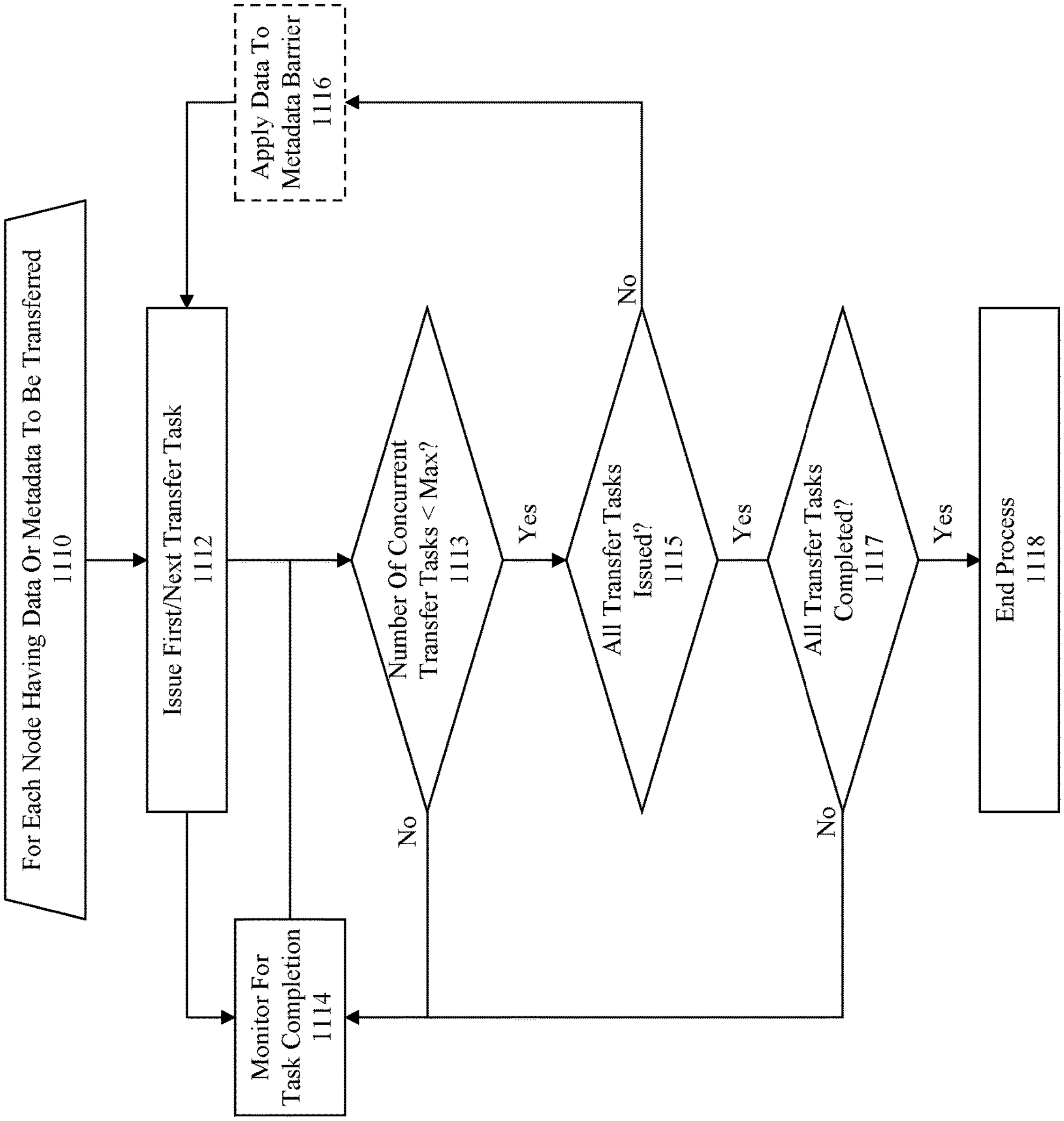
FIG. 11 illustrates an approach transfer data and metadata to a target storage location according to an embodiment.

FIG. 11 illustrates an approach transfer data and metadata to a target storage location according to an embodiment. Various aspects of the transfer process are discussed below. Generally, the approach executes corresponding transfer tasks in order to cause the reproduction of the indicated information. Additional aspects may be further provided to monitor and adjust the approach as needed. In some embodiments, only ephemeral drives of a single node are to be processed, whereas in other embodiments, ephemeral drives of multiple nodes are to be migrated at the same time such as to migrate a cluster from a deployed state to a stored state (e.g., to move an online system to a cold storage location).

At 1110, each node having data or metadata to be transferred starts a process to perform the corresponding transfer tasks. For example, at 1112 a process at each respective node will issue a first or next transfer task. In some embodiments, each transfer task corresponds to an identified node and ephemeral drive therein (e.g., based on a node ID and an ephemeral drive ID). such tasks will identify the relevant data at the corresponding granularity (e.g., object, file, extent group, extent, or block). In some embodiment, each task is represented by a table entry that specifies the corresponding data (e.g., object, file, extent group, extent, or block) and the node that is to complete the transfer task. In some embodiments, the transfer task corresponds to a set of metadata which may be processed, prepared, and divided into subsets as provided herein (see e.g., FIGS. 17-19. Generally, the process starts by selecting the data transfer tasks—e.g., from the manifest file by parsing the manifest file until a Node ID matching the current Node's ID is identified. In some embodiments, transfer tasks for transfer of the metadata are started only after issuing and/or completing all of the data transfer tasks.

At 1113, the process determines whether the number of concurrent transfer tasks is less than a maximum number of concurrent transfer tasks (e.g., maximum number for the individual node). In the event that the current number is greater than or equal to the maximum, the process proceeds to 1114 where a monitoring process monitors the tasks for completion (e.g., by monitoring for an acknowledgement or error message for corresponding transfer tasks). Once a transfer task completes the monitoring process may trigger a determinization as to whether the number of concurrent transfer tasks are less than a maximum at 1113. If, at 1113, it is determined that the number of concurrent transfer tasks is less than the maximum, the process proceeds to 1115 where a determination is made as to whether all the transfer tasks have issued.

If, at 1115, it is determined that all transfer tasks have not issued, the process returns to 1112 to issue the next transfer task. For instance, a first transfer task might comprise a transfer of a first extent, and a second transfer task might comprise a transfer of a second extent. In some embodiments, the issuance of the next transfer task might be subjected to a barrier that applies a separation between data transfer and metadata transfer (see 1116). Such a barrier might be applied to enforce consistency between the metadata and the data such that data that cannot or could not be transferred is not identified as existing by the metadata (e.g., metadata entries corresponding to data that could not be transferred might be updated to indicate that the data is no longer maintained, was subject to an unrecoverable error, is marked as invalid, or by deleting or marking the entry for deletion). However, if the metadata and data are transferred in an overlapping manner, it is possible that the metadata would indicate the presence of data that no longer exists or at least that could not be reproduced at the target storage location.

If at 1115 it is determined that all transfer tasks have been issued, then the process proceeds to 1117 where it is determined whether all transfer have completed. If all transfer tasks have not yet completed, the process returns to 1114 for monitoring for transfer task completion. If on the other hand all transfer tasks have completed the process ends at 1118.

In some embodiments, an error handling approach is implemented at 1114. For instance, the monitoring process might maintain a tally of the number of times a particular piece of data or metadata failed to transfer and issue one or more transfer tasks or messages in response. For example, the transfer task might be retried a threshold number of times, the transfer task might be reassigned to a different node (e.g., to pull from a different redundant copy), or some combination thereof.

In some embodiment, the process updates the manifest file or a log corresponding to the manifest file to identify the locations of the corresponding data at the target location (e.g., object, file, extent group, extent, or block) where the data and/or metadata is maintained. In this way, both the source of any particular data or metadata and the cold storage location for that particular data or metadata can be captured in a manifest file. In some embodiments, the manifest file is stored at the cold storage location. In some embodiments, relevant characteristics of the node(s) is maintained and stored at the cold storage location. For example, minimum specifications are maintained according to cluster and storage level requirements such as supported features required by each node, minimum CPU, memory, storage (whether SSD, HDD, or some other storage medium), network adapter requirements, etc. In some embodiments, a collection of other data is maintained for the ephemeral drives such as an installed hypervisor (or configuration thereof) or other virtualization tools.

Figure 12:
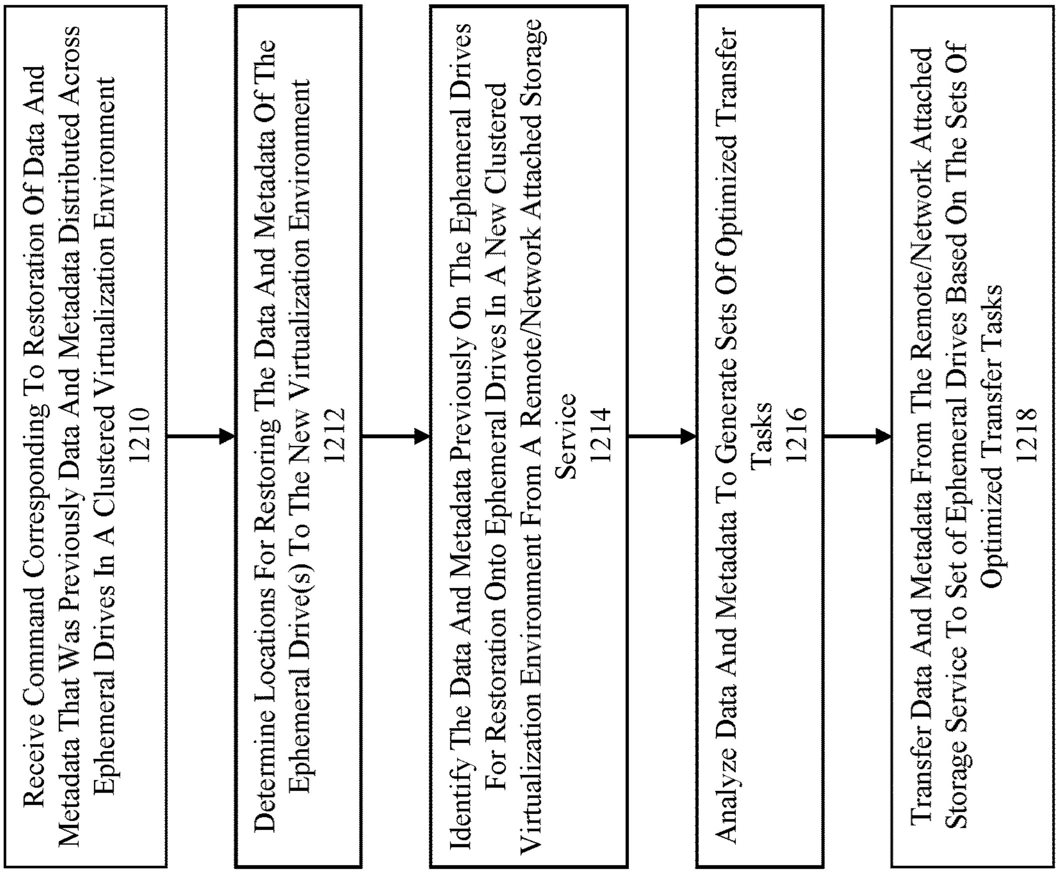
FIG. 12 illustrates an approach to restore the ephemeral drives after migration according to an embodiment.

FIG. 12 illustrates an approach to restore the ephemeral drives after migration according to an embodiment. Generally, the restoration process leverages the work done to reproduce the data and metadata to efficiently restore ephemeral drive states. However, some other processing may need to take place in order to prepare the underlying hardware for population with the correct data and metadata.

At 1212, locations for restoring the data and metadata of the ephemeral drive(s) to the new virtualization environment are determined. For instance, an administrator might provision one or more sets of hardware resources (e.g., bare metal nodes) to receive the data and metadata. In some embodiments, an automated process retrieves previously stored minimum cluster specifications and generates one or more requests to automatically configure the hardware resources to receive information from the cold storage location. For example, a management process is used to retrieve or access a previous clustered virtualization environment configuration represented at least in part by the minimum specification and configures the nodes to receive data and metadata from a cold storage location. In some embodiments, the management process configures a clustered virtualization environment (or a set of resources to form the clustered virtualization environment) and starts processes to receive information from the cold storage location. In some embodiments, the hardware resources are configured to receive the data and metadata from the cold storage location and the data and metadata represents a fully configured clustered virtualization environment.

Once the locations to restore the data and metadata have been identified the corresponding data and metadata can be identified (see 1214). For example, by mapping or otherwise associated a restoration location with a previously existing node ID or an ephemeral drive ID an association with previously generated entries in a manifest file can be created. As a result, the data and metadata previously on the ephemeral drives can be identified for restoration from the cold storage location (e.g., a remote/network attached storage service) onto ephemeral drives in a new clustered virtualization environment. Additionally, because the manifest file also captures the distribution of the workload to transfer the data and metadata, use of the manifest file for restore can avoid having to pull additional details. For instance, the manifest file might be retrieved and processed to verify that tasks (or nodes to perform said tasks) are associated with all the data and metadata that was reproduced at the cold storage location. After the corresponding data and metadata is identified, the data and metadata is analyzed to generate sets of optimized transfer task (see 1216).

At 1218, the data and metadata at the cold storage location is transferred to the clustered virtualization environment for restoration at each of the corresponding nodes. Such a process is largely equivalent to that of FIG. 11 with the difference being that the metadata barrier 1116 may not be relevant or that metadata may be required to be transferred first. Additionally, the transfer tasks will be in the opposite direction (e.g., data and metadata is read from the target storage location instead of being written to the target storage location). In some embodiments, the manifest file is processed to identify a number and location for each replica of data and/or metadata and corresponding transfer task are generated and executed by the clustered virtualization environment (e.g., to send copies of data and metadata to be duplicated from one node to another node in the cluster). In some embodiments, a background process executes a replica management process that automatically creates replicas at target locations according to a replication policy. Once, at least one copy of the data and metadata has been transferred to the new clustered virtualization environment, normal processes of the new clustered virtualization environment may be started and users may begin to use the underlying resources to execute workloads. In some embodiments, the metadata or manifest file are analyzed to determine where the data items are stored at storage service; the data items are then reproduced by executing a write operation to create a newly generated redundance copy of the data item on the corresponding newly identified hardware; a new metadata entry is generated to catalog the new location of the data item. In some embodiments, a replication process identifies a node_ID or disk_ID as a replication location and executes a replica management process to generate replicas of the corresponding data items at the storage service.

Figure 13:
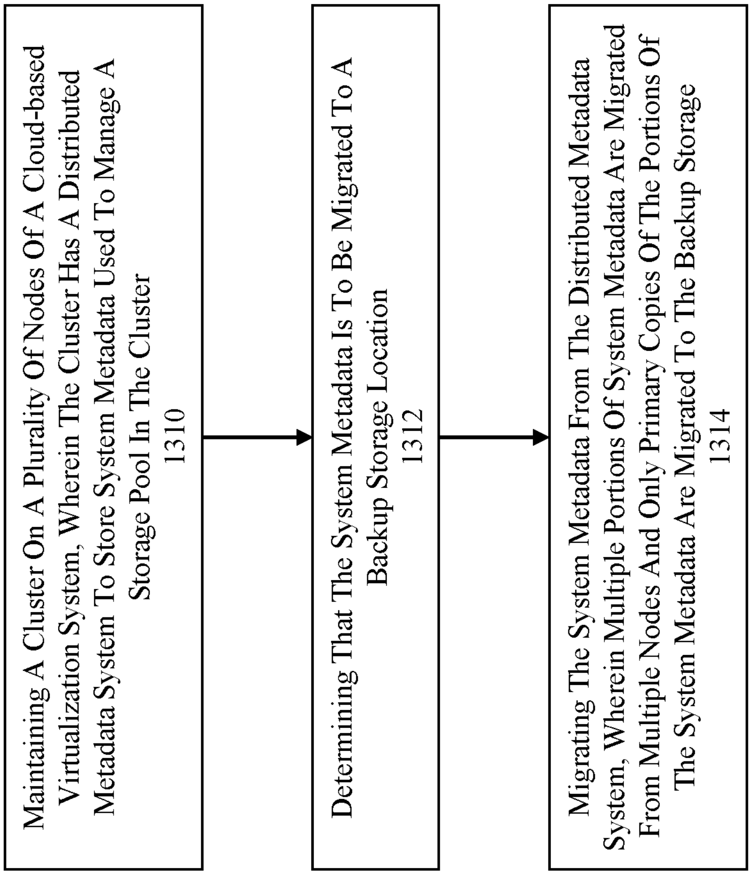
FIG. 13 illustrates an approach to migrate metadata of a cluster according to an embodiment.

FIG. 13 illustrates an approach to migrate metadata of a cluster according to an embodiment. Various aspects of the cluster hibernation process will be discussed below in regard to FIG. 13.

According to some embodiments, a cluster may be maintained on a plurality of nodes of a cloud-based virtualization system (see 1310). For instance, a cluster may comprise a plurality of nodes that interoperate to form a distributed metadata system to store system metadata used to manage a storage pool of the cluster. A storage pool might be formed from a collection of storage devices that are attached to respective nodes of a plurality of nodes where multiple nodes contributes local storage (e.g., SSDs or HDDs) to the storage pool, and where the system metadata is used to identify where within the storage pool a particular data item is stored (e.g., object, file, extent group, extent, or block). For example, the metadata might identify a node and drive that holds referenced data or metadata in one or more hierarchical levels. For instance, a vDisk is associated with a logical address space and that logical address space is mapped to some number of underlying storage elements (e.g., extents) by the metadata, where those storage elements could be on any node of a plurality of nodes that form the clustered virtualization environment.

At 1312 it is determined that the system metadata is to be migrated to a backup storage location. For instance, as part of a cluster hibernation process the approach might determine that the system metadata is to be migrated to a backup storage location (e.g., cold storage). Such an approach might be used to lower the ongoing burden of maintaining the clustered virtualization environment.

In response to the determination that the system metadata is to be migrated to a backup storage location, the process migrates the system metadata which is maintained in the distributed metadata system in a manner that avoids the transmission of redundant copies of one or more portions of the system metadata. The approach may also include dividing the metadata into multiple portions to optimize transfer efficiency. For example, the metadata may be divided based on metadata entry ranges and managing nodes for each range might execute a process to transfer metadata portions managed therein to the cold storage location where nodes that store redundant copies of those portions but do no manage those portions do not transfer corresponding portions unless a managing node experiences a failure.

Figure 14:
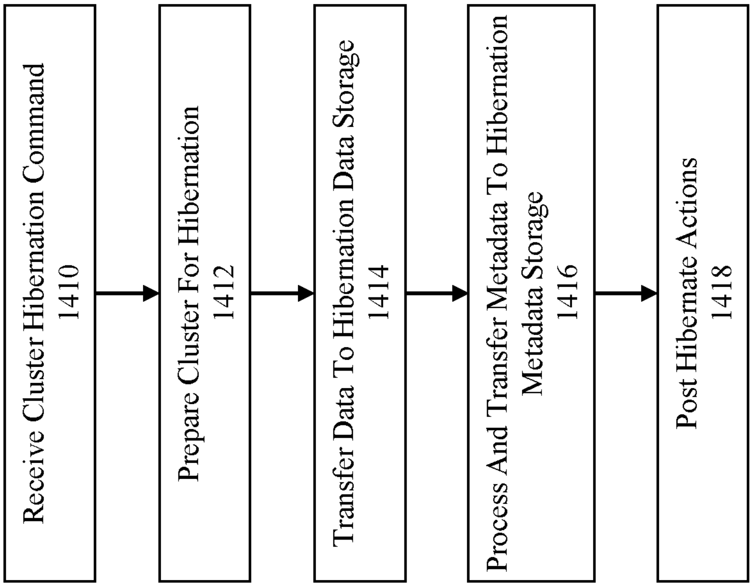
FIG. 14 illustrates an approach to hibernate a cluster according to an embodiment.

FIG. 14 illustrates an approach to hibernate a cluster according to an embodiment. Various aspects of the cluster hibernate process will be discussed below in regard to FIG. 14.

Generally, the process includes any of target storage setup, I/O control implementation, data management operations, or metadata capture. For instance, at a high level the process may be triggered at a gateway by a user providing a command to execute a cluster hibernation process (see 1410) and an identification of a target location for storing the hibernated cluster (see e.g., 1412). In some embodiments, in response to the command to hibernate a cluster, the process starts by setting up the target storage location for access or by verifying that said target storage location is already setup (see e.g., 1412). If the target storage location is not successfully setup or verified the process may issue an error report and cancel the hibernation. In some embodiments, preparation for the cluster for hibernation includes stopping user level processes and services to avoid the state of the cluster from changing while the hibernation process is executing (see e.g., 512). Additional details according to some embodiments are discussed further in regard to FIG. 15.

Once the cluster has been prepared for hibernation at 1412, the process will move to 1414 where the data of the cluster (e.g., the storage pool data) will be moved to the target storage location. For instance, the data might comprise a collection(s) of extents which are each identified and transferred to the target storage location. Each extent may be a member of an extent group (egroup) which is a collection of extents which can be managed, at least partially, at the group level. In some embodiments, a manifest of egroups is generated or modified where each egroup is associated with a status indicating whether it is maintained at the target storage location. Each egroup not already at the target storage location is then copied to said location, and upon completion the manifest is updated to reflect the duplication of the egroups at the target storage location. In some embodiments, the duplication of the egroups is handled by a replica management process that maintains replicas of extents (and/or egroups) in the storage pool. For instance, the target storage location could be added as a replica location for the data of the storage pool. In response to the change, a replica management process duplicates each egroup at said target storage location. In some embodiments the duplication/replication status is managed at the level of singular extents or at a higher-level abstraction such as a group of extents (egroup) or multiple egroups. In some embodiments, the replica management process operates while one or more user processes are executing in the cluster.

Similarly, at 1416, metadata used to manage and access the extents is reproduced at the target storage location. In some embodiments, the data is in the form of extents or groups thereof and metadata can be transferred at the same time as the data. For instance, once any pending writes to the data are completed the processing of the metadata can begin. Once the metadata processing is complete, the metadata can be transferred to the target storage location (e.g., as one or more objects). Such an arrangement is likely to result in the data and the metadata being transferred at the same time. In some embodiments, the data is transferred before the metadata processing and transfer thereof. In some embodiments, the storage pool comprises a collection of extents that are grouped and managed using a set of metadata. Such metadata is used to access said extents and may reside at one or more nodes arranged in a ring (logically). For example, four nodes (A, B, C, D) might be arranged in a ring with connections from A to B, B to C, C to D, and D to A, and where each node is responsible for a range of metadata such as is used in SSTables. In some embodiments, all services that are not necessary for currently pending tasks for cluster hibernation are halted prior to processing of the metadata for duplication at the target storage location. In some embodiments the target storage location comprises object storage. Various actions are performed to process the metadata prior to transfer. Processing may include operations to improve the speed in which that data can be transferred and the amount of data therein. In some embodiments, the SSTables include data that is cached with or within the SSTables and which may not yet be committed to the storage pool. For example, a modified file might be maintained in or associated with an SSTable while it is being accessed with any changes being reproduced on the storage pool at a later date.

In some embodiments, post hibernation actions are taken at 1418 to spin down the cluster at the current location. For instance, status information may be captured indicating that the cluster was hibernated and identifying the location that the hibernated cluster is stored e.g., in one or more status fields (see also 520 and 522). Additionally, still running processes of the cluster may be shut down and the corresponding resources may be released for use by other users. For instance, a tenant may shutdown and release the resources of the cluster back to a service provider such as amazon AWS after storing the hibernated cluster at Amazons S3 storage.

To provide further illustration, and in some embodiments, a control path for cluster hibernation can be used. The control path might comprise a path implemented by a gateway or cluster administrator process (as used herein cluster administrator process is a health and maintenance component for doing tasks such as managing and distributing tasks throughout the cluster, including disk balancing, proactive scrubbing, and many more items and is used herein without limitation). A cluster status store config (as used herein is a collection of information to manage at least cluster hibernation and may include details about the components in the cluster such as hosts, disks, and logical components like storage containers). Generally, the cluster status store maintains a configuration (cluster status store configuration) representing aspects of the cluster which can be updated and accessed by the nodes of the cluster. Additionally, the cluster status store configuration might include variables tracking cluster hibernate mode and cluster hibernate task status which can be used to gatekeep the cluster hibernation process. For instance, the cluster administrator process might react to different hibernate mode transitions. In some embodiments, the cluster hibernation follows a serialized process where each step is independently executed without any overlap.

Example cluster status store config parameters might comprise kUserIOQuiesced (which indicates that the I/O manager has quiesced all the user IO), kOplogDataDrained (which indicates that the cluster administrator process has verified that there are no outstanding vDisk oplog episodes that need to be drained to an extent store), and kEstoreDataMigrated (which indicates that the cluster administrator process has verified that all the data from an extent store has been migrated to a target storage location—e.g., a cloud-tier). The I/O manager is responsible for I/O operations on the cluster and is used herein without limitation.

In an initial transition, a hibernation mode might be entered (e.g., kHibernate). When the mode is entered, all cluster administrator process nodes will stop/cancel all the queued/on-goings scans and background/foreground tasks to allow the cluster administrator process to start with a clean slate to perform cluster hibernate operations. In some embodiments, a cluster administrator process leader sets the hibernate task descriptor and disables all other cluster administrator process dynamic and periodic tasks. This ensures that none of the other types of cluster administrator process scans will be scheduled automatically unless explicitly triggered through a remote procedure call (RPC)—e.g., for troubleshooting purposes. Additionally, the cluster administrator process's foreground and background task scheduler, when in hibernate mode, will only process the tasks that are specific to the hibernate mode—e.g., background tasks such as FixExtentGroupsTasks relevant to hibernate and foreground tasks and FlushOplogTasks. In some embodiments, the cluster administrator process will not schedule any hibernate scans but will instead wait for the hibernate task status to have kUserIOQuiecsed set, to ensure that no new incoming user I/O requests will be served through the I/O manager. In some embodiments, a hibernate scan will serialize operations such as in log draining (e.g., kOplogDataDrained) and data migration (e.g., kEstoreDataMigrated) stages. First the cluster administrator process schedules FlushOplogTasks for disks with pending operation logs (oplogs). Once it is verified that all the disks have no pending oplogs, the cluster administrator process will update hibernate task status with kOplogDataDrained acknowledge. In some embodiments, the cluster administrator process will also add or verify the presence of the target storage location (e.g., object storage such as amazon S3 storage)—e.g., by adding disks to the storage pool and adding a new storage-tier corresponding to the disks in a tier preference list. Subsequently, the cluster administrator process scans will only schedule data migration tasks, e.g., FixExtentGroupTasks for egroup (extent groups) migration, until all the data (egroups) are migrated to the cloud disks. In this way, the cluster administrator process treats the operations as replication operations to correct for missing extents not at the replication location by reproducing the data (e.g., extents and extent groups in the storage pool) at the target storage location. In some embodiments, the process is verified by checking/ensuring that at least 1 replica resides on the target storage location (e.g., check each egroup control block to verify that the replications have been completed). In some embodiments, the actual replication is performed by the I/O manager in response to a replication instruction from the cluster administrator process. Once migration of the data is completed, the cluster administrator process updates a hibernate task status with kEstoreDataMigrated acknowledged.

In some embodiments, a restore operation is started by setting a mode to kRestore (e.g., from kHibernate). Generally, the hibernation process is reversed by changing the replication information to remove the previous target storage (e.g., object or cloud storage). For instance, target storage (e.g., cloud disks) would be marked "to-remove". This will allow a disk rebuild process (e.g., kSelectiveDiskRebuild scans) to schedule data restoration operations (e.g., FixExtentGroupTasks) to migrate data back to the cluster from target storage location(s). In some embodiments, there will not be an Oplog draining stage in the Restore mode because the oplogs were drained prior to transmission of the relevant data to the target storage location (e.g., kOplogDataDrained will be set by default by the cluster administrator process after detecting the IO was quiesced—kUserIOQuiecsed).

Once the data has been restored, the cluster is returned to a normal operating mode. For example, when a disk rebuild process reports that there is no more data to be migrated (e.g., kSelectiveDiskRebuild counters are exhausted), the cluster administrator process will set a parameter in the cluster status store config indicating that the data has been migrated to the restore location—e.g., kEstoreDataMigrated is set to true or a value indicating that the migration is complete. Note that generally metadata restoration will be discussed further below and is also part of the restoration processes. Once the data restoration is complete the mode can be changed to a normal operating mode which will trigger the cluster administrator process to resume its normal cluster activities.

In some embodiments, the process includes operations to migrate a state of a metadata system separately from the data that the metadata system represents. For example, a storage pool might contain data for the cluster to be hibernated. That data might be associated with a set of metadata that is arranged in a ring of nodes where that data is distributed across those nodes using a hashing function. In this way, when a process requests access to the data in the storage pool, the ring can be queried to determine where the underlying data is located.

Figure 15:
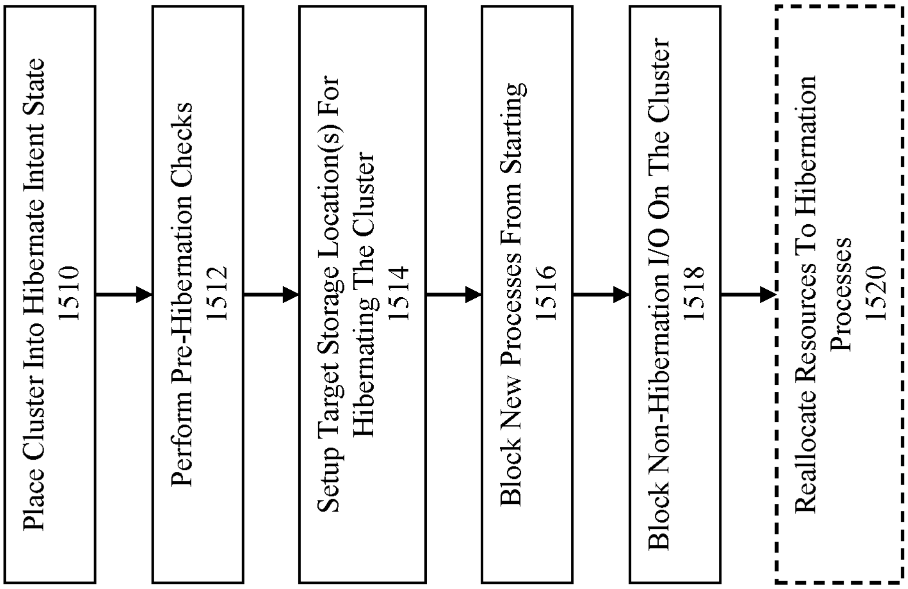
FIG. 15 illustrates an approach to prepare a cluster for hibernation according to an embodiment.

FIG. 15 illustrates an approach to prepare a cluster for hibernation according to an embodiment. Various aspects of preparation for the cluster hibernate process will be discussed below in regard to FIG. 15.

In some embodiments, the preparations include placing the cluster into a hibernate intent state at 1510. For instance, in response to the cluster hibernate command, the process will set a value indicating that the cluster has entered a cluster hibernate flow. As will be discussed herein, this value along with other values can be used to trigger processing of the corresponding information in order to implement the cluster hibernation process. For instance, in some embodiments, as each parameter is set one or more corresponding processes will identify that modification and begin performing actions to hibernate the cluster where different parameters are set to perform gatekeeping of the process flow. In some embodiments, the parameters are monitored by one or more state machines that can trigger the necessary actions in the appropriate order to execute the process flow. In some embodiments, a state machine or management process is provided that sends and receives messages (e.g., commands to complete tasks and responses indicating successful completion or failure to complete those tasks) between various processes to complete necessary tasks.

In some embodiments, the process starts at 1512 where pre-hibernation checks are performed. For instance, the process will begin preparing the cluster for hibernation by stopping various processes such as user virtual machines, workflows, upgrades, background tasks, etc. that are not needed for the hibernation process.

At 1514 the process sets up the target storage location for access or verifies that said target storage location is already setup (see 1412). If the target storage location is not successfully setup or verified the process may issue an error report and cancel the hibernation. While any object storage could be used to implement the approaches disclosed herein, the primary purpose is to mothball (e.g., store in cold storage) a cluster so that resources used by the cluster at a more expensive facilities can be released while the cluster can be maintained in a static state for later restoration from a cheaper storage facility.

In some embodiments, the first (1512) and second (1514) operations may be performed in parallel or in the opposite order to that illustrated in FIG. 15. For instance, the pre-hibernation checks (1512) may include operations to verify that the cluster is idle (with some exceptions) by verifying the relevant processes are not executing—e.g., verification that user, system, background processes are stopped or can be stopped. In some embodiments, these actions occur prior to the setup of a target storage location. In some embodiments, the hibernation checks may be performed after the target storage location is setup or verified or in parallel with the setup or verification of the target storage location (see 1514).

In some embodiments, a target storage location is setup at 1514. For example, access information could be configured at the cluster to allow the cluster to treat the target storage location as a disk or collection of disks. In some embodiments, the target storage location is mounted to the cluster and can be assigned to a node in the cluster. In some embodiments, one or more locations within the target storage location are configured and can be used by different nodes at the same time to transmit data to the target storage location. In some embodiments, both a target storage location and pre-hibernation checks (1512) are required for advancing in the hibernation process. If the pre-hibernation checks or the setup/verification of the target storage setup fails, the process may retry either or both operations up to a threshold number of times, where more than a threshold number of failures causes an error message to be generated.

At 1516, new processes are blocked. Generally, to be able to migrate the cluster, the cluster must be brought to a consistent state where various processes are not operating (e.g., user workloads such as virtual machines, services, containers etc.). This is because such processes generally create and modify data. However, capturing data is made more difficult when that data is currently being modified. On approach to address this is to place the nodes (also called computing nodes and hosts) into a maintenance mode which will stop the nodes from bringing up new processes including scheduled maintenance.

In some embodiments, at 1518, an I/O process that allows processes to write to a storage pool is modified to block all writes that are not from a process for implementing the cluster hibernation. For instance, I/O operations having an identifier associated with hibernation or other indicator that can be used to determine that an I/O operation is or is not associated with the hibernation process (e.g., based on the presence or absence of a corresponding tag or process ID)

are allowed or blocked accordingly. Additionally, once all new I/O operations have been stopped or blocked, any pending operations already in operation logs (e.g., operation logs on any of the nodes in the cluster) are drained. In some embodiments, draining an operation log comprises completing all operations in said logs. In some embodiments, the draining of the operation logs is performed by storing the contents of the operation logs onto storage of the cluster that is to be backed up (e.g., the storage pool), where those contents would later be recreated upon restore. In some embodiments, the ordering of 1512, 1514, 1516, and 1518 may be different. For instance, 1514, 1516, and 1518 might all occur in parallel or in any order.

In some embodiments, resources of the cluster are reallocated to hibernation processes at 1520. For instance, processor, memory, and network bandwidth resources can all be reallocated to hibernation processes without impacting user experience in a negative way because the user workloads are already shutdown and blocked from starting or restarting. In fact, reallocation can improve the user experience at least because the speed in which a cluster can be migrated to the target storage location is likely to be improved by said reallocation. In some embodiments, multiple connections to the target storage are provided at each node, the number of connections may be based on a predetermined parameter (e.g., processor, memory, data to transfer, network bandwidth) or the number of connections may be monitored by a gateway or other supervisor process and modified based on reported transfer rates to maximize throughput to the target storage location at an individual node or across the level of the cluster (e.g., the total transfer rate of the cluster).

In some embodiments, an ongoing, periodic, or at will process is used to transmit data to the target storage location in advance of a hibernation signal. While such a process is similar to that discussed above, there are some differences. The main differences are that the data itself may change over time, and the second is that such a process would be allocated limited resources because it would occur during user access. Thus, the approach provided herein could be utilized with modifications. In some embodiments, the pre-transfer of data would operate at the same level of the extents, egroups, or groups of egroups. Each piece of data would be transmitted to the target storage location when available. Transmission management might select the data for transmission based on an age (e.g., oldest data is sent first), or based on another factor (e.g., address range or adjacency to other data). In some embodiments, the pre-transmission leverages the replication processes disclosed herein to automatically copy the relevant data over using the replica management processes discussed herein. In some embodiments, upon the initiation of a hibernate task and data transfer, the process would generate or access a set of metadata to identify data that has not yet been transferred. Once the replication task is completed the process would continue as described herein.

Figure 16:
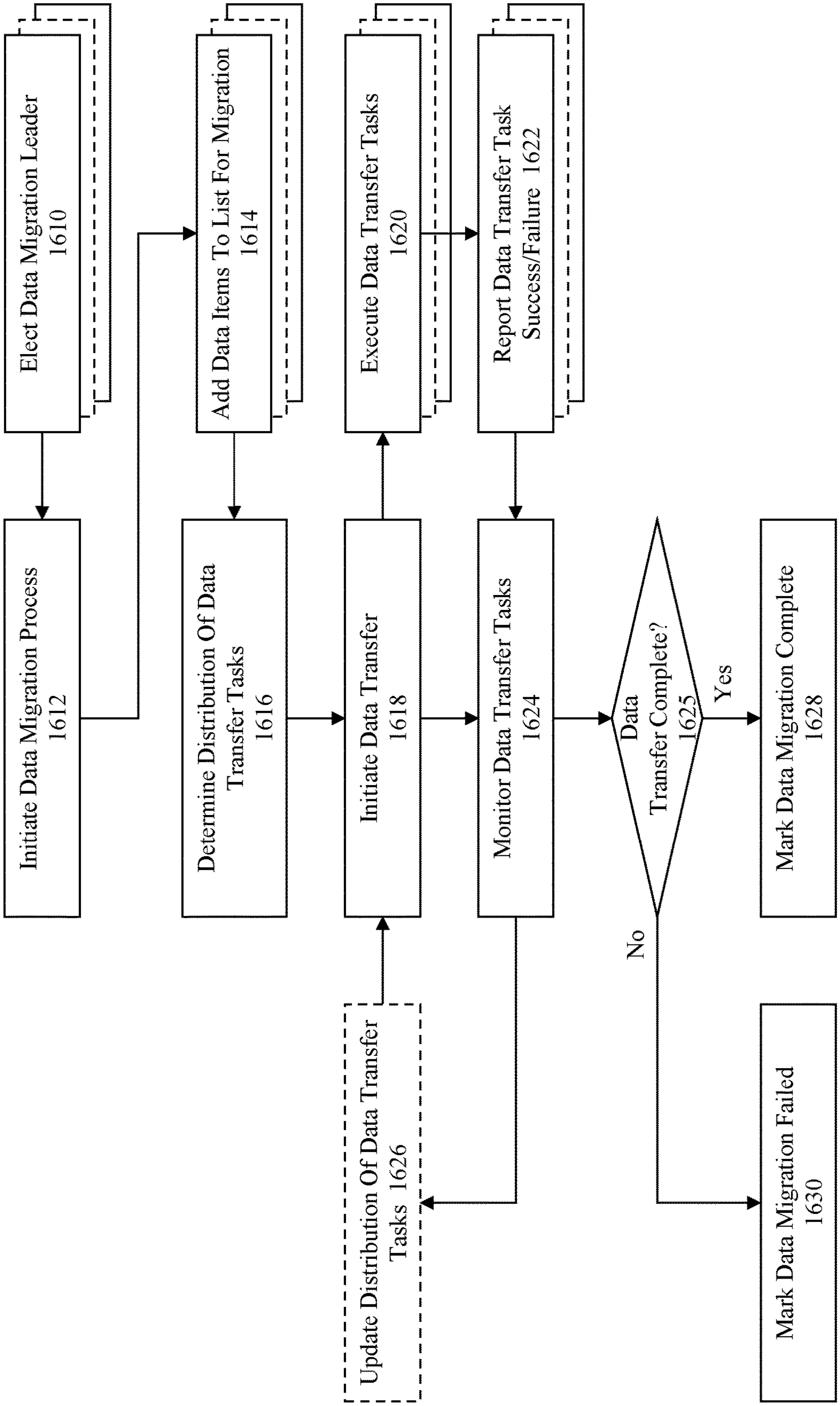
FIG. 16 illustrates an approach to process and transfer data to the target storage location according to an embodiment.

FIG. 16 illustrates an approach to process and transfer data to the target storage location according to an embodiment. Generally, the approach provided here is directed towards cluster level hibernation. For instance, multiple nodes, all or at least a subset, in a clustered virtualization environment may interact to elect a node as a leader of the data migration process and then operate in a distributed fashion under the supervision of the leader node to identify and migrate data items from nodes of the cluster to a target location (e.g., cold storage location).

For instance, one part of the approach might comprise a plurality of nodes electing a data migration leader (see 1610). Specifically, after a trigger is asserted/received each node might send a request to become a leader of the data migration process. Leader election processes are generally known and any appropriate technique could be utilized herein. Briefly, one leader election process might comprise each node broadcasting a request to become a leader of the data migration process where the request includes a number (e.g., node ID, time stamp, or random number) that is used by a set of logic at each node to determine which node should be the leader (e.g., the node with the lowest/highest Node ID, earliest time stamp, lowest/highest random number). In some embodiments, leader election is further based on a quorum, where the leader that is agreed to by the quorum is elected.

Once the data migration leader has been elected, the leader issues a command or updates a control signal or parameter to initiate the data migration process. Such a process starts by adding data items to a list for migration (See 1614). For instance, the leader issues a broadcast command or individual commands to each node that is to migrate data to add data items to a list of to be transfer items. The data items will normally have a consistent size or type (e.g., object, file, extent group, extent, or block). In some embodiments, the data items, or a subset thereof, are maintained in a storage pool where duplicate copies are maintained (e.g., redundant copies are maintained according to a replication policy). Such redundant data items may be identified using at least metadata as disclosed herein. In some embodiments, the list of data items is maintained in a shared storage space accessible by all the nodes. For instance, each node might generate a file identified by at least its respective node ID having a list of data items to be transferred and corresponding information such as the location of that item, the size, type, etc. In some embodiments, each data item is identified in a tabular structure or database where each data item or group of data items is identified (e.g., by an object, file, extent group, extent, or block identifier) and the address or addresses of each copy is identified.

At 1616, the distribution of data transfer tasks is determined by processing the data items from each of the nodes. For example, the approaches presented in regard to FIGS. 10 and 11 above might be applied here to determine data distribution tasks—e.g., processing the data items to determine which data items are unique, which items are redundant copies, locations of redundant copies, and relevant characteristic of each node (CPU, memory, network bandwidth) and the amount of data to be transferred. Such information can be used by the data migration leader node at 1616 to determine which nodes are to transfer which data items by balancing the amount of data to be transfer by each node relative the network bandwidth for each node. Such an approach can be implemented by selecting which (original or redundant) copy of a data item is to be transferred. From a management perspective, such an approach could be managed using a list identifying a data item or entry and a node that is to transfer the data item. For example, the list of data items might be maintained in a data transfer manifest file that includes a plurality of tabular entries where each data item corresponds to a separate entry. Subsequently the data migration process leader might process the collection of entries to identify redundant copies of respective data items and move the redundant copies into a single entry for each unique data item (e.g., one entry per unique data item and its replicas), where the location of each copy might be identified (e.g., using a node ID and a data item ID—object, file, extent group, extent, or block identifier). Additionally, the process may add or modify a field in each entry representing which node is to transfer the data item and add a field for success/failure reporting.

After each data item has been processed and a node is identified for transfer of the data item (e.g., based on an entry in a corresponding field), the data migration leader initiates transfer of the data items at 1618. For instance, the data migration leader might broadcast a message to indicate that the data transfer should commence, update a state value representing completion of the data transfer task distribution, or send a message to each node that is to transfer data items that references or includes an identification of the data items to be transferred by that node.

At 1620, each node will execute the data transfer tasks assigned to it by the data migration leader node. For example, a table in a shared memory or storage region is accessed by each node to identify a first or next data item to be transferred by the accessing node. Each data transfer task can then be executed in any appropriate order (e.g., based on an appearance, index, or other value). The actual transfer of the data items may be completed in any appropriate manner and may utilize any of the optimizations disclosed herein such as those discussed at least in regard to FIG. 11.

At 1622, while the data transfer tasks are being executed, each node will monitor its own transfers to determine whether the transfer was successful or failed. For instance, each data item might be transferred using any number of packets where one or more packets in the aggregate contain the data item. Thus, a local process might monitor the transfer of each packet for a data item, collect the success/failure messages for that data item (e.g., in a vector comprising a collection of Boolean values indicating success or failure) and manage the retry of any failed packets. When all the packets have been successfully transferred, the node would then update the status of the data item (e.g., in a local data structure or in a shared storage) to indicate success. If the transfer fails any appropriate number of retries may be attempted. If a threshold number of retries fail then the sending node will report a failure to transfer the data item (e.g., in a local data structure or in a shared storage). In some embodiments, each node will report data transfer task results. For example, a node might report that a data transfer completed successfully, completed with errors (possibly including an error count), or failed to complete (when some or all data transfers failed). In some embodiments, the data migration leader will also perform data transfer tasks. In some embodiments, data migration leader is elected from one or more nodes that are not participating in data transfer (e.g., where the data migration leader is a management node that is separate from but otherwise coupled to the nodes of the clustered virtualization environment).

At 1624 the data migration leader monitors the data transfer tasks for success/failure. Generally, the data migration leader will maintain a list of nodes that are participating in the data transfer task. Subsequently, when a respective node reports success a tracking value is changed to indicate the processing state. When all nodes report success the process will proceed to 1625 where the manifest file (e.g., the table having the complete list of data items to be transferred) is processed to determine if, or verify that, all data items were transferred successfully. If on the other hand, one or more nodes report a failure to transfer, the corresponding data items may be identified (e.g., by the node reporting the failure or by processing the manifest file) and the process proceeds to 1626 where the distribution of any failed the data transfer tasks is updated. For instance, the distribution of the data transfer tasks might identify a different/redundant copy of a data item that failed to transfer and assign the node having the different/redundant copy to transfer that data item. In some embodiments, a limited number of retries may be attempted. For example, the maximum number of retries initiate by the data migration leader might be proportional to the maximum number of redundant copies or a replication factor (e.g., max_retries=3*replication_factor−1). Once all the retries have been exhausted or the monitoring process determines that data transfer task execution is complete, the process proceeds to 1625. In some embodiments, the processes of 1616, 1618, 1624, and 1626 assign and monitor a limited number of transfer tasks at any given time and where transfer tasks are assigned to respective nodes based on a number of pending transfer task to dynamically manage transfer task distribution (e.g., new transfer tasks are assigned when the number of pending transfer tasks is below a threshold).

At 1625, the data migration leader takes a corresponding action based on whether the data transfer is complete. If the data transfer was completed successfully (e.g., all data items were transferred to the target storage location based on reported success information), the process proceeds to 1628 where a message or a status parameter indicating that data transfer was completed successfully is asserted. On the other hand, if the data transfer did not successfully complete all data item migrations, the process proceeds to 1630 where a message or a status parameter indicating that data transfer failed is asserted. In some embodiments, the failure of the data migration process is reported to an administrator for review and for potential override (e.g., to allow cluster level migration to complete).

Figure 17:
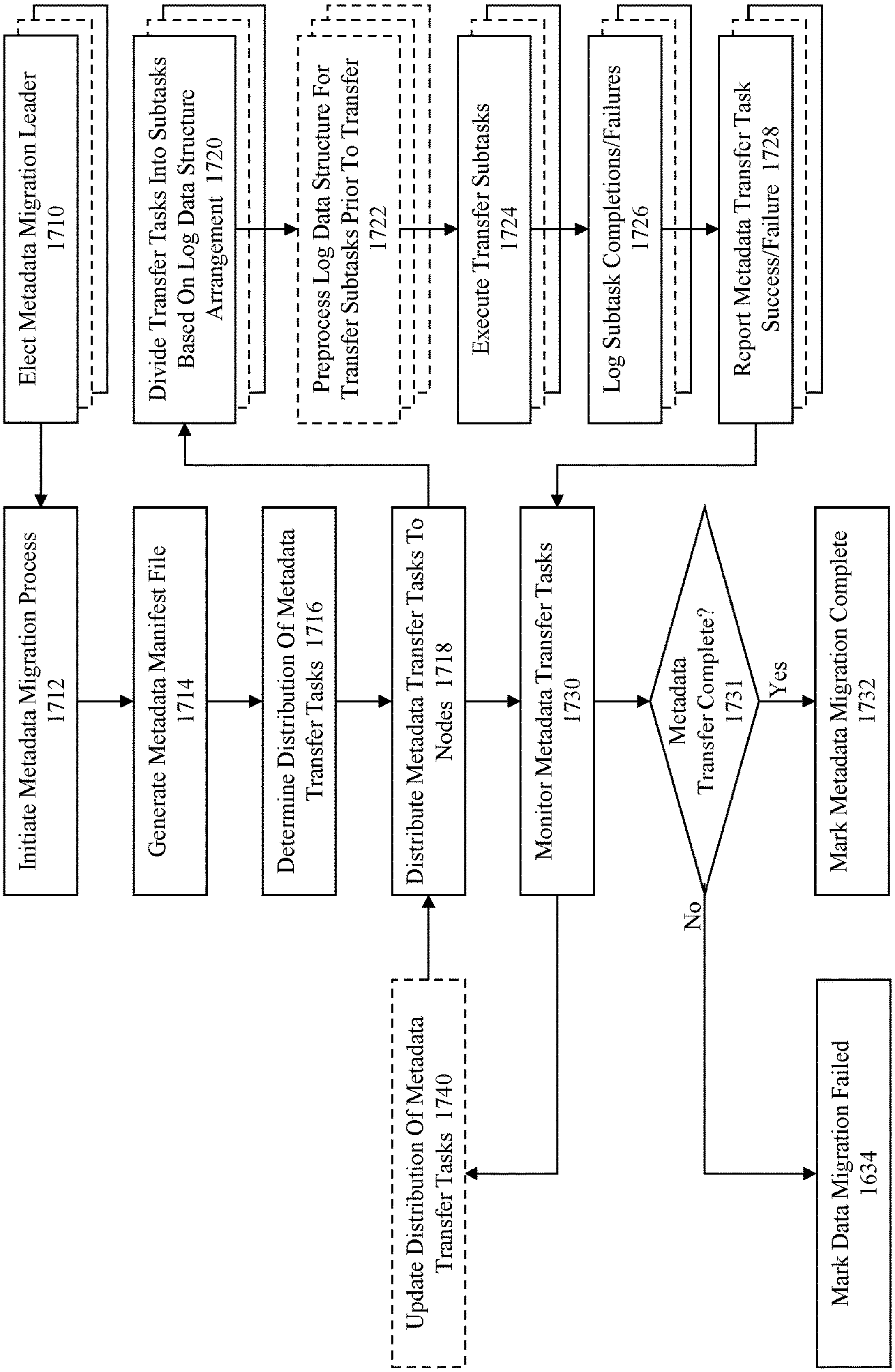
FIG. 17 illustrates an approach to process and transfer metadata to the target storage location according to an embodiment.

FIG. 17 illustrates an approach to process and transfer metadata to the target storage location according to an embodiment. Generally, the approach provided here is directed towards cluster level hibernation. For instance, multiple nodes, all or at least a subset, of a cluster may interact to elect a node as a leader of the metadata migration process and then operate in a distributed fashion under the supervision of the leader node to identify and migrate metadata items from nodes to a target location (e.g., cold storage location). Such a collection of metadata might be used to manage a logical collection of disks (e.g., SSDs or HDDs) as a single storage pool where those disks are locally connected to different respective nodes in the cluster. In some embodiments, the metadata is managed by a collection of nodes that are logically arranged in a circle and that provide redundant storage to at least a subset of the metadata managed by that collection (see e.g., FIG. 25).

For instance, one part of the approach might comprise a plurality of nodes electing a metadata migration leader (see 1710). For instance, after a trigger is asserted/received each node that manages at least a subset of the metadata might send a request to become a leader of the data migration process. Leader election processes are generally known and any appropriate technique could be utilized herein. In some embodiments, the elected leader is limited to one of the nodes that manage the metadata to be transferred.

Once the metadata migration leader has been elected, the leader issues a command or updates a control signal to initiate the metadata migration process. Such a process starts by generating a manifest file (See 1714) that indicates the portions and locations of metadata to be transferred. Generally, and as discussed herein, metadata is redundantly stored at a number of nodes and any one node may be responsible for storing both the metadata managed by that node, and a redundant copy of some or all of metadata managed by one or more other nodes. In some embodiments the metadata is maintained in sorted string tables (SSTables) or in other persistent storage structures such as log-based data structures or append-only data structures.

At 1716, the distribution of metadata transfer tasks is determined by the metadata migration leader. For example, the distribution of metadata transfer tasks may be dictated based which node manages which set of entries (e.g., based on a token range, address range, hash, or other value) and enforced by the metadata migration leader. Once the corresponding portion has been identified, the process proceeds to 1718 where those tasks are distributed to the corresponding nodes. For instance, the metadata migration leader might send a message to each node that manages metadata identifying the portion of the metadata that the individual node is to transfer. In some embodiments, the metadata migration leader sends a reference or sets a value in a shared storage space to indicate that the node(s) is to transfer the corresponding metadata (e.g., transfer all metadata managed by the node).

At each node, the portion of the metadata that the respective node is to transfer is analyzed for division into one or more subsets (see 1720). For example, a maximum number of entries (e.g., a range) or size (e.g., 1 MB subsets) could be used to divide the metadata to be transferred by that node into a plurality of subsets. As discussed herein, the larger the size of the items to be transfer the more likely that the item will fail to transfer. However, there is also overhead for transferring items. Thus, the likelihood of failure to transfer is to be balanced with the added overhead caused by the number of objects. In some embodiments, the log data structure is preprocessed to remove entries that have been superseded or deleted, generate a snapshot, validate the subset, or compute a checksum (see also FIG. 18).

At 1724 each participating node executes each of the respective subtasks to transfer the corresponding metadata. Such transfer may utilize any of the optimizations disclosed herein including at least using multiple connections at each node to initiate transfers. Additionally, at 1726 each participating node monitors the execution of each of the respective subtask to determine whether the corresponding subtask has completed using any of the approaches disclosed herein. In some embodiments, each participating node may monitor and retry any failed transfer subtask up to an indicated maximum number of iterations. Finally, at 1728 upon completion (successful or otherwise) each node reports success or failure of the transfer task. In some embodiments, failure of any particular subtask is identified by the corresponding entries that the reporting node failed to transfer. In some embodiments, the node updates a status indicator with the success or failure information. In some embodiments, the node updates a status indicator by accessing the metadata manifest file or a copy thereof and modifies one or more fields that correspond to the metadata that the node attempted to transfer. In some embodiments, the metadata migration leader will also perform metadata transfers. In some embodiments, the metadata migration leader is elected from one or more nodes that are not participating in metadata transfer (e.g., where the metadata migration leader is a management node that is separate from but otherwise coupled to the nodes of the clustered virtualization environment).

At 1730 the metadata migration leader monitors the metadata transfer tasks for success/failure. Generally, the metadata migration leader will maintain a list of nodes that are participating in the metadata transfer task. Subsequently, when a respective node reports success a tracking value is changed to indicate the processing state. When all nodes report success the process will proceed to 1731 where the metadata manifest file is processed to determine if, or verify that, all metadata was transferred successfully. If on the other hand, one or more nodes report a failure to transfer, the corresponding metadata may be identified (e.g., by the node reporting the failure or by processing the manifest file) and the process proceeds to 1740 where the distribution of any failed the data transfer tasks is updated. For instance, the distribute metadata transfer tasks 1718 might identify a different copy of a portion of metadata that failed to transfer and assign a corresponding node to transfer that portion. In some embodiments, a limited number of retries may be attempted. For example, the maximum number of retries initiate by the metadata migration leader might be proportional to the maximum number of redundant copies or a replication factor (e.g., max_retries=3*replication_factor−1). Once all the retries have been exhausted or the monitoring process determines that metadata transfer task execution is complete, the process proceeds to 1731. In some embodiments, the processes of 1716, 1718, 1730, and 1740 assign and monitor a limited number of transfer tasks at any given time and where transfer tasks are assigned to respective nodes based on a number of pending transfer task to dynamically manage transfer task distribution (e.g., new transfer tasks are assigned when the number of pending transfer tasks is below a threshold).

At 1731, the metadata migration leader takes a corresponding action based on whether the metadata transfer is complete. If the metadata transfer was completed successfully (e.g., all metadata was transferred to a target storage location based on reported success information), the process proceeds to 1732 where a message or a status parameter indicating that metadata transfer was completed successfully is asserted. On the other hand, if the metadata transfer did not successfully complete all metadata migration, the process proceeds to 1734 where a message is sent and a status parameter indicating that metadata transfer failed is asserted. In some embodiments, the failure of the metadata migration process might be reported to an administrator for review and for override (e.g., to allow cluster level migration to complete).

Figure 18:
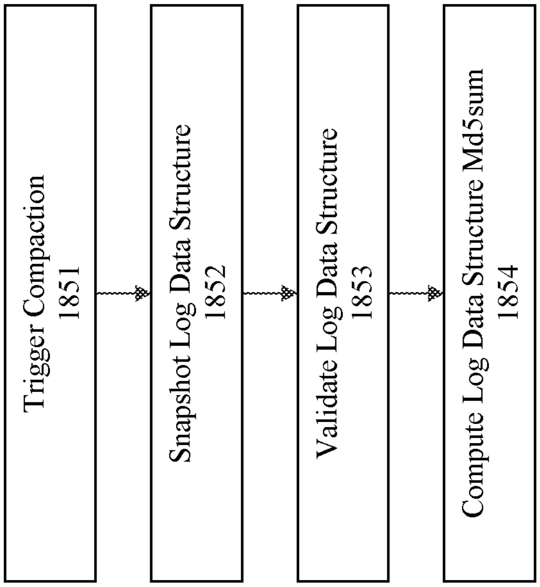
FIG. 18 illustrates an approach to preprocess log data structures according to an embodiment.

FIG. 18 illustrates an approach to preprocess log data structures according to an embodiment. Generally, the approach preprocesses the log data structure to remove entries that have been superseded or deleted, generates a snapshot, validates the entries therein, generates a checksum, or some combination thereof.

In some embodiments, the metadata is maintained in a log structure in an append-only manner. As a result, when a new entry is received, that entry is appended to the log data structure. Thus, the new entry might supersede a prior entry. Likewise, when an entry deletion is captured, that entry is not actually deleted, but instead an entry is appended to the structure to indicate that the entry is deleted when in actuality that entry is still in the log structure. As a result, any particular log structure might include multiple entries for a single item where only that last entry is currently relevant to the item. Thus, at 1851 a compaction process might be initiated on that log structure. As used with regard to at least FIG. 18, compaction is the process of generating clean log structures that do not include entries that have since been deleted and include only the lasted corresponding entry for those that have not been deleted. In some embodiments compaction may be skipped due to computation cost and the associated time required to perform the operation(s). In some embodiments, compaction is an ongoing process during normal functioning of the cluster and therefore, failure to perform compaction during preparation for transfer may result in only negligible increases in metadata to be transferred to the target storage location.

Snapshots can be generated at 1852 by creating hard links to the corresponding log data structure or subsets thereof. Verification of the log data structures can be executed using know data integrity processing at 1853.

In some embodiments, once a log data structure or subset thereof has been processed each node will compute a checksum (e.g., MD5 checksum) for the log data structure or portion thereof (see 1854). In some embodiments, the log data structure or subset thereof and the checksum are stored as separate objects at the target storage location.

Figure 19:
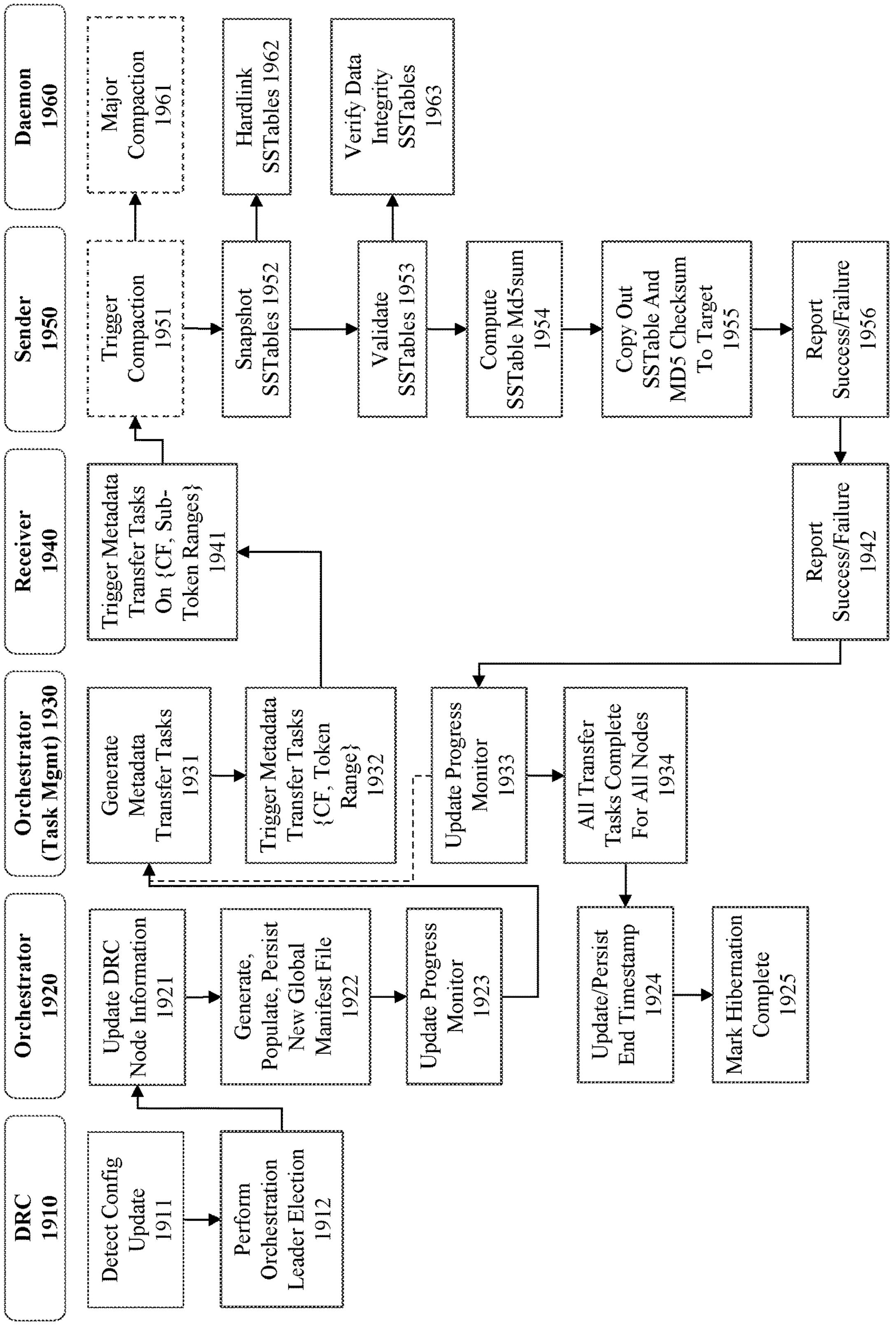
FIG. 19 illustrates another approach to process and transfer metadata to the target storage location according to an embodiment.

FIG. 19 illustrates another approach to process and transfer metadata to the target storage location according to an embodiment. Generally, the process is managed by multiple elements that interact to perform the indicated functions both within a particular node and across multiple nodes. Such an approach might comprise a particular process on a node that has been elected to be a leader of the overall metadata migration process where multiple individual nodes perform tasks assigned by the leader node and the leader node manages the overall process to ensure that all subtasks have been completed.

In some embodiments, prior to starting the metadata transfer processing, the approach shuts down all services that are not needed for metadata transfer. For instance, any service that can modify the metadata outside of the migration process is shutdown (e.g., user virtual machines, workflows, upgrades, background tasks, etc. that are not needed for the hibernation process). In some embodiments, all the services that start after the metadata manager (dynamic ring change+metadata manager monitor) during a bring up sequence for a cluster are shut down. The metadata manager implements a distributed metadata store to manage cluster metadata in a distributed ring like structure and is used herein without limitation. Generally, shutting down all other services blocks all external I/O operations to the metadata manager. As provided herein, this is because the metadata should not be modified by other processes during migration.

In some embodiments, a state of relevant parameters might indicate that preparation is completed for metadata migration (kMetadataManagerPreparationDone) and that all metadata has been migrated (kMetadataManagerDataMigrated). As provided herein, a dynamic ring change (DRC) infrastructure might be leveraged to perform the metadata migration. Generally, such an approach can serve to overcome shortcomings of using an ILM for metadata migration. Specifically, the ILM disclosed herein might be modified to use at least the dynamic ring change infrastructure, or might be replaced with a different controller (cluster hibernate controller) that can orchestrate operations of the elements disclosed herein (e.g., I/O manager, cluster administrator process, dynamic ring changer).

In some embodiments, the dynamic ring changers are provided to manage the lifecycle of the metadata ring structure which includes operations to manage the addition and removal of computing nodes into and out of the ring, whether as a result of a failure of a computing node in the ring or whether due to and architecture change of the ring. In some embodiments, multiple instances of the dynamic ring changer (DRC) are provided on respective nodes in the ring. Each DRC can operate in different modes (e.g., orchestrator—see 1910, 1920, 1930, receiver—1940, and sender—1950).

In some embodiments, a DRC in orchestrator mode (e.g., an assigned leader) starts and ends the metadata manager hibernate process (see e.g., 1911 and 1925). The orchestrator generates tasks to execute the backup on respective token ranges (e.g., start and end tokens—see 1931) at respective nodes. In some embodiments, each node is responsible for one or more token ranges (see e.g., 1941). Additionally, each node may also be responsible for maintaining a replica of one or more token ranges. As a result, each node may include metadata that is reproduced at another node. In some embodiments, in order to improve the efficiency of the process, the DRC in orchestrator mode instructs each node to execute a backup of only the token ranges for which it is a primary which does not include token ranges that are duplicates of those at other nodes in the ring.

Generally, the metadata migration process starts are 1911 when a configuration update is detected, which indicates that any prerequisites to metadata transfer processing have been completed (e.g., a hibernate node variable in combination with a data processing complete variable or a metadata processing ready variable). In response to said identification the process at 1912 will perform a leadership election process to elect a single DRC instance as an orchestrator for the hibernation process. Such an election can be performed used any relevant technique as discussed herein.

Once a DRC instance has been elected the orchestrator for the metadata migration process, it will execute various tasks to prepare for processing of the metadata. For instance, at 1921 the DRC node may update stored DRC node information to register itself as the leader for this process. Subsequently, the process may generate or update a global manifest file (see 1922) to track the status of metadata with regard to at least whether it has been replicated at the target storage location. Once complete the orchestrator updates a progress monitor (see 1923) to indicate that the manifest is created and that task generation can begin—e.g., by setting a value to indicate that the manifest was created.

At 1931 the task management portion of the orchestrator generates metadata transfer tasks. Each task corresponds to a column family (CF) and token range. For instance, the task manager identifies the corresponding CFs and token ranges that each node in the ring of nodes manages (e.g., the metadata for which each node is the primary). In some embodiments, for each of those ranges a metadata transfer task is generated. Such generated transfer tasks are then sent from the task manager (see 1932) to their corresponding DRC receiver (see e.g., 1940 and 1941). In some embodiment, the task manager identifies the corresponding CFs and token ranges that each node in the ring of nodes manages (e.g., the metadata for which each node is the primary) as well as those that each node replicates. In some embodiments, for each of those ranges a metadata transfer task is generated by and sent from the task manager (see 1932) to their corresponding DRC receiver (see e.g., 1940 and 1941).

As discussed above, each node with a DRC will be able to operate in orchestrator, receiver, or sender mode. In some embodiments, each mode is inclusive of the next in that a DRC in receiver mode is also able to perform the operations of the DRC in sender mode. Similarly, the DRC in Orchestrator mode is also able to perform the operations of the receiver and the sender modes. In this regard the modes may be thought of as additive. The hibernation workflow provides for one DRC orchestrator (which is also a receiver and a sender) at a first node, and a number of other nodes that are receivers and senders. Similarly, each orchestrator can communicate with each receiver on each node to provide task commands and to receive updates (discussed further below) to monitor and control the metadata transfer process. Thus, returning to 1932, the metadata transfer tasks are sent to each receiver at each node that is participating in the ring. Operation of each DRC instance in receiver mode will be discussed with regard to a single DRC instance as each DRC instance is (with the exception of metadata replicas) independent from other DRC instances.

In some embodiments, the number of transfer tasks generated is equal to a number of partitions×RF×number CFs where RF is the replication factor. For instance, a 4-node ring consisting of nodes A, B, C, and D, and a replication factor of 3 (RF 3), will have twelve transfer requests for a single column family (CF1). Those requests might be as follows: request C to save CF1 in the ranges (B, C), (A, B), and (D, A); request B to save CF1 in the ranges (A, B), (D, A), (C, D); request A to save CF1 in the ranges (D, A), (C, D), (B, C); request D to save CF1 in the ranges (C, D), (B, C), and (A, B). In some embodiments, each node is tasked with transferring only its primary copy of the metadata. Using the above arrangement having a 4-node ring, this would correspond to four transfer requests instead of twelve for the single column, requesting: C to save CF1 in the range (B, C); B to save CF1 in the ranges (A, B); A to save CF1 in the ranges (D, A); D to save CF1 in the ranges (C, D).

At 1941, a DRC instance receives a transfer task indicating one or more ranges with metadata they are to be transferred to the target storage location. In some embodiments, the DRC receiver (1940) does not blindly implement the task without analysis. Instead, the DRC receiver processes the request and applies one or more rules to determine how the metadata might be optimally sent to the target storage location. For instance, a collection of parameters regarding data throughput, object size, or any other parameters may be consulted and used to determine how to further break up the task of transferring respective CF token ranges into sub-token ranges—e.g., the number of sub-token ranges is determined based on a resulting object size and a threshold object size. Such operations balance throughput (e.g., due to overhead for each object transfer, larger files generally provide better data throughput) with retry costs (e.g., costs of redoing a failed transfer), and with failure rates (e.g., based on object size). Once the sub-token ranges have been determined the corresponding tasks are sent to the associated sender (see 1950). However, whereas the orchestrator sends tasks to multiple nodes in the ring, the receiver sends tasks to process sub-token ranges to a single sender which is on the same node. In some embodiments, a DRC in receiver mode (see 1940) also maintains a state in a write ahead log (WAL). In some embodiments, each node processes only transfer tasks for its primary metadata (e.g., not replica copies). In some embodiments, replica data is copied using fewer sub-token ranges then those used for primary metadata.

In some embodiments, a DRC instance in sender mode (see 1950) will perform processing to prepare the relevant sub-token ranges individually. For example, each sub-token range is separately processed by compacting the sub-token range (see 1951), generating a snapshot of the sub-token range (see 1952—e.g., by generating hard link(s)), and validating the SSTables for the token range (see 1953—e.g., performing data integrity processing), each of which may be completed with a corresponding process or daemon (see 1961, 1962, and 1963). In some embodiments compaction may be skipped due to computation cost and the associated time required to perform the operation(s). In some embodiments, compaction is an ongoing process during normal functioning of the cluster and therefore, failure to perform compaction during preparation for transfer may result in only negligible increases in metadata to be transferred to the target storage location. As used herein, compaction is the process of generating clean SSTables that do not include entries for data that was previously deleted from the cluster or that has since been overwritten. Snapshots can be generated by creating hard links to the corresponding sub-token ranges. Verification can be executed using know data integrity processing.

In some embodiments, once a respective sub-token range has been processed each DRC operating in sender mode will compute a MD5 checksum for the SSTable of the processed sub-token range (see 1954). Finally, each sender will transfer the SSTables and MD5 checksum to the target storage (see 1955). In some embodiments, the SSTables and the MD5 are stored as separate objects at the target storage location. In some embodiments, the SSTables are transferred using a multi-part upload to improve total throughput or reliability. For example, each sub-token range is transferred using a separate connection where a threshold number of connections are created at each node. In some embodiments, each sub-token range is divided into a plurality of maximally sized segments for transfer to the target storage location where those sections are transferred using separate connections. Each such connection may be operated in parallel to maximize throughput from the cluster to the target storage location. For instance, the number of connections could be optimized at a node based on a predetermined parameter (e.g., processor, memory, data to transfer, network bandwidth) or monitored by a gateway or other supervisor process and modified based on reported transfer rates to maximize throughput at the node (e.g., based on a number of pending task in a corresponding queue). Likewise, such operation could be performed at the level of the cluster for all the metadata transfer tasks during hibernation to maximize throughput at the cluster. In some embodiments, the transfer rate may be improved by allocating additional bandwidth to the DRC senders (e.g., from bandwidth reserved for non-running user processes). In some embodiments, a failed transfer may be retried a threshold number of times.

At 1956, a success or failure message is reported back to the corresponding receiver (see e.g., 1942). In response to a failure message, the receiver 1940 may retry the transfer of any sub-token range, or report failure due to timeout or breach of a threshold number of retries (see 1942). In response to each success message, the receiver will determine whether all sub-token ranges corresponding to the same CF token range transfer task received from the orchestrator have been successfully transferred, and transmit a success message to the orchestrator upon a positive determination.

At 1933 the orchestrator updates transfer status management information based on reports of success or failure from the receivers of the nodes of the ring (see 1942). In the event that all transfer tasks are reported as being completed successfully, the process at 1934 will trigger the persistence or updating of a time stamp indicating when the metadata transfer was determined to be completed (see 1924) and will mark the metadata hibernation as being completed (see 1925) by setting one or more parameters.

If at 1933 it is determined (e.g., based on a response from a receiver or a timeout) that the metadata transfer fails for one or more token ranges, the task management portion of the orchestrator may determine that one or more token ranges should be retried (see 1931). In some embodiments, the DRC processes in each mode may retry any operation that fails, subject to one or more thresholds. In some embodiments the DRC orchestrator may report a failure after a threshold number of retries have been attempted without success—e.g., transmit a failure notification to a management process such as cluster hibernate controller. In some embodiments, the transfer from the DRC senders is subject to credential validation.

In some embodiments an ongoing, periodic, or at will process is used to transmit metadata to the target storage location in advance of a hibernation signal. While such a process is similar to that discussed above, there are some differences. The main differences are that the metadata itself may change over time, and the second is that such a process should be allocated limited resources because it would occur during user access. Thus, the approach provided herein could be utilized with modifications. In some embodiments, the pretransfer of metadata would operate at the same level of the CF token ranges. For instance, the process would generate a manifest as discussed, and process that manifest in a throttled manner. Upon completion of the processing, a new manifest would be created, and differences between a previous manifest (e.g., CF token ranges with changes) would be identified for processing and transmission. Then upon initiation of the flow provided herein the process would identify CF token ranges with changes and transmit only those CF token ranges. In the event that no CF token ranges have changes the process could update the progress monitor to indicate that all transfer task are completed for all nodes at 1934.

Figure 20:
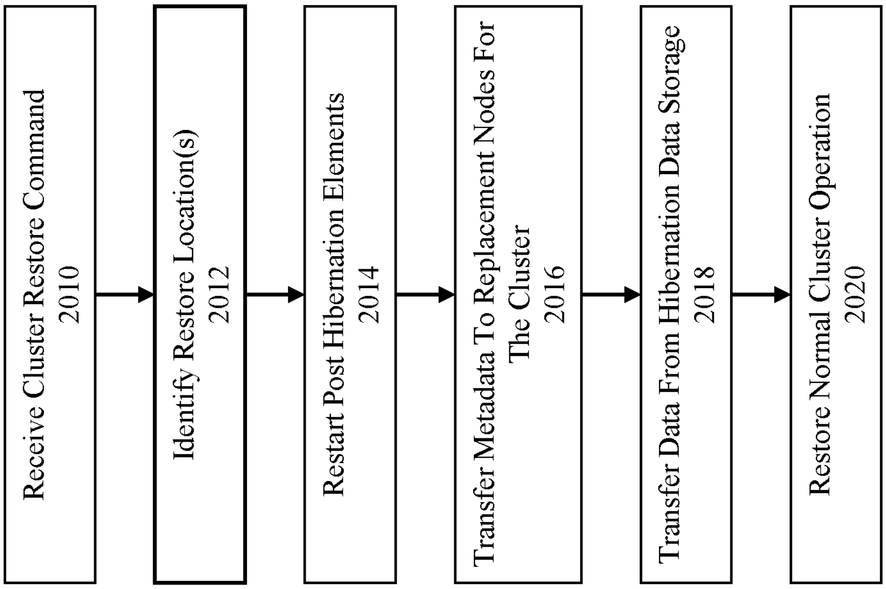
FIG. 20 illustrates an approach to restore a previously hibernated cluster according to an embodiment.

FIG. 20 illustrates an approach to restore a previously hibernated cluster according to an embodiment.

Generally, the process is the opposite of the cluster hibernate approach in that the process operates in the reverse of what was described with regard to FIG. 14. The process starts when a cluster restore command is received. Such a command may be received at a desired restore location or a location that can interface with or managed a desired restore location (see e.g., 2010). For instance, the cluster restore command might be received at a management console that can interface with a cloud services provider in which the previously captured data and metadata states can be accessed and appropriate replacement computing resources can be allocated. The underlying hardware resources (e.g., the specific restore location) are identified at 2012. For example, an allocation request might be issued for a set of bare metal nodes that match minimum specification for the cluster prior to hibernation—e.g., based on captured cluster configuration file(s) storage on the cold storage.

Once the underlying hardware resources are identified at 2012, the post hibernation elements may be restarted at 2014. In some embodiments, restarting the post hibernation elements may require restoring a set of software on the identified hardware resources and mapping resources of the new hardware resources to the previously used hardware resources—e.g., identify nodes to use for metadata management and locations for storing data of the storage pool. During the restore operations, processes to allow access to the storage pool or to send I/O commands to interact with the metadata are disabled (or at least not started) for all processes except those for the restore process.

At 2016, the previously captured metadata is restored to the newly identified hardware resources. For instance, the previously generated manifest file is accessed to determine which nodes should include the primary copy of a portion of metadata and which nodes should include a redundant copy of the metadata. Subsequently, each node retrieves a copy of the metadata for which it is a primary and then transmits copies to any replica nodes for storage of redundant copies. In this way the metadata and the replicas thereof can be restored in an equivalent structure (e.g., one with the same number of nodes and equivalent relationships).

Similarly, the data can be restored from the cold storage location at 2018. For instance, each node ID and disk ID in a data items list or manifest file is mapped to a node ID and Disk ID in of the new hardware resources. In some embodiments, the new hardware resources are assigned corresponding node IDs and disk IDs based on those at the time of data item migration. Subsequently, using this information the previously stored manifest file can be used to identify which data items go to which node and corresponding copy operations can be executed. Once all the data has been copied over, normal operation of the cluster can resume at 2020. In some embodiments, the restore operations for the data comprise essentially copy or write operations that are executed at storage devices of a storage pool and in which corresponding entries are created in the metadata for managing the storage pool (e.g., to identify the copy on a storage device that is local to a node as being a replica of the data item, wherein the metadata received identified the cold storage location as having a replica of that same data item). In some embodiments, the data is maintained in shards that are distributed on the local storage devices of the clusters. For instance, when a replica of a data item is copied from the cold storage location to newly allocated cluster resources, each data item is written to a new shard and a corresponding entry is created in the metadata for managing the storage pool that identifies the location of the data item in the shard which is in turn associated with other location information (e.g., the disk in which the shard is stored, the starting physical address of that shard, and the size of the shard).

Figure 21:
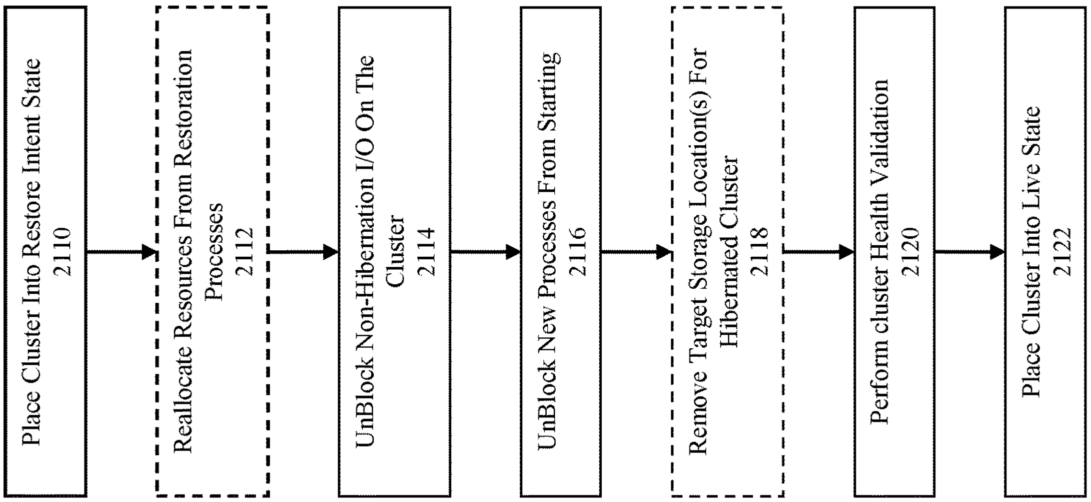
FIG. 21 illustrates an approach to restore a cluster to normal operation according to an embodiment.

FIG. 21 illustrates an approach to restore a cluster to normal operation according to an embodiment.

In some embodiments, the process starts by placing the cluster into a restore intent state at 1010. For instance, the cluster may be placed into a restore intent state by updating a status bit to indicate that the state has been entered. In some embodiments, the restore intent state is entered after the metadata and data have been restored to the cluster on the new hardware resources. In some embodiments resources are allocated to restoration processes without any reserved for user or other processes. Subsequently, in some embodiments, resources from the restoration process are reallocated to non-restoration processes (e.g., user virtual machines, workflows, upgrades, background tasks, etc. that are not needed for the hibernation process) at 2112 using normal allocation processes after the metadata and data restore operations complete.

At 2114 and 2116 blocks are removed. For instance, non-hibernation I/O on the cluster is unblocked at 2114, and starting new processes is unblocked at 2116—e.g., by moving the cluster out of a maintenance mode or update one or more corresponding status bits. In this way user, maintenance, service, or other processes may be started on the cluster. Additionally, since the data and metadata haven been restored to the cluster the previous target storage location (e.g., the cold storage location with the representation of the cluster) can be removed at 2118. Finally, at 2120 cluster health validation is performed to verify the state of the cluster is ready prior to placing the cluster in a live state for user at 2122. In some embodiments, 2114, 2116, 2118, and 2120 may happen in any order or in parallel.

Figure 22:
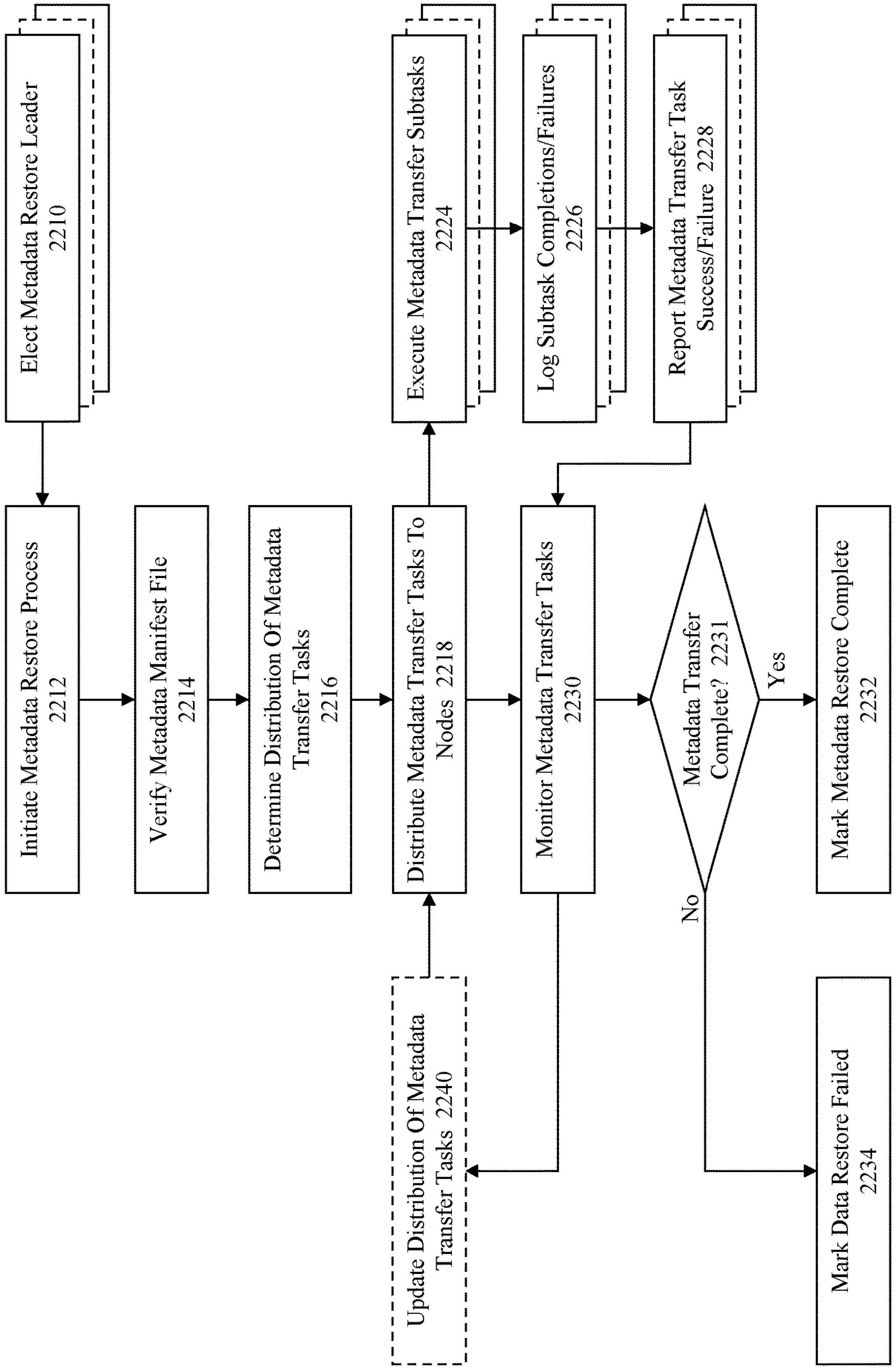
FIG. 22 illustrates an approach to process and transfer metadata from the target storage location and back to hardware resources allocated to a to be restored cluster according to an embodiment.

FIG. 22 illustrates an approach to process and transfer metadata from the target storage location and back to hardware resources allocated to a to be restored cluster according to an embodiment. Generally, the approach provided here is directed towards restoring a cluster from hibernation. For instance, multiple nodes, all or at least a subset, of a cluster may interact to elect a node as a leader of the data migration process and then operate in a distributed fashion under the supervision of the leader node to identify and restore data items from the previous target location (e.g., cold storage location). Such corresponding nodes are to be logically arranged in a manner equivalent to the arrange at the time of metadata migration.

For instance, one part of the approach might comprise a plurality of nodes electing a metadata restoration leader (see 2210). For instance, after a trigger is asserted/received each node that is to manage at least a subset of the metadata might send a request to become a leader of the data restoration process. In some embodiments, the elected leader is limited to selection from nodes that manage at least a subset of the metadata to be transferred.

Once the metadata restoration leader has been elected, the leader issues a command or updates a control signal to initiate the metadata restoration process (see 2212). Such a process starts by verifying a previously generated manifest file (See 2214) that indicates the portions and locations of metadata to be transferred. In some embodiments the metadata is maintained in sorted string tables (SSTables) or in other log-based data structures or append-only data structures.

At 2216, the distribution of metadata transfer tasks is determined by the metadata restoration leader. For example, the distribution of metadata transfer tasks may be dictated based on which node is to manage which set of entries (e.g., based on a token range, address range, hash, or other value) and is enforced by the metadata migration leader. Generally, such information is maintained in, or referenced by, the manifest file for easy restore. Once the corresponding portion(s) has been identified for each node, the process proceeds to 2218 where those tasks are distributed to the corresponding nodes. For instance, the metadata restoration leader might send a message to each node that is to manage the metadata which identifies the portion of the metadata that the individual node is to transfer from the target storage location. In some embodiments, the metadata restoration leader sends a reference or sets a value in a shared storage space to indicate that the node(s) is to transfer the corresponding metadata (e.g., transfer all metadata to be managed by the node) back to itself.

At 2224 each participating node executes each of the respective subtasks to transfer the corresponding metadata from the target storage location. As discussed above, during the hibernation process, the metadata is divided into subsets and transferred to the target storage location (see FIG. 17). As a result, the restoration process does not have to reanalyze the metadata in order to restore that metadata in an efficient manner. Instead, each node can simply copy the metadata that is managed by that respective node from the cold storage location back to itself. Such transfer may utilize any of the optimizations disclosed herein including at least using multiple connections at each node to initiate transfers.

Additionally, at 2226 each participating node monitors the execution of each of the respective subtasks to determine whether the corresponding subtask has completed using any of the approaches disclosed herein. In some embodiments, each participating node may monitor and retry any failed transfer subtask up to an indicated maximum number of iterations. Finally, at 2228 upon completion (successful or otherwise) each node reports success or failure of the transfer task. In some embodiments, failure of any particular subtask is identified by the corresponding entries that the reporting node failed to transfer. In some embodiments, the node updates a status indicator with the success or failure information. In some embodiments, the node updates a status indicator by accessing the metadata manifest file or a copy thereof and modifies one or more entries that correspond to the metadata that the node attempted to transfer. In some embodiments, the metadata restoration leader will also perform metadata transfers. In some embodiments, metadata restoration leader is elected from one or more nodes that are not participating in metadata transfer (e.g., where the metadata restoration leader is a management node that is separate from but otherwise coupled to the nodes of the clustered virtualization environment).

At 2230 the metadata restoration leader monitors the metadata transfer tasks for success/failure. Generally, the metadata restoration leader will maintain a list of nodes that are participating in the metadata transfer task. Subsequently, when a respective node reports success a tracking value is changed to indicate the processing state. When all nodes report success the process will proceed to 2231 where the metadata manifest file is processed to determine if, or verify that, all metadata was transferred successfully back to the cluster. If on the other hand, one or more nodes report a failure to transfer, the corresponding metadata may be identified (e.g., by the node reporting the failure or by processing the manifest file) and the process proceeds to 1740 where the distribution of any failed data transfer tasks is updated. For instance, the distribution of the metadata transfer tasks might identify a different node to transfer the corresponding portion. In some embodiments, a limited number of retries may be attempted. Once all the retries have been exhausted or the monitoring process determines that metadata transfer task execution is complete, the process proceeds to 2231.

At 2231, the metadata restoration leader takes a corresponding action based on whether the metadata transfer is complete. If the metadata transfer was completed successfully (e.g., all metadata was transferred from a target storage location and back to the newly identified hardware resources based on reported success information), the process proceeds to 2232 where a message or a status parameter indicating that metadata transfer was completed successfully is asserted. On the other hand, if the metadata transfer did not successfully complete all metadata restoration, the process proceeds to 2234 where a message is sent or a status parameter indicating that metadata transfer failed is asserted. In some embodiments, the failure of the metadata restoration process might be reported to an administrator for review and for override (e.g., to allow cluster level restoration to complete).

Figure 23:
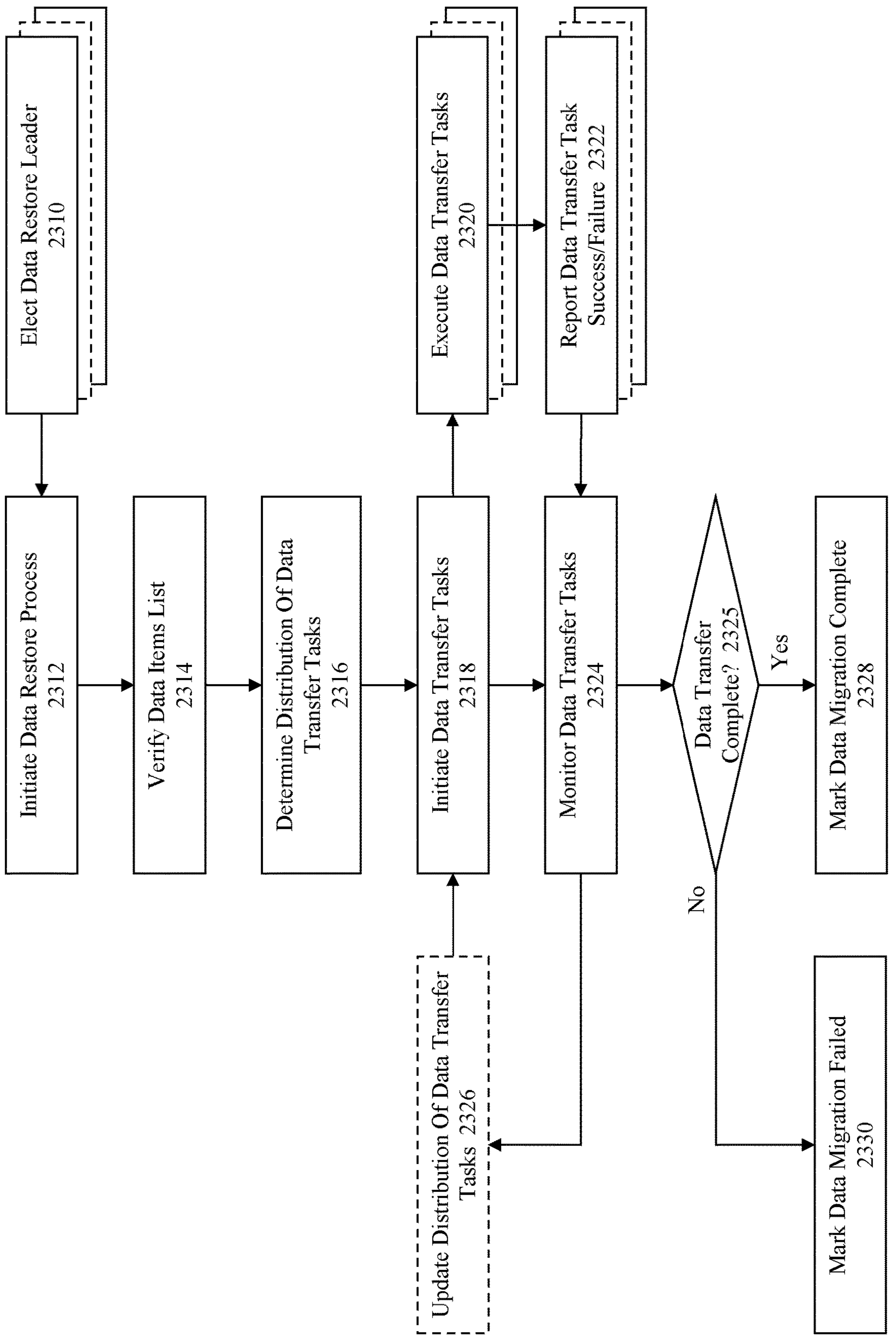
FIG. 23 illustrates an approach to restore data from the target storage location according to an embodiment.

FIG. 23 illustrates an approach to restore data from the target storage location according to an embodiment. Generally, the approach provided here is directed towards restoration of data of a previously hibernated cluster. For instance, multiple nodes, all or at least a subset, of a cluster may interact to elect a node as a leader of the data restoration process and then operate in a distributed fashion under the supervision of the leader node to identify and restoration data items from a target location (e.g., cold storage location) to corresponding nodes of the cluster.

For instance, one part of the approach might comprise a plurality of nodes electing a data restoration leader (see 2310). For instance, after a trigger is asserted/received, each node might send a request to become a leader of the data restoration process. Once the data restoration leader has been elected, the leader issues a command or updates a control signal to initiate the data restoration process. Such a process starts by verifying a data items list previously generated for the hibernated cluster (See 2314). In some embodiments, each data item is identified in a tabular structure or database where each data item or group of data items is identified (e.g., by an object, file, extent group, extent, or block identifier) and the address or addresses of each copy is identified. In some embodiments, verification of the data items list comprises an analysis against already restored metadata to determine whether each unique data item is accounted for in the data items list.

At 2316, the distribution of data transfer tasks is determined by processing the data items list. For instance, the data transfer tasks are identified as reproduction of each data item from the cold storage location to the equivalent location from which it was previously transferred. For instance, each node ID and disk ID is mapped to a corresponding node ID and disk ID of the replacement hardware resources. After each entry in the data items list has been processed, the data restoration leader initiates transfer of the data items at 2318. For instance, the data migration leader might broadcast a message to indicate that the data transfer should commence, may update a state value representing completion of the data transfer task distribution, or send a message to each node that is to transfer data items that references or includes an identification of the data items to be transferred from the cold storage location back to that node.

At 2320, each node will execute the data transfer tasks assigned to it by the data restoration leader node. For example, a table in a shared memory or storage region is accessed by each node to identify a first or next data item to be transferred by the accessing node. Each data transfer task can then be executed in any appropriate order (e.g., based on appearance order, index, or other value). The actual transfer of the data items may be completed in any appropriate manner and may utilize any of the optimizations disclosed herein such as those discussed at least in regard to FIG. 11.

At 2322, while the data transfer tasks are being executed, each node will monitor its own transfers to determine whether the transfer was successful or failed. For instance, each data item might be transferred using any number of packets where one or more packets in the aggregate contain the data item. Thus, a local process might monitor the transfer of each packet for a data item, collect the success/failure messages for that data item (e.g., in a vector comprising a collection of Boolean values indicating success or failure) and manage the retry of any failed packets. When all the packets have been successfully transferred, the node would then update the status of the data item (e.g., in a local data structure or in a shared storage) to indicate success. If the transfer fails any appropriate number of retries may be attempted. If a threshold number of retries fail then the receiving node will report a failure to transfer the data item (e.g., in a local data structure or in a shared storage). In some embodiments, each node will report data transfer task results. For example, a node might report data transfer completed successfully, completed with errors (possibly including an error count), or failed to complete (when some or all data transfers failed). In some embodiments, the data restoration leader will also perform data transfer tasks. In some embodiments, the data restoration leader is elected from one or more nodes that are not participating in data transfer (e.g., where the data restoration leader is a management node that is separate from but otherwise coupled to the nodes of the clustered virtualization environment).

At 2324 the data restoration leader monitors the data transfer tasks for success/failure. Generally, the data restoration leader will maintain a list of nodes that are participating in the data transfer task. Subsequently, when a respective node reports success a tracking value is changed to indicate the processing state. When all nodes report success the process will proceed to 1625 where the manifest file (e.g., the table having the complete list of data items to be transferred) is processed to determine if, or verify that, all data items were transferred successfully. If on the other hand, one or more nodes report a failure to transfer, the corresponding data items may be identified (e.g., by the node reporting the failure or by processing the data items list) and the process proceeds to 2326 where the distribution of any failed the data transfer tasks is updated. For instance, the distribution of the data transfer tasks might identify a different node to transfer that data item—e.g., a node that previously maintained a copy of the data item. In some embodiments, a limited number of retries may be attempted. Once all the retries have been exhausted or the monitoring process determines that data transfer task execution is complete, the process proceeds to 2325. In some embodiment, each data item is copied to storage pool and a corresponding entry is added to the metadata for managing the storage pool to indicated that the location of the data item (which is a replica of a data item on the cold storage). In some embodiments, a replica management process executes a process to generate the necessary numbers of replicas in the storage pool.

At 2325, the data restoration leader takes a corresponding action based on whether the data transfer is complete. If the data transfer was completed successfully (e.g., all data items were transfer from the target storage location based on reported success information), the process proceeds to 2328 where a message or a status parameter indicating that data transfer was completed successfully is asserted. On the other hand, if the data transfer did not successfully complete all data item restorations, the process proceeds to 2330 where a message or a status parameter indicating that data transfer failed is asserted. In some embodiments, the failure of the data restoration process might be reported to an administrator for review and for override (e.g., to allow cluster level restoration to complete).

Figure 24:
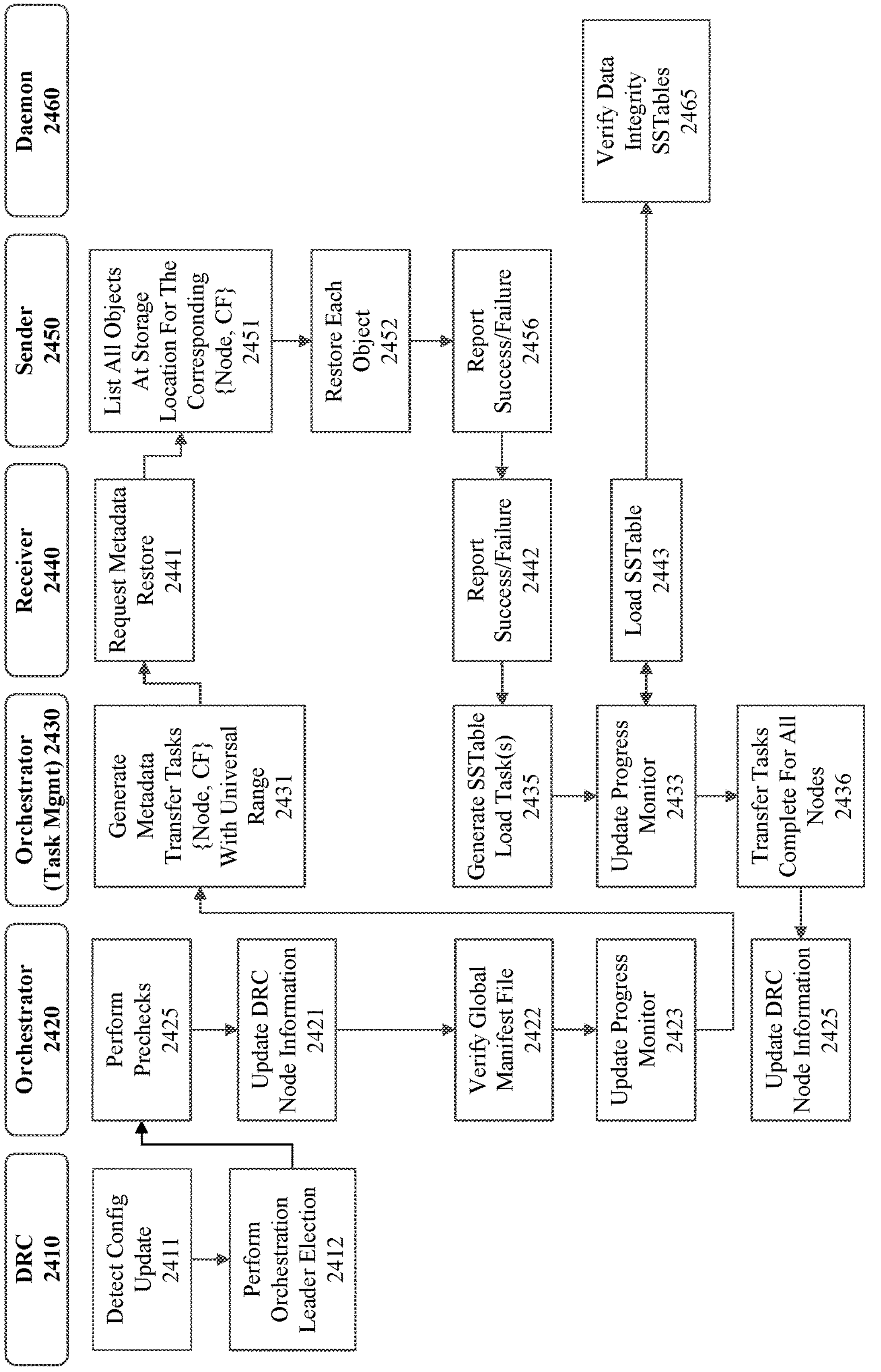
FIG. 24 illustrates an approach to process and transfer, metadata from the target storage to a cluster being restored according to an embodiment.

FIG. 24 illustrates an approach to process and transfer, metadata from the target storage to a cluster being restored according to an embodiment.

In some embodiments, the DRC 2410, orchestrator 2420, orchestrator task management component 2430, receiver, 2440, sender 2450, and daemon 2460 may be equivalent or even the same as the similarly named DRC 1910, orchestrator 1920, orchestrator task management component 1930, receiver, 1940, sender 1950, and daemon 1960.

In some embodiments, a resume flow for the metadata is triggered when a cluster status store config state is changed from a hibernated state to a restore state. A parameter may indicate that a cluster hibernate controller has prepared the cluster for the metadata manager to start a restore operation when a corresponding parameter is set (e.g., kRestoreMetadataManagerPreparationDone) and similarly the metadata restoration is completed when a corresponding parameter is set (kRestoreMetadataManagerDataRestored). The resume operation flow leverages the dynamic ring changer (DRC) infrastructure herein and uses file shipment for metadata transfer and for metadata restore.

In some embodiments, the restore process works in the reverse of the flow provide in FIG. 14 to undo what occurred at the corresponding location in the flow. For instance, post hibernate processes (see 1418) are reversed and a minimal cluster is restarted without the metadata or data storage being populated. Subsequently appropriate parameters are set to indicate to the process that the metadata system (e.g., one managed by the metadata manager using DRC instances) can be restored. Once such an indication is created, the metadata restoration process begins at 2411 in response to the configuration update detection. Then a DRC instance is elected as a leader node at 2412. For example, a first node could be select by default as a leader node instance. In some embodiments, a minimum number of nodes are started with DRC instances (e.g., 3) and an election process is undertake as discussed herein. At 2425 any prechecks are completed. For instance, the DRC instances may verify that they have the necessary storage allocation, and that each DRC instance is responsive to a heartbeat request. In some embodiments, a global manifest file is restored and analyzed to determine the number of nodes required for the set of metadata to be restored. In some embodiments, images of the boot drives for the nodes that form the ring were captured previously (e.g., at the time of hibernation), and restored to reform the ring. In some embodiments, at 2421 DRC node information is updated to indicate which nodes are part of the ring of nodes and their ordering information. Subsequently, status information is updated by a progress monitor at 2423 to indicate the progress of the metadata restore flow and the verification of the manifest file.

At 2431 metadata transfer tasks are generated. However, in contrast to the generation discussed above in regard to 1931, the task here are provided at the node level. Specifically, the tasks are to restore all token ranges of CFs to their corresponding nodes. Specifically, since the token ranges and sub-token ranges were already generated as saved as objects (or files), such information can simply be retrieved and stitched back together. Thus, the generated metadata transfer tasks are sent to each node in the ring with each node being assign a logical position therein that corresponds to a similarly situated node in the cluster prior to hibernation. Subsequently, a sender at each node generates a list of all objects at the target storage location corresponding to that node (see 2451), and receives the objects from the target storage location for restoration at 2452. After which, success or failure is reported to the sender (see 2456) and forwarded to the orchestrator (see 2442). In some embodiments, the restoration of each object can be retried in the event of a failure up to a threshold number of times.

Once the task management portion of the orchestrator receives success messages from all the nodes that form or will form the ring, the process will trigger the generation of an SSTable load task(s) (see 2435) to load the SSTables at each node of the ring and update a progress monitor (see 2433) e.g., to indicate that the SSTable objects where successfully received. The SSTable load task(s) is sent to each receiver of each node and triggers a distributed validation of the SSTables using local daemon processes that perform data integrity verification of the SSTables at 2465 before loading them into the appropriate storage location.

Figure 25:
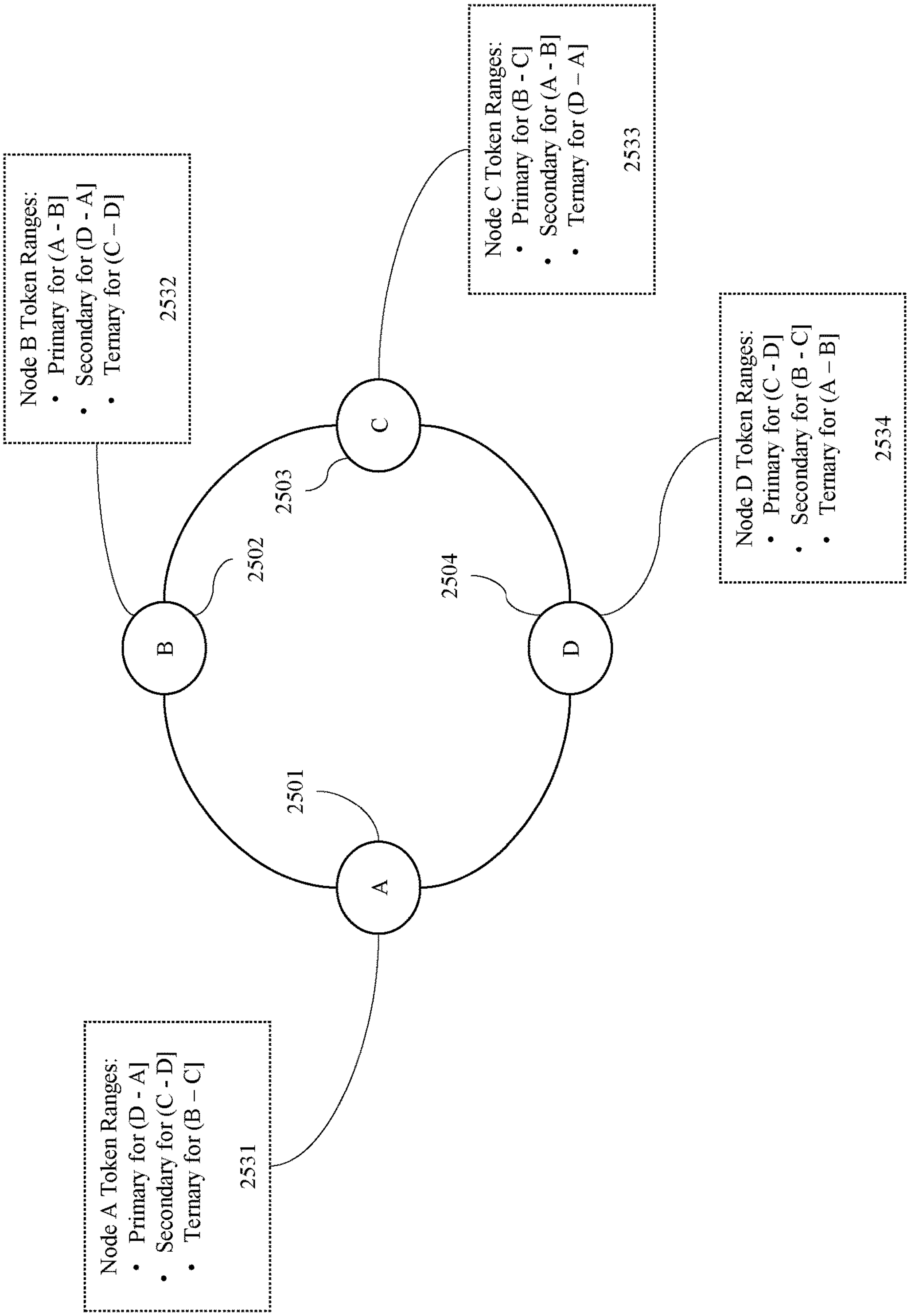
FIG. 25 illustrates an example ring structure according to an embodiment.

Once all load SSTable task(s) have been complete the process updates the process monitor to indicate completion and updates DRC node information (see 2433, 2436, and 2425). In some embodiments, only the primary metadata is transferred and the metadata load processes (e.g., 2435 and 2443) coordinate to exchange replicas to achieve a specified replication factor. For example, each node in the ring will send its corresponding CF data to RF minus 1 nodes in the ring. Thus, if RF=3 then each node will send a duplicate copy of its CF data to two nodes (e.g., the next two nodes in the ring). In this way, the data retrieved does not include duplicates. FIG. 25 illustrates an example ring structure according to an embodiment.

As illustrated herein, the ring comprises four nodes that are interconnect along points in a ring. Generally, the ring may comprise any number of nodes provided that the number is sufficient to maintain the necessary number of replicas (e.g., minimum number of nodes=replication factor). For instance, A is connected to B which is connected to C which is connected to D which is connected to A (see 2501-2504). Additionally, each node in the ring is responsible for three replicas. The first replica at each node is the primary replica for which the node is responsible for servicing requests (see primary replicas for at 2531-2533). The second replica is the primary data from a node at an adjacent position in the ring (the example provided herein has replica data replicated in a clockwise fashion though counterclockwise could also be practiced) (see secondary replicas for at 2531-2533). The ternary replica is the primary data from a node that is adjacent to the node that is adjacent from the node with the ternary replica (see ternary replicas for at 2531-2533). In this way, each node will maintain metadata used to service requests and metadata maintained for safekeeping.

Cloud Disks Coupled to Hosts

In some embodiments, target storage locations comprise one or more cloud disk(s) which are decoupled from hosts. For instance, a hyperconverged infrastructure operating system—e.g., acropolis operating system (AOS), might have a provision of attaching cloud disks such as those provided by Amazon—e.g., S3 storage to a node of a plurality of nodes that form a cluster. Such disks show up in a disk list along with regular physically attached disks and provide the necessary information (e.g., disk/bucket identification) and credentials for access. Hyperconverged infrastructure operating system services, such as the I/O manager and the metadata manager can use interfaces that provide access to cloud storage, like the AsyncS3Client interface, in order to access the specified bucket and store the required metadata and data.

Generally, a cloud disk is treated as a regular disk by the I/O manager (e.g., a physically attached storage device) and its access is abstracted via a disk manager (e.g., S3EgroupManager) or as a group by the I/O manager. Thus, initialization of the disk manager follows the same workflow as regular direct attached disks. The basic characteristics of this are the existence of the mount path specified in the disk configuration in the cluster status store. For instance, a disk_config.json file at the node includes a service_vm_id in the disk_config set to the id of the resource (e.g., control virtual machine) to which the cloud disk is associated. During I/O manager startup, a storage disk's information repository (e.g., folder) is scanned, and when the above conditions are met (e.g., when the ID of the service VM is set to the ID of the cloud disk), a disk manager object is created for the cloud disk at the managing node. After which, the operations (e.g., extent store operations received at the I/O manager) can be executed against the disk using the standard operations such as Read, ReadVec, Write, and Write Vec interfaces, which are then used to generate appropriate calls (e.g., GetObject/PutObject calls) to the corresponding cloud storage interface (e.g., AsyncS3Client)

via the disk manager (e.g., S3EgroupManager) implementation (e.g., translation layer).

One potential pitfall with this setup is that if the I/O manager instance owning the cloud disk is down, then the cloud disk may become inaccessible to the rest of the cluster—e.g., disk manager object is on the node that is down. Thus, for operations like a resume or restore, when the only copy of the hibernated data (e.g., egroup) is present on the cloud disk, the data becomes unavailable until that I/O manager is brought back online. Such an approach is not particularly well suited to the present example because the disk has no physical association with a particular physical node on which the particular I/O manager instance was running—e.g., because the cloud disk is not physically attached to the node running the I/O manager instance the cloud disk could in theory be assigned to a different node should the cloud disk owner go down. Additionally, the prior approach was less detrimental because data at a storage device physically attached to the same node as the instance was duplicated elsewhere and could thus still be accessed despite a failure. However, egroups with replicas that are only on the cloud disk (e.g., not yet transferred to any nodes in the clustered virtualization environment), or where only a single copy is created local to the cluster (e.g., one replica that is local to the down node and one replica that is at the cloud disk), failure of the I/O manager down node will cause the data to be either inaccessible or slow to access at least because the host (node) with the I/O manager instance must be brought back up prior to access. Thus, it would be better to have the replica online at all times to allow access to that data (egroup or data therein).

However, current provisioning workflows for cloud disks are implemented by a cluster hibernate controller which sends an remote procedure call (RPC) request to a separate service to provision the specified cloud disks on the local virtual machine or node. As part of this request, the separate service populates a disk entry in the cluster status store config, and creates a mount path directory and disk config file (disk_config.json). In some embodiments, the machine ID (e.g., service_vm_id) of the disk configuration in cluster status store is set to the local controller virtual machine id.

Since cloud disks are virtual entities and thus not physically bound to a particular node, when or if a previously configured node goes down or is replaced, the cloud disk could potentially be associated with another node that is currently alive. A discussion of an approach to decouple a cloud disk are provided below.

Decoupling Cloud Disks

In some embodiments, a modified approach skips the creation of the directory and JSON file discussed above. Instead, the approach merely adds the disk config entry in the cluster status store. As used herein the cluster status store is an interface for configuration information for the cluster and may be used in some embodiments to access the cluster status store to manage cluster configuration data both of which are used herein without limitation. The cluster status store also stops populating the machine ID field. Once configured, the I/O manager will start hosting the cloud disks, similar to how it hosts other disks using cluster status store leadership (e.g., the I/O manager uses a distributed approach to management of disks). Generally, as part of initialization, the I/O manager iterates over a list of disks in the cluster status store config (disk_list) and volunteers for leadership for a cloud disk using a cloud disk id. In some embodiments, the process uses an existing vDisk namespace from a common cluster status store component id namespace. In some embodiments, the approach is implemented by a plurality of I/O manager instances at each node of a plurality of nodes that form the clustered virtualization environment.

Figure 26:
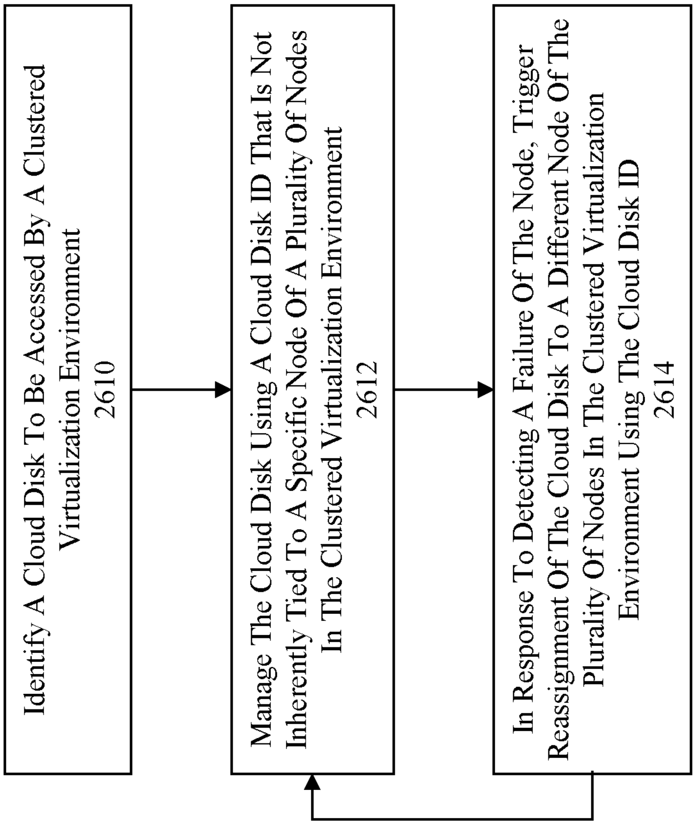
FIG. 26 illustrates an approach to management of cloud disks according to an embodiment.

FIG. 26 illustrates an approach to management of cloud disks according to an embodiment. Generally, the approach operates using a cloud disk ID that is not inherently tied to a specific node of a plurality of nodes in the clustered virtualization environment so that the cloud disk ID can be associated with an appropriate management process (e.g., virtual machine) even when a node that currently owns the cloud disk goes down.

At 2610, a cloud disk to be access by a clustered virtualization system is identified. For instance, a user might provision a cloud disk (e.g., an S3 bucket) to be added to the cluster. In some embodiments, a user might instruct the cluster to go into a hibernated state and to migrate to cloud storage. In such an instance, the cluster administrator process might determine an appropriate number of cloud disks (e.g., S3 buckets) for use in transferring and storing the data and metadata of the cluster as discussed herein. In some embodiments, a user might initiate restoration of the cluster to an active environment (e.g., to a plurality of bare metal nodes provided by a service provider or managed internally but a company. Generally, when restoring the state (e.g., data, metadata, and configuration) of the cluster, multiple cloud disks will likely need to be access. As provided herein, one approach might process a manifest or other filing that indicates relevant characteristics of a hibernated cluster including the locations (e.g., cloud disk—S3 buckets) upon which data or metadata was stored. Each disk might be identified by the process.

Once a cloud disk has been identified by the clustered virtualization system, that cloud disk might be managed using a cloud disk ID that is not inherently tied to a specific node of the plurality of nodes that form the clustered virtualization environment (see 2612). For instance, the cloud disk ID might be maintained in a distributed data structure accessed by the plurality of nodes, wherein an owner of the cloud disk is identified by associating the ID of that owner (e.g., a virtual machine such as an instance of a control virtual machine as disclosed herein). After a cloud disk is associated with a particular owner, that process monitors and responds to failures of the owner (e.g., a virtual machine or node that crashed) by triggering reassignment of the cloud disk to a different node or virtual machine of the plurality of nodes in the clustered virtualization environment using the cloud disk ID that is not inherently tied to a specific node of a plurality of nodes (see 2614).

Figure 27:
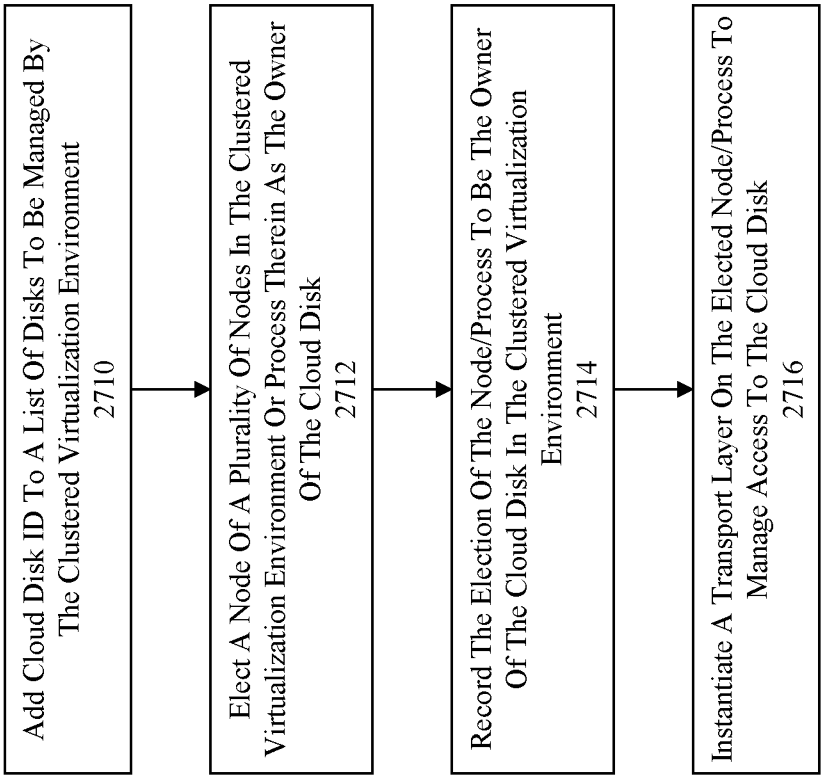
FIG. 27 illustrates an approach to management of cloud disks according to an embodiment.

FIG. 27 illustrates an approach to management of cloud disks according to an embodiment. Generally, the approach operates using a cloud disk ID that is not inherently tied to a specific node of a plurality of nodes in the clustered virtualization environment and that is managed using leader election process.

For instance, any cloud disks that are to be hosted by the clustered virtualization environment might be added to a list of disks (e.g., vDisks) to be managed by the cluster virtualization environment (see 2710). In some embodiments, adding a cloud disk ID is executed by the I/O manager (e.g., added by an I/O manager instance that is elected as a leader of the I/O managers) using a cloud disk ID. In some embodiments, one or more parameters are added to the list of disks to characterize the cloud disk or to allow for access (e.g., credentials, protocol, and location for management of the cloud disk). In some embodiments, the list of disks is maintained in the cluster status store config in a distributed fashion and is accessible by the nodes of the clustered virtualization environment.

At 2712, a node of the plurality of nodes (or a process therein—e.g., control virtual machine) is elected as the owner of the cloud disk. An example of an approach to elected a node or process therein as the owner is discussed in regard to at least FIG. 28. Regardless of how the determination is made as to what node is to be the owner of the cloud disk, the election is recorded in the clustered virtualization environment (e.g., by updating a value managed by the cluster status store and stored in the cluster status store config or a list of disks therein) at 2714.

Finally, at 2716, a corresponding transport layer is instantiated on the node or process to manage access to the cloud disk. Generally, a cloud disk will utilize a network transport layer which will translate I/O received into an appropriate format for transmission. For instance, I/O received from a virtualized entity in the clustered virtualization environment might be translated to corresponding gets and puts to be sent over a network. Additionally, the transport layer might include logic for authentication and appropriate identification of the cloud disk (e.g., a function to translate the cloud disk ID to a corresponding address, port, and set of credentials).

Figure 28:
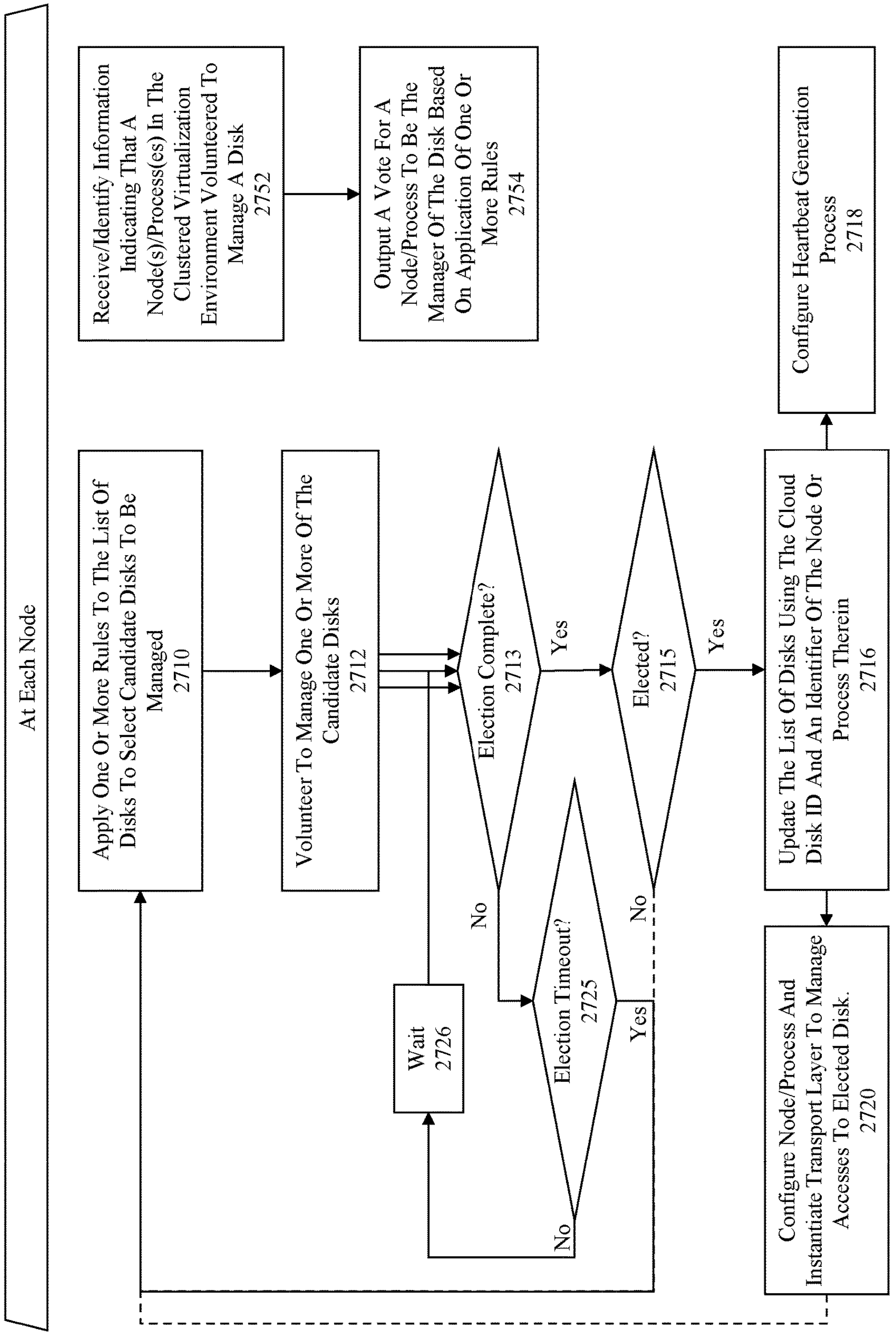
FIG. 28 illustrates an approach to management election of nodes/processes to manage disks according to an embodiment.

FIG. 28 illustrates an approach to management election of nodes/processes to manage disks according to an embodiment. Generally, the approach operates in a distributed manner where multiple nodes/processes each access and analyze a list of disks (or copy thereof) to determine which disks the node/process is going to volunteer to manage. After volunteering to be the manager of a disk, each node will generally also receive information indicating that other nodes/processes have also volunteered to manage one or more disks. Each node may then issue a vote for a particular node or process to become the owner of a respective disk.

For a respective node the plurality of nodes or processes therein, the approach generally starts at 2710 where, the node applies one or more rules to the list of disks to select candidate disks to be managed. For example, the node might execute a multi-step process by first copying the list into local memory, pruning entries for disks that the node/process cannot manage, applying a ranking scheme, and then selecting a target number of disks as candidate disks. The ranking scheme might rank disks based on the location that their data is stored (e.g., data stored on physical storage devices that are physically attached to the underlying node might be ranked the highest, followed by cloud disks since cloud disks are not tied to any specific hardware in the clustered virtualization environment.

In some embodiments, each process might comprise an I/O manager instance which tracks the total number of provisioned cloud disks in the cluster, and the total number of live nodes. With this the process can compile an optimal number of cloud disks per node (e.g., ideal_cloud_disks_per_node=total_number_of_cloud_disk/live_node_count). Similarly, the process can determine an appropriate number of vDisks (e.g., a minimum and a maximum number). Using any of the information that is available, the node/process volunteers to manage one or more of the candidate disks at 2712. For instance, the process might volunteer to manage disks based on a total number of cloud disks or vDisks already managed, a number and type of disks not yet managed, a number and type of disks that is proportional to 1 over the number of nodes, or some combination thereof. In some embodiments, a node/process volunteers to manage a disk by broadcasting a message to the cluster indicating that the node is volunteering to manage the identified disk (e.g., by a vDisk or cloud disk ID). In some embodiments, a node/process volunteers to manage a disk by placing an entry in a shared document (e.g., an entry having a time stamp, node ID, process ID, random number, or some combination thereof).

At 2713, the process makes a determination if an election is complete. For example, the process might determine if there have been a sufficient number of responses (e.g., messages or entries in a shared document) have been received to determine if a manager can be elected. If all or a sufficient number of responses have been received to form a quorum (e.g., a majority of processes or nodes have answered) the process proceeds to 2715 where it is determined whether the node or process was elected to manage a respective disk or cloud disk. However, if at 2713 it is determined that the election has not completed the process proceeds to 2725 where a timeout determination is made to determine whether the election is to be considered timed out. If the process has not timed out a period of time may be waited at 2726 before proceeding back to 2713 to again determine whether an election has been completed. If the process does time out as determined at 2725, the process may return to 2710 where the list of disks is analyzed again to determine if there are any candidate disk selections to be made.

If it is determined at 2715 that the node/process has been elected to manage any particular disk (cloud disk or otherwise), the process proceeds to 2716 where the ownership of the corresponding disk (e.g., cloud disk) is updated to reflect the election of that node/process to be the manager—e.g., a machine ID value for the disk is set to a service_vm_id of the node/process. Additionally, a heartbeat generation process may be started or be configured to be associated with the corresponding disk ID (e.g., cloud disk ID) and frequency. Similarly, the node/process is configured to include an instantiation of any corresponding transport layers necessary for managing the disk (e.g., managing I/O access to the disk). For instance, a cloud disk transport layer might comprise an http layer that translates I/O received from one or more processes in the clustered virtualization environment and to the cloud disk using HTTP.

Additionally, each node may execute a set of logic to collect or access information regarding which nodes/processes volunteered to host any particular disks. For instance, one approach might comprise receiving or identifying information indicating that node(s)/process(es) in the clustered virtualization environment volunteered to manage a disk at 2752. Subsequently at 2754, the process might output a vote for a node/process to be the manager of the disk by applying one or more rules to determine which node or process should be elected.

In some embodiments, the I/O manager, periodically or in response to a trigger, determines whether it is hosting (managing) more than the ideal number of cloud disk and relinquishes leadership of one or more cloud disk when the num_hosted_cloud_disk>=ideal_cloud_disks_per_node. In some embodiments, the node instantiates a disk manager object while in an initialization mode and inserts it in a disk_id_map. In some embodiments, access to the disk_id_map is serialized when accessed from outside the disk manager's function executor—e.g., because the disk manager will be inserting new entries in the map at runtime.

In some embodiments, requests received before a disk manager comprising or including a corresponding transport layer is instantiated will return an error message (e.g., kRetry), similar to how disks are handled when they are attempted to be accessed prior to initialization (e.g., when init_done=false).

In some embodiments, a write ahead log (WAL) of the cloud disk is configured to reside on one of the locally attached disks (e.g., SSDs or HDDs directly attached to the node of the disk owner). In some embodiments, the hibernate workflow guarantees that no dirty data will be placed in the WAL associated with any acknowledged update by ensuring that the oplog gets written out to the storage pool.

In some embodiments, an ownership queue is maintained for cloud disks. For instance, for each cloud disk one or more potential owners are added to a queue of owners waiting to become the owner of that resource should the current owner go down. Then, in the event that an owner of a cloud disk goes down, the next node/process on the ownership queue can be selected for management of the cloud disk and reconfiguration of the necessary parameters and processes (e.g., I/O manager instance, disk manager, transport layer, and configuration information) can be updated to reflect the new owner without waiting for an election process.

In some embodiments, new RPC commands may be added to support cloud disks. For instance, an add_cloud_disks_to_cluster command which is called before hibernation (transfer) of data by datapath services is started, and a remove_cloud_disks_from_cluster command which is called after restoration of the data is completed by datapath services and marks the cloud disks created during the hibernate flow for removal. In some embodiments, cloud disks are only removed after the corresponding data and metadata have been replicated.

Figure 29:
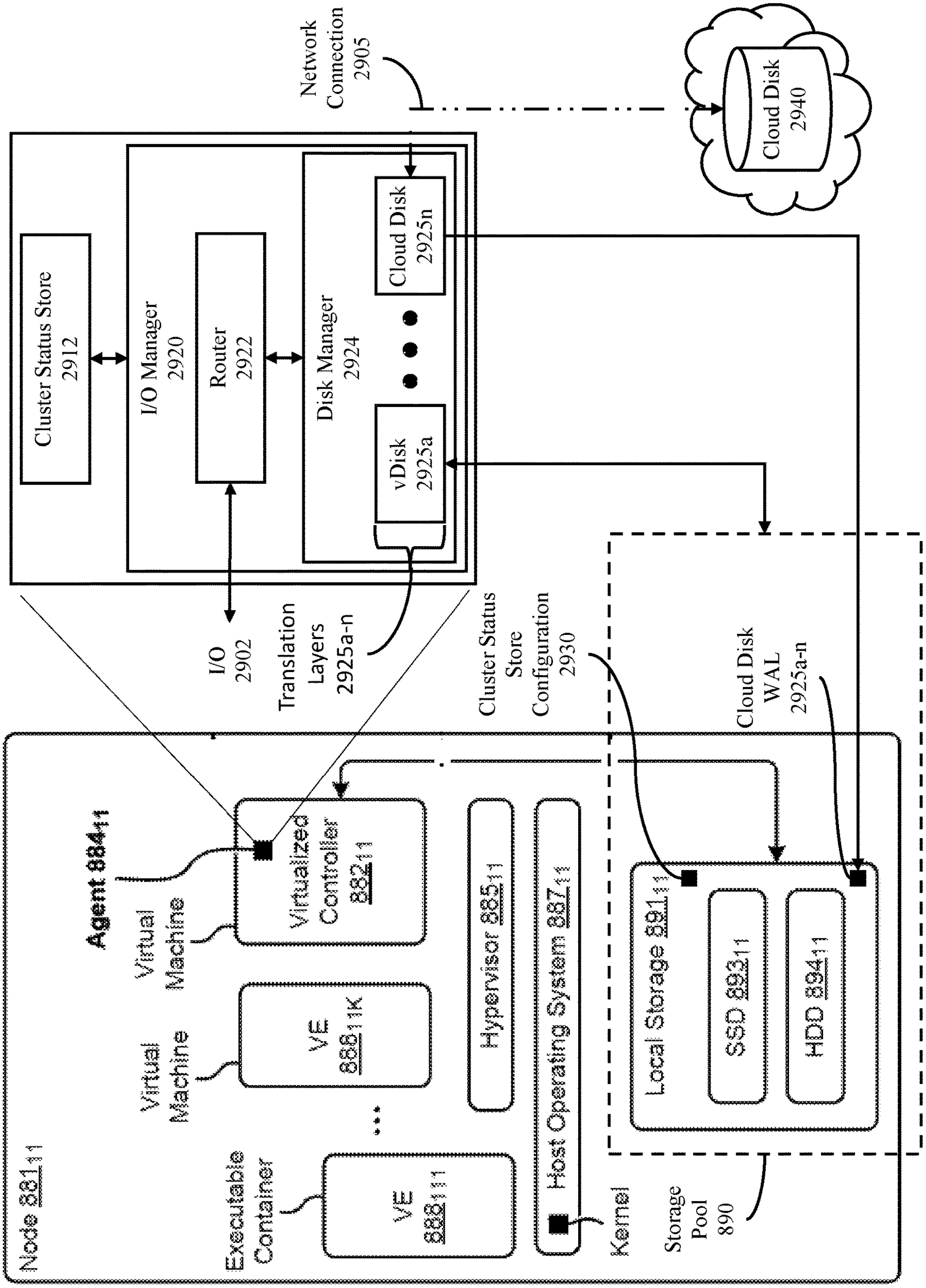
FIG. 29 depicts a portion of a virtualization system architectures comprising collections of interconnected components suitable for implementing embodiments of the present disclosure and/or for use in the herein-described environments.

FIG. 29 depicts a portion of a virtualization system architectures comprising collections of interconnected components suitable for implementing embodiments of the present disclosure and/or for use in the herein-described environments. Generally, FIG. 29 provides an architecture level illustration of elements in the clustered virtualization environment to implement approaches to cluster hibernation and restoration disclosed herein.

As an initial matter the figure illustrates interrelationships between elements largely with regard to a single node in the clustered virtualization environment. However, any number of similarly configured nodes, even all nodes, might be present in the cluster with an essentially equivalent configuration. For instance, the figure illustrates details of a configuration of node 881$_{11}$. However, any of nodes 811$_{11\text{-}1M}$ can be configured in the same way. Descriptions of items 881$_{11}$, 882$_{11}$, 884$_{11}$, 885$_{11}$, 887$_{11}$, 891$_{11}$, 888$_{111\text{-}11k}$, 890, 891$_{11}$, 893$_{11}$, 894$_{11}$, provided previously in regard to at least FIG. 8D are applicable to FIG. 29 to the extent that they do not contradict the disclosure in regard to FIG. 29.

As illustrated herein, an agent (e.g., agent 884$_{11}$) might include a cluster status store 2912 and an I/O Manager. The Agent uses the cluster status store to interact with and update a collection of information to manage at least cluster hibernation where that information may include details about the components in the cluster such as hosts, disks, and logical components like storage containers. In this way the cluster status store allows the I/O manager to retrieve and update information representing the cluster status at least in regard to the management of disks. In some embodiments, the information managed by the cluster status store is stored on the storage pool 890. For instance, the information might be stored as a cluster status store configuration 2930 on the storage pool 890 where copy may be stored or cached on the local storage 891$_{11}$ (e.g., on the SSD 893$_{11}$, or HDD 894$_{11}$).

In some embodiments, the cluster status store configuration 2930 is retrieved over a network connection from one or more other local storage devices of other nodes of the plurality of nodes the form the clustered virtualization environment. In some embodiments, the cluster status store configuration 2930 is loaded into memory for faster processing by a corresponding agent (e.g., agent 884$_{11}$).

The I/O manager 2920 receives I/O commands over a network or from processes that are local to the node (see 2902). For example, any of the virtualized entities (e.g., 888$_{111\text{-}11k}$) on the node might generate and I/O request that is routed to the I/O Manager 2920 (e.g., through the host operating system 887$_{11}$ and/or the hypervisor 885$_{11}$ and to the agent in the virtualized controller 882$_{11}$). Using a routing element (e.g., router 2922) the I/O manager 2920 routes the I/Os to the corresponding translation layer via the disk manager 2922. The disk manager itself is essentially a collection of translation layers (e.g., translation layers 2925*a-n*) that are used to interface with the corresponding disk. For example, access to a vDisk corresponding to translation layer 2925*a* is routed through the translation layer which converts the request form and characteristics into those that match the underlying storage (e.g., the vDisk sends and iSCSI request to access a logical address of the vDisk is routed through the hypervisor to the corresponding translation layer such at vDisk 2925*a* where it is converted to a physical device access at the correct physical address). Responses can then be handled in the reverse order.

As provided herein, a cloud disk translation layer is instantiated after the node (e.g., 884$_{11}$) or process (e.g., 882$_{11}$) is elected to be the leader of the corresponding cloud disk (e.g., 2940). The translation layer for the cloud disk 2925*n* can then be used to access the cloud disk. For instance, an I/O can be received by the agent, routed to the cloud disk translation layer, and converted into a network request (e.g., an HTTP request over network 2905) in the format necessary to access the cloud disk (e.g., into a format that is compatible with an API for an S3 bucket). Additionally, the disk manager or the corresponding translation layers can hold any other information necessary to access the cloud disks (e.g., access credentials, location information, communication protocol mappings, address mappings, etc.). In some embodiments, a write ahead log (WAL) is maintained for the cloud disk 2925*n*. However, because the cloud disk is generally going to be remote from the node and thus likely slower to access or having a higher latency, a WAL can be maintained for the cloud disk on the local storage of the node. In some embodiments, the local storage of the node that is used to maintain the WAL is part of the storage pool 980 and one or more processes operate to add redundant copies of entries in the wall to other nodes in the cluster. In this way, information maintained in the WAL can be accessed locally if the cloud disk goes down, and information that has been reproduced at one or more other nodes can be access within the cluster if the corresponding node goes down. In some embodiments, the cloud disk is identified as a replication location and data is reproduced at the cloud disk by a replication management process (e.g., a cluster administrator process).

An illustrative example to add a cloud disk is provided in regards to FIG. 29. For instance, in some embodiments, the process starts by issuing a call from the I/O manager to the cluster status store to add an S3 bucket to the list of disks. The cluster status store then adds/updates the corresponding entry—e.g., by adding a mount path, a disk config file, and a virtualized controller ID. Next, the I/O manager instantiates a translation layer (e.g., cloud disk translation layer

2925*n* comprising an HTTP layer) in its disk manager and instantiates a WAL). Once this is done, the cloud disk can then be used by the I/O manager to service corresponding requests (e.g., migrating data, metadata, system configuration information etc. as provided herein).

Hibernate-Resume Use Case—Ephemeral Drives

Generally, non-volatile media express (NVMe) drives attached to bare metal instances are ephemeral in that once a bare metal instance is released, any data on an NVMe drive is wiped. For instance, if customer powers down the cluster and starts it again, nodes will have NVMe drives without any data.

In some embodiments, the hibernate workflow backs up everything in NVMe drives to a target storage location (e.g., Amazon S3) by taking a snapshot of boot drives (e.g., elastic block storage (EBS) volumes) before powering down the nodes. On resume, data is restored to NVMe drives prior to starting the cluster again. In some embodiments, the validation is performed on data prior to replication at the target location.

Data Transfer Performance Improvements

In some embodiments, the transfer of data or metadata to or from a target storage location may be optimized by using a number of threads and connections at multiple nodes. For instance, an automated process could be used to test various permutations of threads, connections, and nodes to select a best performing combination based on measured throughput. In some embodiments, each node includes a queue of pending transfer to a target location and a specified number of threads (e.g., determined using an automated process or previously provided). In such instances, a sender may monitor a number of threads and issue new transfer threads whenever there are remaining objects (e.g., egroups or metadata objects) to be transfer and less than a threshold number of threads are currently executing. In some embodiments, each thread is matched to a corresponding connection and new transfer threads are issued available connections.

In some embodiments, the transfer to/from the target storage location, or for the underlying process is subject to a bandwidth allocation. However, in the event of a cluster hibernation or cluster restore, other processes not directed to the migration or restoration should not normally be executing. Thus, in some embodiments, bandwidth limits are lifted or reallocated to the hibernation or restore operations to improve their performance.

Data Performance Changes

In some embodiments, the metadata transferred by the DRC process comprises key value pairs stored on multiple nodes for resiliency. For instance, if the replication factor (RF) equals 3 there should be 3 copies of each key value pair. However, each node is a primary replica for only a subset of those key value pairs (token ranges). Additionally, a node may also have a second and third replica for other nodes.

In some embodiment, the data in the metadata manager is stored in files called SSTables. SST stands for Sorted String Table. SSTs are immutable files on the file system where the data is sorted based on the keys. An SST is a collection of files for Data, Index, Bloom Filter, etc. A keyspace is a database (DB) and a Column Family (CF) is a table or a collection of rows. Generally, there are 3 major maps which are separate CFs (or tables), those are vDiskblock map, extent id map, extent group id map. There may be multiple CFs.

In some embodiments, the DRC is responsible for performing the following operations: dynamic addition/removal of a metadata manager node; scans to be run to either repair a node or detach a node; metadata disk removal; RF migration. In some embodiments, the DRC uses one of two methods for fixing rings. First, SSTable scans are used for any ops (node addition, removal etc.) for repairing the rings by ensuring that replicas are consistent. Second, SSTable file shipment which avoids scans used in the first method and comprises coping SST files between nodes. A DRC orchestrator is also known as an acting DRC node and is elected to the role and is responsible for scheduling all DRC tasks. A DRC Receiver receives SST files—e.g., during node addition the DRC on the new node will be DRC receiver. A DRC Sender is responsible for sending its SST files.

In some embodiments, a metadata manager daemon is provided for validating the SSTable which is executed at least by reading each row of the SST for ensuring no data corruption and which is throttled during normal operation. However, in the case of a cluster hibernate the validation process throttling may be removed or increased under the expectation that other I/O operations will largely not be executing (e.g., based on a setting change or flag indicating that non-hibernation I/O is blocked).

In some embodiments, each token range is further split into multiple sub-ranges. In some embodiments, different types of token ranges may be split into different ranges. For example, given a number of metadata disks (4), a # sub-ranges for primary token range (4), # sub-ranges for each replica token range (2), and RF of 3, then the total # of sub-ranges is 8.

In some embodiments, the DRC sender uses token sub-ranges for compaction, snapshot, and validation. A metadata manager daemon compacts, snapshots, or validates an SST of a single sub-range at a time. A snapshot may be created by making a hard link. Validation may be a long running asynchronous operation. Sub-ranges are stored on singular disks. In some embodiments, the metadata manager has multiple threads (e.g., 3) for compactions and multiple threads (e.g., 2) for validations provided the CPU is available. In some embodiments, performance is improved by scheduling processing for multiple sub-ranges in parallel up to a defined maximum concurrency value.

In some embodiments, the DRC in orchestrator mode maintains a queue of metadata transfer tasks for a node. The DRC orchestrator has a separate queue for Nodes A, B, C, and D. The queue for node A contains the metadata transfer tasks of the form <CF1, TK1>, <CF1, TK2> <CF1, TK3>, <CF2, TK1>, <CF2, TK2> <CF2, TK3>. In some embodiments, the orchestrator uses separate threads for metadata transfer for nodes—e.g., it processes a single task from the queue for each node at a time. In some embodiments, the DRC orchestrator uses synchronous functions for metadata transfer. In some embodiments, the synchronous functions are converted into asynchronous functions with callbacks by, at least modifying the code to schedule metadata transfer for all token ranges of a CF in parallel. That is, metadata transfer for all token ranges (TK1, TK2, TK3) for a Column Family=CF1 start on each DRC sender in parallel. For example, node A receives all token ranges for transfer: TK1 (leader only range) sub-ranges SR1-1, SR1-2, SR1-3, SR1-4; TK2 sub-ranges SR2-1, SR2-2; TK3 sub-ranges SR3-1, SR3-2. In some embodiments, if there are more ranges then allowed by a management queue for processing in parallel, they are maintained in a queue until a slot is open.

What is claimed is:

1. A non-transitory computer readable medium having stored thereon a sequence of instructions which, when executed by a processor, cause a set of acts, the set of acts comprising:

maintaining a cluster on a plurality of nodes of a virtualization system, the cluster having a distributed metadata system that uses a persistent data structure to store system metadata, wherein a storage pool of the cluster is managed using the system metadata, the system metadata is stored on multiple nodes of the plurality of nodes, the system metadata comprises a plurality of portions of metadata, individual portions of the plurality of portions of metadata are stored as both a primary copy on a node of the multiple nodes and at least one redundant copy on at least one other node of the multiple nodes, and at least two nodes of the multiple nodes store both a primary copy of at least one individual portion and a redundant copy of at least one other individual portion;

determining that the system metadata is to be migrated to a backup storage that is external to the cluster; and migrating the system metadata to the backup storage at least by:

identifying and selecting, from the primary and redundant copies, a single copy of the individual portions of the plurality of portions of metadata for transfer to the backup storage, wherein the primary copy of the individual portions of the plurality of portions of metadata is selected as the single copy of the individual portions of the plurality of portions of metadata, and transmitting the identified and selected single copy of the individual portions of the plurality of portions of metadata from the multiple nodes to the backup storage.

2. The computer readable medium of claim 1, wherein the multiple nodes transfer different portions of the system metadata to the backup storage, and the different portions comprise different entries in the persistent data structure.

3. The computer readable medium of claim 1, wherein the primary copies of portions of the system metadata comprise different entries in the persistent data structure that are transferred by the multiple nodes using multiple connections on each of the multiple nodes.

4. The computer readable medium of claim 1, wherein the persistent data structure comprises a sorted string table (SST) and the SST is divided into multiple ranges of SST entries using a column family and token range.

5. The computer readable medium of claim 4, wherein the multiple ranges of SST entries are further divided into multiple subsets of SST entries by the multiple nodes using the column family and token ranges.

6. The computer readable medium of claim 5, wherein the set of acts further comprise, prior to migration, compacting the multiple subsets of SST entries, generating snapshots of respective ones of the multiple subsets of SST entries, or validating the multiple subsets of SST entries.

7. The computer readable medium of claim 1, wherein the backup storage comprises a cloud disk and the storage pool is constructed from a plurality of storage devices directly attached to respective nodes of the plurality of nodes.

8. The computer readable medium of claim 1, wherein the set of acts further comprise:

identifying a plurality of data items having a corresponding redundant copy on the storage pool;

selecting a single copy of each of the plurality of data items for transfer to the backup storage; and migrating the single copy of each of the plurality of data items to the backup storage without copying multiple copies of an individual data item to the backup storage.

9. A system comprising:

a storage medium having stored thereon a sequence of instructions; and a processor that executes the sequence of instructions to cause the processor to perform a set of acts comprising:

maintaining a cluster on a plurality of nodes of a virtualization system, the cluster having a distributed metadata system that uses a persistent data structure to store system metadata, wherein a storage pool of the cluster is managed using the system metadata, the system metadata is stored on multiple nodes of the plurality of nodes, the system metadata comprises a plurality of portions of metadata, individual portions of the plurality of portions of metadata are stored as both a primary copy on a node of the multiple nodes and at least one redundant copy on at least one other node of the multiple nodes, and at least two nodes of the multiple nodes store both a primary copy of at least one individual portion and a redundant copy of at least one other individual portion;

determining that the system metadata is to be migrated to a backup storage that is external to the cluster; and migrating the system metadata to the backup storage at least by:

identifying and selecting, from the primary and redundant copies, a single copy of the individual portions of the plurality of portions of metadata for transfer to the backup storage, wherein the primary copy of the individual portions of the plurality of portions of metadata is selected as the single copy of the individual portions of the plurality of portions of metadata, and transmitting the identified and selected single copy of the individual portions of the plurality of portions of metadata from the multiple nodes to the backup storage.

10. The system of claim 9, wherein the multiple nodes transfer different portions of the system metadata to the backup storage, and the different portions comprise different entries in the persistent data structure.

11. The system of claim 9, wherein the primary copies of portions of the system metadata comprise different entries in the persistent data structure that are transferred by the multiple nodes using multiple connections on each of the multiple nodes.

12. The system of claim 9, wherein the persistent data structure comprises a sorted string table (SST) and the SST is divided into multiple ranges of SST entries using a column family and token range.

13. The system of claim 12, wherein the multiple ranges of SST entries are further divided into multiple subsets of SST entries by the multiple nodes using the column family and token ranges.

14. The system of claim 13, wherein the set of acts further comprise, prior to migration, compacting the multiple subsets of SST entries, generating snapshots of respective ones of the multiple subsets of SST entries, or validating the multiple subsets of SST entries.

15. The system of claim 9, wherein the backup storage comprises a cloud disk and the storage pool is constructed from a plurality of storage devices directly attached to respective nodes of the plurality of nodes.

16. The system of claim 9, wherein the set of acts further comprise:

identifying a plurality of data items having a corresponding redundant copy on the storage pool;

selecting a single copy of each of the plurality of data items for transfer to the backup storage; and migrating the single copy of each of the plurality of data items to the backup storage without copying multiple copies of an individual data item to the backup storage.

17. A method comprising:

maintaining a cluster on a plurality of nodes of a virtualization system, the cluster having a distributed metadata system that uses a persistent data structure to store system metadata, wherein a storage pool of the cluster is managed using the system metadata, the system metadata is stored on multiple nodes of the plurality of nodes, the system metadata comprises a plurality of portions of metadata, individual portions of the plurality of portions of metadata are stored as both a primary copy on a node of the multiple nodes and at least one redundant copy on at least one other node of the multiple nodes, and at least two nodes of the multiple nodes store both a primary copy of at least one individual portion and a redundant copy of at least one other individual portion;

determining that the system metadata is to be migrated to a backup storage that is external to the cluster; and migrating the system metadata to the backup storage at least by:

identifying and selecting, from the primary and redundant copies, a single copy of the individual portions of the plurality of portions of metadata for transfer to the backup storage, wherein the primary copy of the individual portions of the plurality of portions of metadata is selected as the single copy of the individual portions of the plurality of portions of metadata, and transmitting the identified and selected single copy of the individual portions of the plurality of portions of metadata from the multiple nodes to the backup storage.

18. The method of claim 17, wherein the multiple nodes transfer different portions of the system metadata to the backup storage, and the different portions comprise different entries in the persistent data structure.

19. The method of claim 17, wherein the primary copies of portions of the system metadata comprise different entries in the persistent data structure that are transferred by the multiple nodes using multiple connections on each of the multiple nodes.

20. The method of claim 17, wherein the persistent data structure comprises a sorted string table (SST) and the SST is divided into multiple ranges of SST entries using a column family and token range.

21. The method of claim 20, wherein the multiple ranges of SST entries are further divided into multiple subsets of SST entries by the multiple nodes using the column family and token ranges.

22. The method of claim 21, further comprises, prior to migration, compacting the multiple subsets of SST entries, generating snapshots of respective ones of the multiple subsets of SST entries, or validating the multiple subsets of SST entries.

23. The method of claim 17, wherein the backup storage comprises a cloud disk and the storage pool is constructed from a plurality of storage devices directly attached to respective nodes of the plurality of nodes.

24. The method of claim 17, further comprises:

identifying a plurality of data items having a corresponding redundant copy on the storage pool;

selecting a single copy of each of the plurality of data items for transfer to the backup storage; and migrating the single copy of each of the plurality of data items to the backup storage without copying multiple copies of an individual data item to the backup storage.

* * * * *